(12) United States Patent
Tobiason

(10) Patent No.: US 11,326,865 B2
(45) Date of Patent: *May 10, 2022

(54) ROTATING CHROMATIC RANGE SENSOR SYSTEM WITH CALIBRATION OBJECTS AND METHOD

(71) Applicant: Mitutoyo Corporation, Kanagawa-ken (JP)

(72) Inventor: Joseph Daniel Tobiason, Bothell, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 4 days.

This patent is subject to a terminal disclaimer.

(21) Appl. No.: 17/001,328

(22) Filed: Aug. 24, 2020

(65) Prior Publication Data

US 2021/0333083 A1 Oct. 28, 2021

Related U.S. Application Data

(63) Continuation-in-part of application No. 16/861,024, filed on Apr. 28, 2020.

(51) Int. Cl.
*G01B 9/02* (2022.01)
*G01B 7/012* (2006.01)

(52) U.S. Cl.
CPC .......... *G01B 7/012* (2013.01); *G01B 9/0205* (2013.01)

(58) Field of Classification Search
CPC ............. G01B 11/026; G01B 11/007; G01B 2210/50; G01B 21/042; G01B 3/30

USPC ............................. 356/614–624, 145
See application file for complete search history.

(56) References Cited

U.S. PATENT DOCUMENTS

| | | |
|---|---|---|
| 4,908,951 A | 3/1990 | Gurny |
| 5,825,666 A | 10/1998 | Freifeld |
| 6,067,165 A | 5/2000 | Matsumiya et al. |
| 7,873,488 B2 | 1/2011 | Nahum et al. |
| 7,876,456 B2 | 1/2011 | Sesko |
| 7,990,522 B2 | 8/2011 | Sesko |
| 8,194,251 B2 | 6/2012 | Emtman et al. |
| 8,229,694 B2 | 7/2012 | Nakagawa et al. |
| 8,817,240 B2 | 8/2014 | Jones et al. |
| 9,151,602 B2 | 10/2015 | Noda et al. |
| 9,746,303 B2 | 8/2017 | Nakagawa et al. |
| 9,952,045 B2 | 4/2018 | Yasuno |
| 10,429,167 B2 | 10/2019 | Nakagawa et al. |

(Continued)

*Primary Examiner* — Isiaka O Akanbi
(74) *Attorney, Agent, or Firm* — Seed IP Law Group LLP

(57) ABSTRACT

A calibration configuration for a chromatic range sensor (CRS) optical probe of a coordinate measurement machine (CMM) includes a cylindrical calibration object and a spherical calibration object. The cylindrical calibration object includes at least a first nominally cylindrical calibration surface having a central axis that extends along a Z direction that is intended to be aligned approximately parallel to a rotation axis of the CRS optical probe. The spherical calibration object includes a nominally spherical calibration surface having a first plurality of surface portions. The CMM is operated to obtain radial distance measurements and determine cylindrical calibration data using radial distance measurements of the cylindrical calibration object and to determine spherical calibration data using radial distance measurements of the spherical calibration object.

20 Claims, 44 Drawing Sheets

(56) References Cited

U.S. PATENT DOCUMENTS

| | | | |
|---|---|---|---|
| 2006/0109483 A1* | 5/2006 | Marx | G01B 11/24 |
| | | | 356/609 |
| 2010/0208486 A1* | 8/2010 | Gladnick | G01B 11/026 |
| | | | 362/551 |
| 2012/0050722 A1* | 3/2012 | Emtman | G01B 11/026 |
| | | | 356/123 |
| 2012/0050723 A1* | 3/2012 | Emtman | G01B 11/14 |
| | | | 356/123 |
| 2015/0159998 A1* | 6/2015 | Altendorf | G01B 11/005 |
| | | | 356/635 |
| 2015/0211850 A1* | 7/2015 | Harsila | G02B 7/1821 |
| | | | 356/4.01 |
| 2017/0248399 A1 | 8/2017 | Takahama | |

* cited by examiner

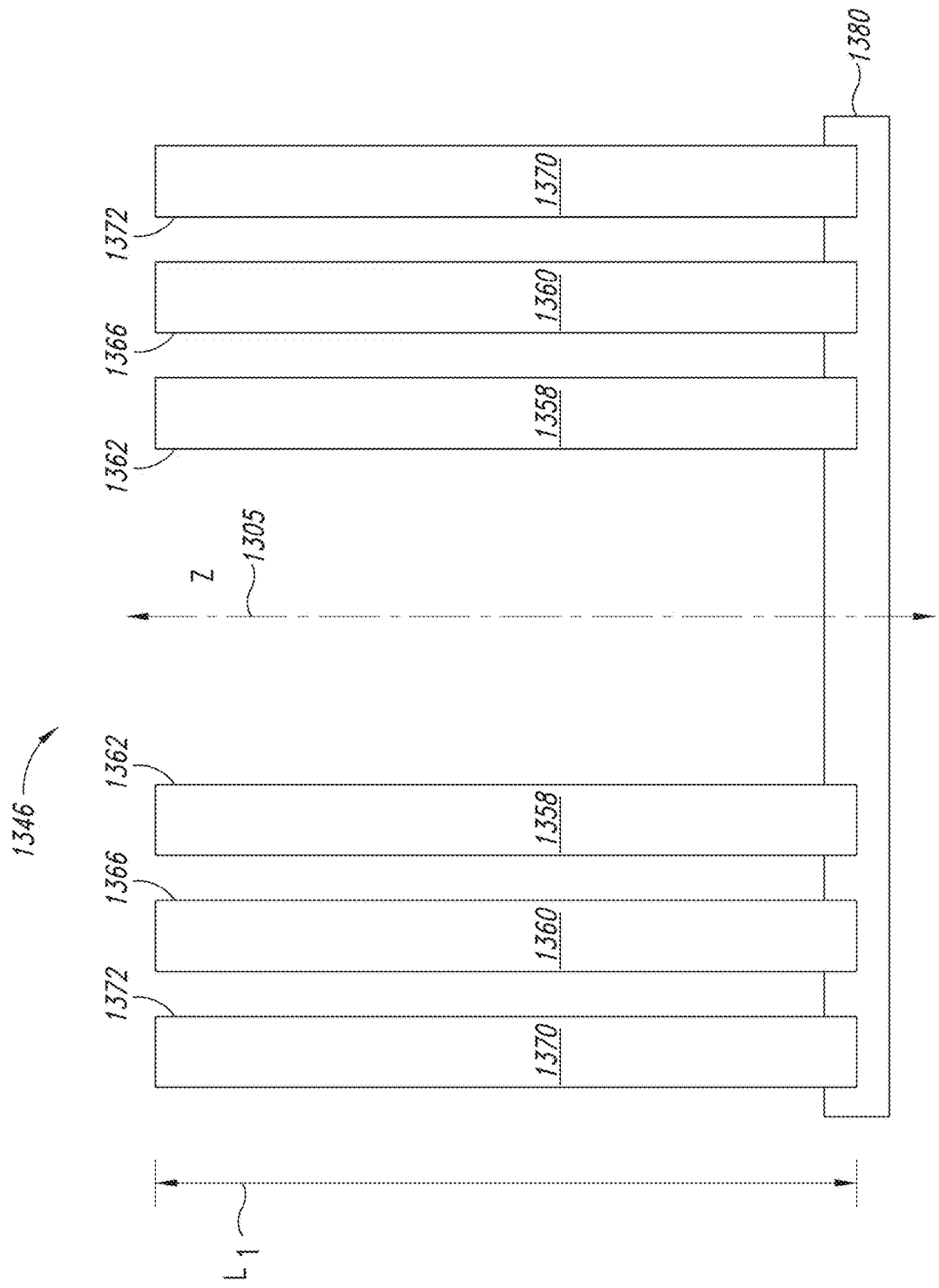

ROTATING CHROMATIC RANGE SENSOR SYSTEM WITH CALIBRATION OBJECTS AND METHOD

BACKGROUND

Technical Field

The disclosure relates generally to precision measurement instruments, and more particularly to chromatic range sensor optical probes such as may be used with coordinate measurement machines (CMMs) for determining measurements of workpieces.

Description of the Related Art

In one type of coordinate measuring machine, the surface of a workpiece is scanned with a probe. After the scan, a three dimensional profile of the workpiece is provided. In one type of scanning probe, the workpiece is directly measured by touching a mechanical contact of the probe to various points along the workpiece surface. In some cases, the mechanical contact is a ball.

In other coordinate measuring machines, an optical probe is utilized which measures the workpiece without making physical contact with the surface. Certain optical probes (e.g., triangulation probes) utilize light to measure workpiece surface points, and some optical probes comprise video cameras which are used to image 2-D sections of the workpiece surface (e.g., stereo vision systems, or structured light systems). In some systems, the coordinates of the geometric elements of the workpiece are determined via image processing software.

Certain "combined" coordinate measuring machines that use both optical and mechanical measuring sensors are also known. One such device is described in U.S. Pat. No. 4,908,951, which is hereby incorporated by reference in its entirety. The described apparatus has two spindles, one that carries the mechanical probe, and one that holds a video camera having a beam path into which a laser probe is simultaneously reflected for making measurements in the Z coordinate, that is, along the optical axis of the video camera.

U.S. Pat. No. 5,825,666, which is hereby incorporated by reference in its entirety, describes an optical coordinate measuring machine wherein an optical touch probe of the device has a first target on the distal end thereof, on the contact element of a standard probe. The standard probe is mounted to a video camera to image the target on the camera. Movement and position of the target in the X and Y coordinates is indicated by the machine's computer image processing system. A second target is mounted to the proximal end of the probe and indicates movement and position in the Z coordinate. The second target may obscure a photo detector but can be focused on the camera by a light beam parallel to the X, Y plane. There can be two second targets illuminated by orthogonal beams parallel to the X, Y plane. Rotation around the Z axis then may be calculated by the computer when star probes are used. Auto changing racks are also disclosed for holding multiple probes, a probe holder, and lenses for selective mounting on the camera.

Optical probes and/or coordinate measurement machines may also contain rotating elements, for example, to rotate an optical pen of an optical probe with respect to an axis. In addition, optics elements may include reflective elements placed in the path of a source beam, directing measurement beams in a different direction than the source beam.

A related issue involves errors in measurements taken by a coordinate measurement machine using a rotating optical pen, such as radius, rotational angle, Z position errors, which may have nonlinear components. Conventionally, calibration may be performed using an interferometer to address such errors. Calibration using an interferometer, however, is difficult to perform accurately, particularly for rotating probes. In addition, such calibration may be difficult to perform at a measurement site, such as a manufacturing facility.

A configuration and method for calibrating a chromatic range sensor optical probe as coupled to a coordinate measurement machine that provides improvements with respect to such issues would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A calibration system for providing calibration data for a coordinate measurement machine (CMM) is provided. The calibration system includes the CMM, which comprises light generating circuitry, wavelength detection circuitry, and CMM control circuitry, and a chromatic range sensor (CRS) optical probe configured to couple to the CMM. The CRS optical probe comprises an optical pen having a confocal optical path including at least a confocal aperture and a chromatically dispersive optics portion. The optical pen is configured to direct a radial distance sensing beam along a radial direction relative to a rotation axis, rotate the radial distance sensing beam about the rotation axis, and focus different wavelengths at different distances along a measurement axis proximate to a workpiece surface to be measured. The calibration system includes a cylindrical calibration object and a spherical calibration object.

The cylindrical calibration object is for providing cylindrical calibration data for correcting misalignment errors of the CRS optical probe and comprises at least a first nominally cylindrical calibration surface having a central axis that extends along a Z direction. The CRS optical probe is configured to provide a first set of cylindrical radial distance data acquired while rotating the radial distance sensing beam about the rotation axis at a first Z coordinate along the Z direction relative to the cylindrical calibration object. The cylindrical radial distance data is referenced to a sensed rotational angle of the radial distance sensing beam about the rotation axis, and for which the first set of cylindrical radial distance data referenced to the sensed rotation angle is processed to determine the cylindrical calibration data.

The spherical calibration object comprises a nominally spherical calibration surface that is for providing spherical calibration data for correcting misalignment errors of the CRS optical probe. For a first plurality of surface portions on the nominally spherical calibration surface, for each surface portion, the CRS optical probe is configured to provide a corresponding set of spherical radial distance data acquired while rotating the radial distance sensing beam about the rotation axis with the optical pen approximately at a first nominal standoff distance from the spherical calibration object, and for which the optical pen is also moved along a scanning axis direction (i.e., which correspondingly moves the radial distance sensing beam along the scanning axis direction) for acquiring the set of spherical radial distance data. Each set of radial distance data corresponding to each respective sensed surface portion is processed to determine a sensed closest surface point that is indicated to be closest to the optical pen. Spherical calibration data is determined based at least in part on the sensed closest surface points corresponding to the plurality of surface portions.

In some implementations, a method is provided for providing calibration data for correcting misalignment errors for a rotating chromatic range sensor configuration. The rotating chromatic range sensor configuration is configured to direct a radial distance sensing beam along a radial direction relative to a rotation axis and to rotate the radial distance sensing beam about the rotation axis. A cylindrical calibration object and a spherical calibration object are provided.

The cylindrical calibration object comprises at least a first nominally cylindrical calibration surface having a central axis that extends along a Z direction and is arranged in a relationship relative to the rotating chromatic range sensor configuration. The rotating chromatic range sensor configuration is operated to provide a first set of cylindrical radial distance data acquired while rotating the radial distance sensing beam about the rotation axis at a first Z coordinate along the Z direction relative to the cylindrical calibration object. The cylindrical radial distance data is referenced to a sensed rotational angle of the radial distance sensing beam about the rotation axis. The first set of cylindrical radial distance data referenced to the sensed rotation angle is processed to determine a first set of cylindrical calibration data.

The spherical calibration object comprises a nominally spherical calibration surface having a first plurality of surface portions and is arranged in a relationship relative to the rotating chromatic range sensor configuration. The rotating chromatic range sensor configuration is operated to provide, for the first plurality of surface portions, a corresponding set of spherical radial distance data acquired while rotating the radial distance sensing beam about the rotation axis with an optical pen of the rotating chromatic range sensor configuration approximately at a first nominal standoff distance from the spherical calibration object. Each set of radial distance data corresponding to each respective sensed surface portion is processed to determine a sensed closest surface point that is indicated to be closest to the optical pen of the rotating chromatic range sensor configuration. Spherical calibration data is determined based at least in part on the sensed closest surface points corresponding to the plurality of surface portions.

In some implementations, a calibration system is provided for a chromatic range sensor (CRS) configuration including a CRS optical probe. The calibration system comprises the cylindrical calibration object for providing cylindrical calibration data for correcting misalignment errors of the CRS optical probe, the spherical calibration object for providing spherical calibration data for correcting misalignment errors of the CRS optical probe, and a stage (e.g., comprising a surface plate) configured to position the cylindrical calibration object and the spherical calibration object with respect to the CRS optical probe.

In some implementations, the system includes a control portion (e.g., including one or more controllers, control circuits, etc.) that is configured to perform the processing of each set of radial distance data corresponding to each respective sensed surface portion to determine the sensed closest surface point that is indicated to be closest to the optical pen, and to determine the spherical calibration data based at least in part on the sensed closest surface points corresponding to the plurality of surface portions. The control portion may also be configured to reference the cylindrical radial distance data to the sensed rotational angle of the radial distance sensing beam about the rotation axis, and to process the first set of cylindrical radial distance data as referenced to the sensed rotation angle to determine the cylindrical calibration data.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 13A to 13E illustrate example embodiments of a calibration object which takes the form of a plurality of nested precision metal tubes;

DETAILED DESCRIPTION

Figure 1:
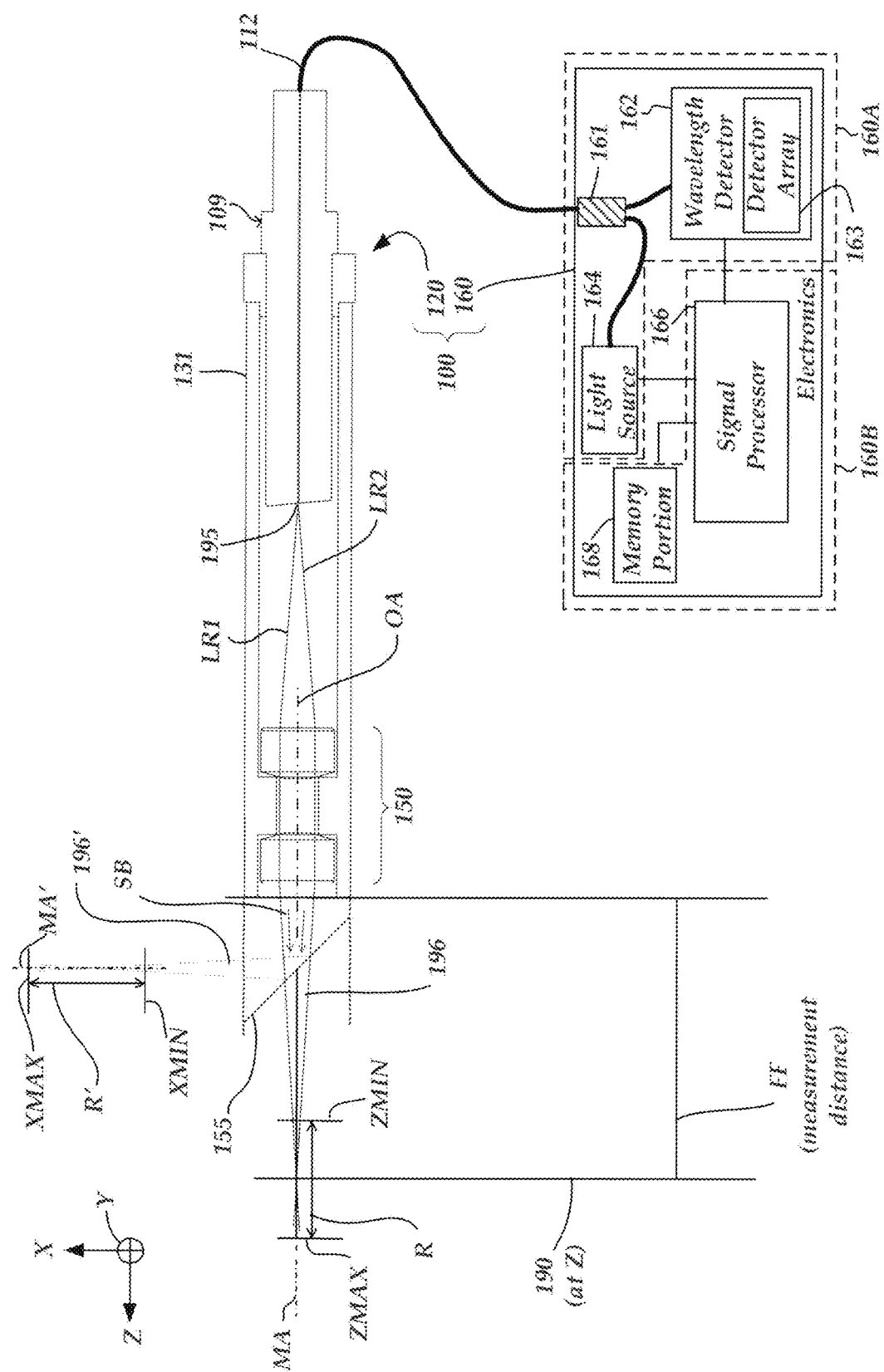
FIG. 1 is a block diagram of an exemplary chromatic range sensor (CRS) system including an optical pen.

FIG. 1 is a block diagram of an exemplary chromatic range sensor (CRS) system 100 of a first type based on operating principles that are desirable to employ in conjunction with a coordinate measurement machine. The CRS system 100 has certain similarities to systems described in U.S. Pat. Nos. 7,876,456 and 7,990,522 (the '456 and '522 patents, respectively), which are hereby incorporated herein by reference in their entireties. As shown in FIG. 1, the CRS system 100 includes an optical element 120 and an electronics portion 160. It will be appreciated that the CRS system 100 shown in FIG. 1 is a chromatic point sensor system which in some instances may measure a single measurement point at a time. The optical element 120 shown in FIG. 1 is an optical pen. However, in various embodiments alternative types of chromatic range systems, such as a chromatic line sensor, may be utilized.

The optical pen 120 includes a fiber optic connector 109, a housing 131 (e.g. an assembly tube), and an optics portion 150. The fiber optic connector 109 is attached to the end of the housing 131. In various implementations, the fiber optic connector 109 may be oriented at an angle relative to the housing 131. The fiber optic connector 109 receives an in/out optical fiber (not shown in detail) through a fiber optic cable 112 which encases it. The in/out optical fiber outputs source light through a fiber aperture 195 and receives reflected measurement signal light through the fiber aperture 195.

In operation, broadband (e.g. white) source light emitted from the fiber end through the fiber aperture 195 is focused by the optics portion 150, which includes a lens or lenses that provide an axial chromatic dispersion, such that the focal point along the optical axis OA is at different distances depending on the wavelength of the light, as is known for chromatic confocal sensor systems. The source light forms a measurement beam 196 (e.g., which may function as a radial distance sensing beam) that includes a wavelength that is focused on a workpiece surface 190 at a position Z relative to the optical pen 120. Upon reflection from the workpiece surface 190, reflected light is refocused by the optics portion 150 onto the fiber aperture 195. The operative source light and reflected light are bounded by the limiting rays LR1 and LR2. Due to the axial chromatic dispersion, only one wavelength will have a front focus dimension FF that matches the measurement distance from the optical pen 120 to the surface 190. The optical pen is configured such that the wavelength that is best focused at the surface 190 will also be the wavelength of the reflected light that is best focused at the fiber aperture 195. The fiber aperture 195 spatially filters the reflected light such that predominantly the best focused wavelength passes through the fiber aperture 195 and into the core of the optical fiber cable 112. As described in more detail below and in the incorporated references, the optical fiber cable 112 routes the reflected signal light to a wavelength detector 162 that is utilized for determining the wavelength having the dominant intensity, which corresponds to the measurement distance to the workpiece surface 190.

FIG. 1 also schematically illustrates an optional reflective element 155 in dashed outline. As described in more detail in U.S. Patent Publication No. 20120050723, which is hereby incorporated by reference in its entirety, a reflective element may be placed in the path of the source beam SB. In such an implementation, rather than the measurement axis MA being coaxial with the optical axis OA, the reflective element may direct the measurement beam 196' along a measurement axis MA' in a different direction (e.g. orthogonal to the optical axis) as needed in some measurement applications. Such an orthogonal orientation is utilized in the embodiments illustrated in other figures herein, as will be described in more detail below.

The electronics portion 160 includes a fiber coupler 161, the wavelength detector 162, a light source 164, a signal processor 166 and a memory portion 168. In various embodiments, the wavelength detector 162 includes a spectrometer or spectrograph arrangement wherein a dispersive optics portion (e.g. a grating) receives the reflected light through the optical fiber cable 112 and transmits the resulting spectral intensity profile to a detector array 163. The wavelength detector 162 may also include related signal processing (e.g. provided by the signal processor 166, in some embodiments) that removes or compensates certain detector-related error components from the profile data. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g. a 2×1 optical coupler) to the fiber cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface 190 at the position Z. The reflected wavelength-dependent light intensity then passes through the fiber coupler 161 again so that approximately 50% of the light is directed to the wavelength detector 162, which may receive a spectral intensity profile distributed over an array of pixels along a measurement axis of the detector array 163, and operate to provide corresponding profile data as described in more detail in the incorporated references. Briefly, a sub-pixel-resolution distance indicating coordinate of the profile data (e.g. a peak position coordinate) is calculated by the signal processor 166, and the distance indicating coordinate corresponding to the wavelength peak determines the measurement distance to the surface via a distance calibration lookup table which is stored in the memory portion 168. The distance indicating coordinate may be determined by various methods such as determining the centroid of profile data included in a peak region of the profile data. As will be described in more detail below, in a rotating system such as that described herein, calibration data (e.g., as stored in the memory portion 168 or otherwise) may also be utilized to indicate or adjust measurement distances based at least in part on a rotational angular orientation of the optical pen 120.

The optical pen 120 generally has a measurement range R that is bound by a minimum range distance ZMIN and a maximum range distance ZMAX. The measurement range R in some example instances of known optical pens may be approximately 1/10th of the nominal standoff or working distance from the end of the pen (e.g. in the range of tens of microns to a few millimeters). FIG. 1 schematically illustrates that if the reflector element 155 is used, the measurement range R' may be directed along a measurement axis MA' determined by the placement of the reflector element 155 (e.g. the x-axis). In such a case, the measurement range R' may be bound by minimum range distance XMIN and a maximum range distance XMAX.

It should be appreciated that in some implementations the electronics portion 160 may be located away from the optical pen 120. It has been known to mount an optical pen analogous to the optical pen 120 shown in FIG. 1 on a CMM using a customized bracket, and to route an optical fiber analogous to the optical fiber cable 112 along a makeshift path on the outside of CMM components to a remotely located electronics analogous to the electronics 160.

As disclosed in more detail below with respect to FIGS. 2, 3A and 3B, a group of components in a light source and wavelength detector portion 160A (e.g. including the wavelength detector 162 and light source 164) may be included inside a CRS optical probe assembly in some embodiments. A group of components in a measurement signal processing and control circuit 160B (e.g. including the signal processor 166 and memory portion 168) may be located remotely outside of the CRS optical probe assembly, if desired (e.g. to maintain low probe weight and compact probe size).

Figure 2:
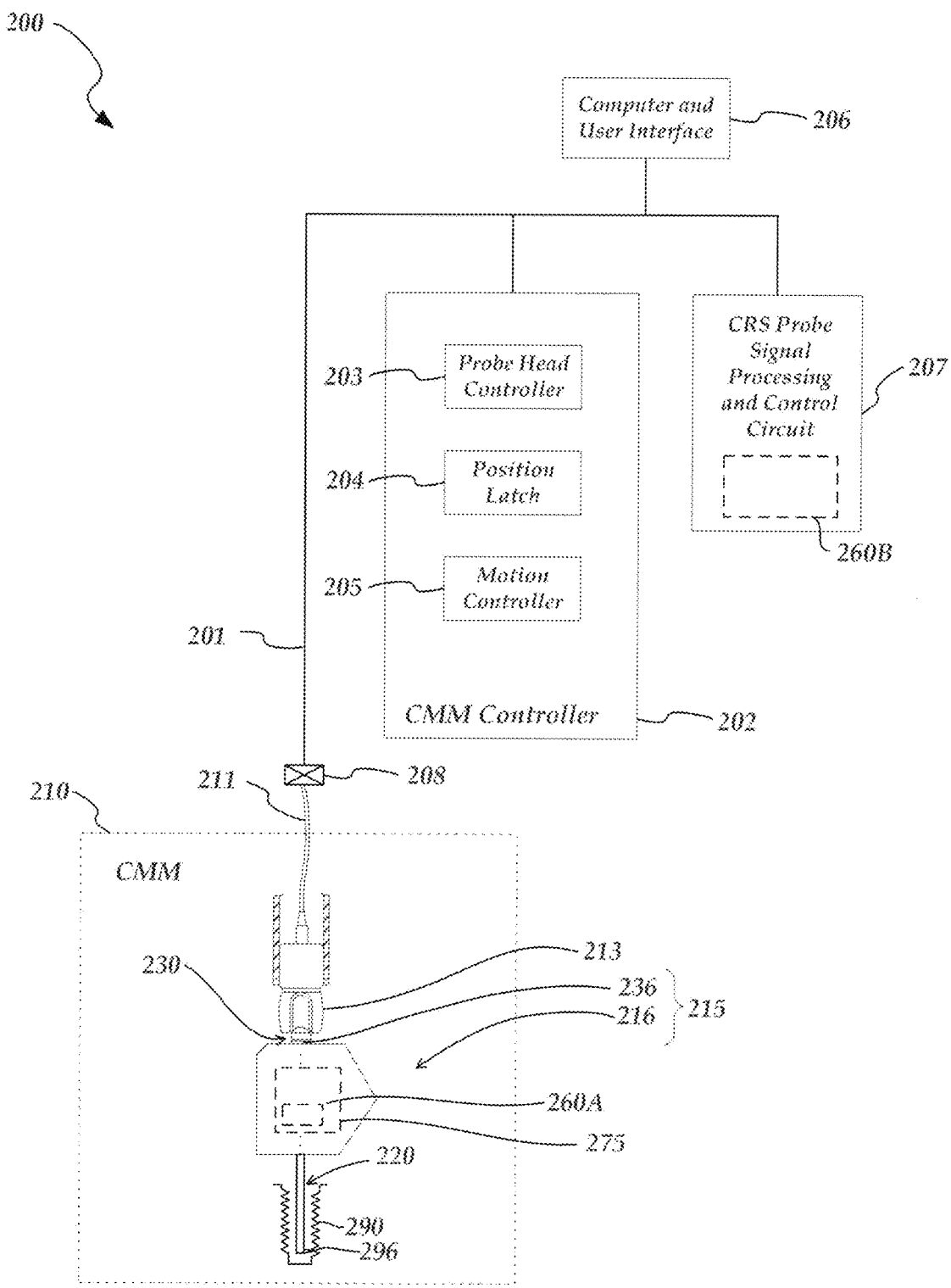
FIG. 2 is a block diagram of a coordinate measurement system including a coordinate measurement machine, a CRS optical probe including an optical pen, controllers and a user interface.

FIG. 2 is a diagram of a coordinate measurement system 200, and an automatically connectable and interchangeable CRS optical probe system 215. That is, the CRS optical probe system 215 may be automatically interchanged with other types of CMM probes. A CRS optical probe system may also be referred to simply as a CRS optical probe herein. In various drawings herein, unless otherwise indicated, reference numbers having similar suffixes (e.g. reference number 1XX and 2XX having the suffix XX) may refer to generally analogous elements, such that operation of element 2XX may be generally understood by one of ordinary skill in the art with limited description, based on analogy to a previous description of analogous element 1XX, and so on. However, it will be understood that despite such analogy, various elements may have different implementations in different embodiments, as will be apparent to one of ordinary skill in the art, and are not limited to being identical.

The coordinate measurement system 200 includes a coordinate measurement machine controller 202, a computer and user interface 206, a probe signal processing and control circuit 207, and a coordinate measurement machine 210. The controller 202 includes a probe head controller 203, a position latch 204 and a motion controller 205. The CRS optical probe 215 includes an auto exchange joint element 236 and is connected to the coordinate measurement machine 210 through a mating joint element in the probe autojoint connection 230 (also referred to as an auto exchange joint connection).

In various implementations, the coordinate measurement machine 210 may communicate with all of the other components through a data transfer line 201 (e.g. a bus), which is connected by a connector 208 (e.g. a "micro-D" type connector) to a probe head cable 211 which provides signals to and from the CRS optical probe 215. The coordinate measurement machine 210 is controlled by the coordinate measurement machine controller 202, while the CRS optical probe 215 exchanges data with, and is controlled by, the probe signal processing and control circuit 207 (e.g. in one embodiment, a probe signal processing and control circuit including measurement signal processing and control elements 260B, as outlined above with reference to the element 160B in FIG. 1). The user may control all of the components through the computer and user interface 206.

As outlined above, and described in more detail below with respect to FIGS. 3A and 3B, the CRS optical probe 215 includes a probe electronics 275 which includes a light source and wavelength detector portion 260A (e.g. in one embodiment, a light source and wavelength detector as outlined above with reference to the element 160A, in FIG. 1), and an optical pen 220, which directs a measurement beam 296 toward a measurement surface 290. In one specific example implementation, the measurement surface 290 may comprise an internal surface of a threaded hole. Such surfaces have been difficult or impossible to measure completely and reliably with known CMM probes (e.g. a touch probe). A CRS optical probe such as that disclosed herein is able to scan and measure such surfaces with improved completeness, accuracy and versatility.

As will be described in more detail below with respect to FIG. 5, in one embodiment, data related to the optical pen and/or interchangeable optics element (e.g. identification data, calibration data, compensation data, etc.) may be stored externally to the CRS optical probe 215 (e.g. in the probe signal processing and control circuit 207.) In alternative implementations, portions of such data may be stored or otherwise encoded within portions of the CRS optical probe 215.

Figure 3A:
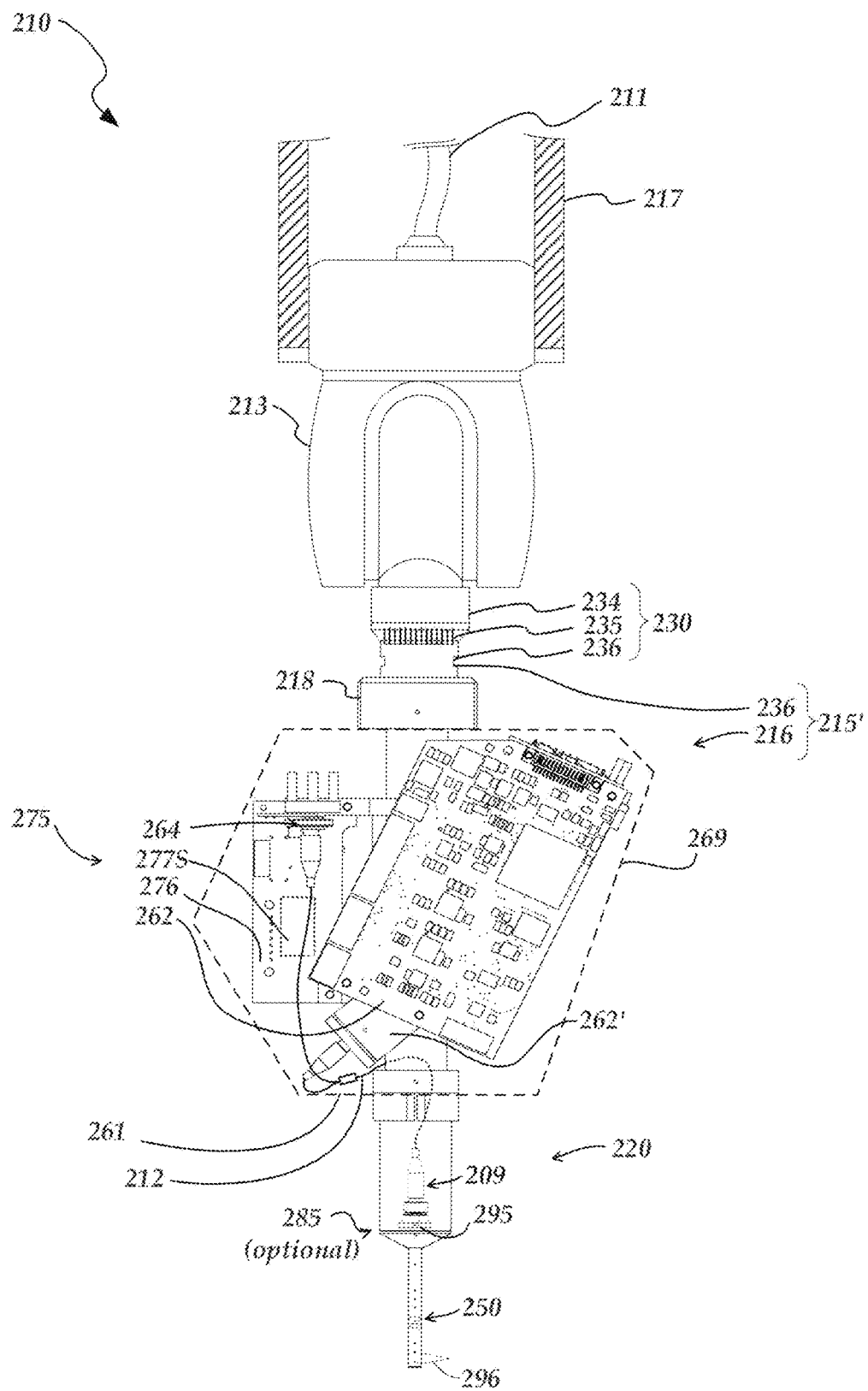
FIGS. 3A and 3B are diagrams illustrating the internal components of a first exemplary embodiment of the CRS optical probe of FIG. 2.
Figure 3B:
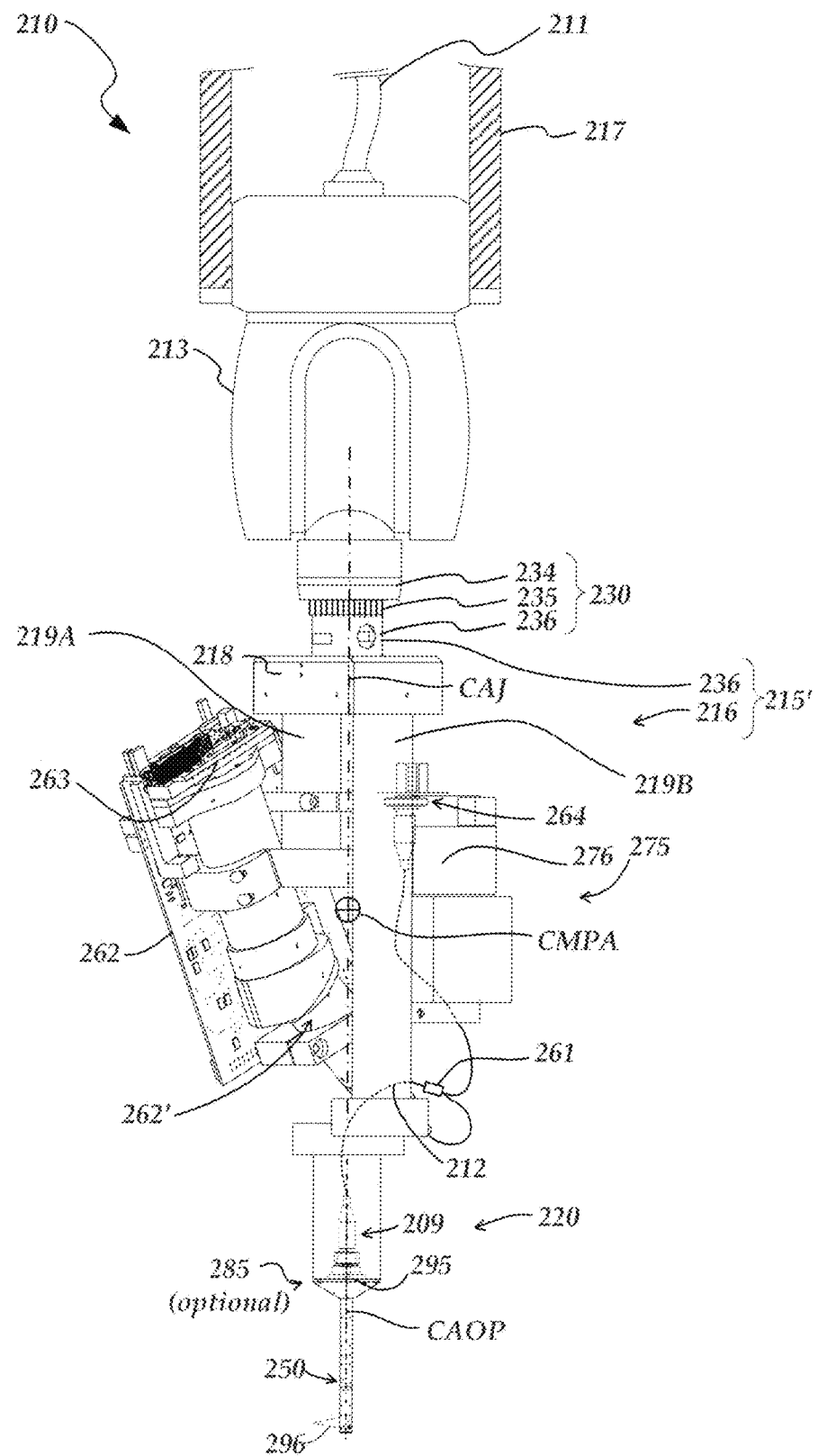

FIGS. 3A and 3B are diagrams schematically illustrating certain components of the coordinate measurement machine 210 and a CRS optical probe 215', which is similar to the CRS optical probe 215 of FIG. 2. FIG. 3A is a front view, and FIG. 3B is a view from a different angle of the coordinate measurement machine 210 and the CRS optical probe 215'. As shown in FIGS. 3A and 3B, the coordinate measurement machine 210 includes a probe head 213. The probe head 213 receives and transmits probe signals through the probe head cable 211. The probe head 213 is secured to a coordinate measurement machine quill 217. The probe head 213 is connected to the probe 215' at a probe autojoint connection 230.

The probe head 213 in some embodiments rotates in 360 degrees in a horizontal plane and contains a type of U-joint. The probe autojoint connection 230 is an electro-mechanical connection that fastens the probe head 213 rigidly and mechanically to the CRS optical probe 215', in a way such that it can be disconnected from one probe and attached to another. In one embodiment, the probe autojoint connection 230 may include first and second mating auto exchange joint elements 234 and 236, wherein the first auto exchange joint element 234 is mounted to the probe head 213, and the second mating auto exchange joint element (236) is mounted to the CRS optical probe 215'. In one embodiment, the probe autojoint connection 230 has mating electrical contacts or connections 235 so that when a probe is attached, the contacts automatically engage and make electrical connections.

The CRS optical probe 215' receives its power and control signals through the autojoint connection 230. The signals passed to the CRS optical probe 215' through the autojoint connection 230 are passed through connections 235. As shown in FIGS. 3A and 3B, the CRS optical probe 215' includes auto exchange joint element 236 and a probe assembly 216 that is mounted to the auto exchange joint element 236, for automatic connection to the CMM through the probe autojoint connection 230. The probe 215' may also include a protective cover or housing 269 (schematically illustrated). The probe assembly 216 comprises an optical pen 220, and probe electronics 275 which may comprise an electrically powered light source 264 and a wavelength detector 262, all supported by various structural members. In the embodiment shown in FIGS. 3A and 3B, the structural members extend from a base 218 that is attached to the auto exchange joint element 236. The optical pen 220 (analogous to the optical pen 120) may include a fiber optic connector 209, and a confocal optical path including an aperture 295 and chromatically dispersive optics portion 250, which outputs a measurement beam 296 (e.g., which may function as a radial distance sensing beam). In some embodiments, the optical pen 220 may include a repeatable fast exchange mount 285 which allows replacement of the chromatically dispersive optics portion 250, as described in greater detail below. The electrically powered light source 264 (e.g. a broad spectrum LED light source) may work in conjunction with known circuits (e.g. as found in commercial chromatic ranging systems) included in a probe power and signal control circuit portion 276 which is included in probe electronics 275, and which receives electrical power transmitted through the auto exchange joint element. In some embodiments, the probe electronics 275 includes a serializer 277S that allows various data signals to be serialized and communicated through the autojoint connection 230 using relatively few wires to a deserializer (included, for example, in the probe signal processing and control circuit 207), as described in greater detail below. In the embodiment shown in FIG. 3A, the serializer 277S is included on the probe power and signal control circuit portion 276. However, in other embodiments, the serializer 277S may be included with the CRS wavelength detector 262, since much of the serialized data to be transmitted is measurement spectral profile data that originates in the CRS wavelength detector 262. More generally, the serializer 277S may be located at any desired location in the probe electronics 275 that provides satisfactory noise and crosstalk characteristics.

The light source 264 generates light originating in the CRS optical probe assembly, the light comprising an input spectral profile of wavelengths routed to the optical pen 220 through the fiber optic cable 212. The CRS wavelength detector 262 may comprise known circuits (e.g. as found in commercial chromatic ranging systems) that work in conjunction with a spectrometer arrangement 262' and detector array 263 comprising a plurality of pixels distributed along a measurement axis of the CRS wavelength detector, the plurality of pixels receiving respective wavelengths reflected into the confocal optical path from the target surface and providing output spectral profile data.

It will be appreciated that a configuration such as that outlined above which generates and processes the light used for measurement entirely within the CRS optical probe assembly allows the CRS optical probe assembly to be self-contained and automatically exchangeable. In various embodiments, such a CRS optical probe system does not require or include an optical fiber connection from the CRS optical probe assembly to an outside element through the auto joint connector, or along any other makeshift path in parallel with the auto joint connector. Stated another way, in various embodiments, such a CRS optical probe assembly does not connect to or include an optical fiber that extends outside of the CRS optical probe assembly.

In various embodiments, the CRS optical probe assembly is configured such that the optical pen is mounted at a distal end of the CRS optical probe assembly. In the embodiment shown in FIGS. 3A and 3B, the CRS optical probe assembly 215' includes the base portion 218, a wavelength detector mounting portion 219A coupled to the base portion 218, and an optical pen mounting portion 219B coupled to the base portion and carrying the optical pen without carrying the wavelength detector, which may isolate heat and mass-related deflection and vibration away from the optical pen. In some embodiments, one or both of the mounting portions 219A and 219B may comprise a hollow structural tube (e.g. a carbon fiber tube) that extends away from the base portion and toward the distal end of the CRS optical probe assembly.

In one embodiment, the center of mass of the optical pen 220 is located proximate to an axis defined by the center of mass CMPA of the rest of the CRS optical probe 215' and the center axis CAJ of the probe autojoint connection 230. Such a configuration may provide for smoother operation of the probe head 213 as it is utilized to move the CRS optical probe 215' (e.g. avoiding unnecessary additional torque, vibration, deflection, etc.) In one implementation, the optical pen 220 may also be mounted relative to the probe autojoint connection 230 such that the central axis CAOP (e.g. a reference axis for measurements) of the optical pen 220 is coaxial with the central axis CAJ of the auto exchange joint 230. In such a configuration, when the CMM rotates the probe autojoint connection 230 around its axis, the optical pen 220 may also be rotated around its axis with no lateral movement of the measurement reference axis in a X-Y plane. Such a configuration may provide certain advantages (e.g. being mechanically more stable, simplifying the calculation of the location of the measurements taken with the optical pen 220 relative to the positioning by the CMM, etc.)

Figure 4A:
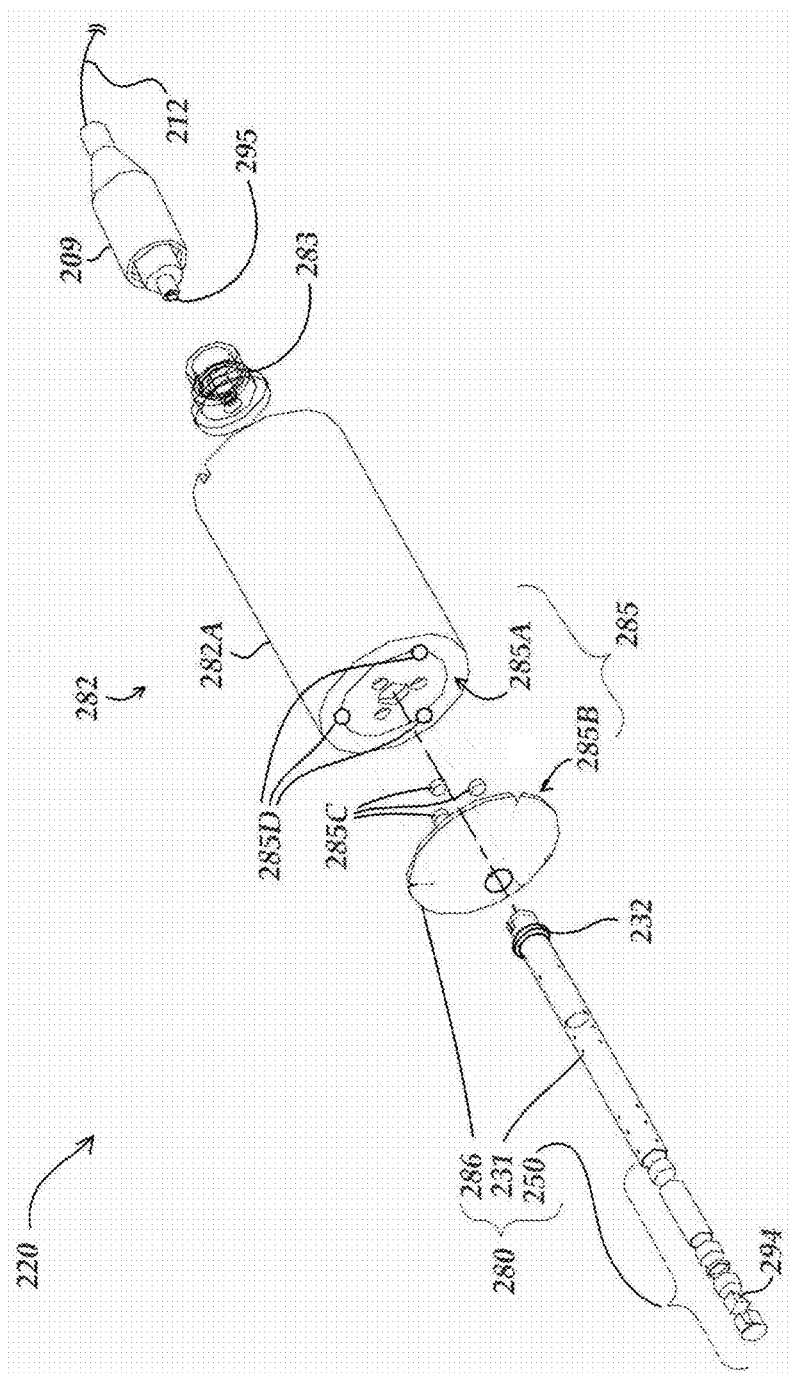
FIGS. 4A and 4B are diagrams illustrating the components of the optical pen including the repeatable fast exchange mount and the interchangeable optics element of FIGS. 3A and 3B.
Figure 4B:
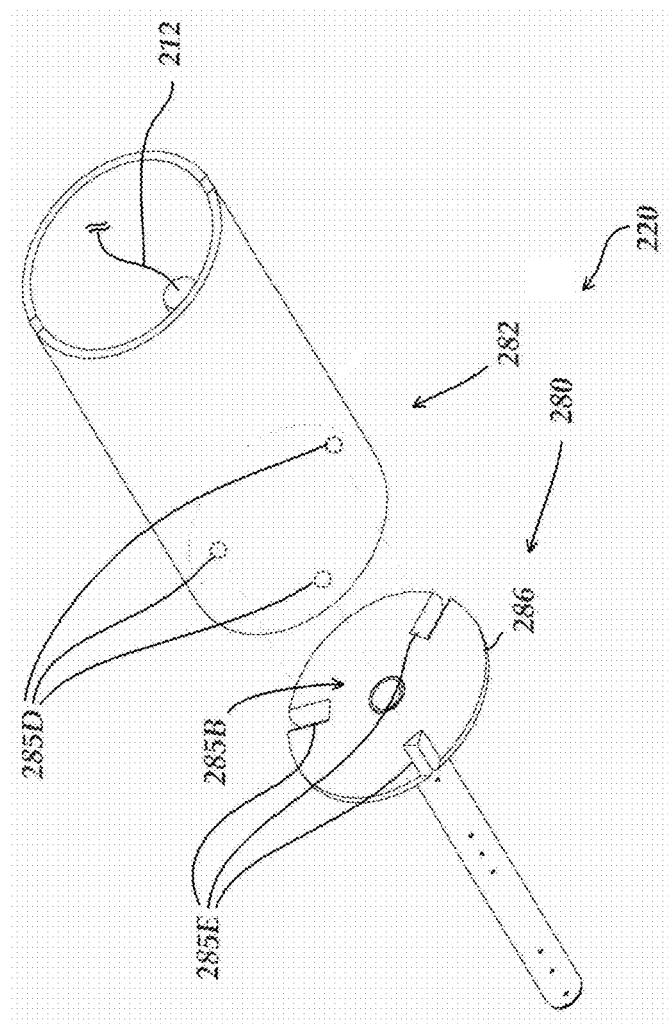

FIGS. 4A and 4B are diagrams illustrating components of the optical pen 220 of FIGS. 3A and 3B, for an embodiment that includes an exemplary repeatable fast exchange mount 285. In the embodiment shown in FIGS. 4A and 4B, the optical pen 220 includes a base member 282 and an interchangeable optics element 280. The interchangeable optics element 280 includes a front plate 286, tube 231, and chromatically dispersive optical portion 250. The base member 282 includes a base housing 282A which includes a surface which serves as a first mating half 285A of the repeatable fast exchange mount 285, and the front plate 286 has a corresponding surface which serves as a second mating half 285B of the repeatable fast exchange mount 285. In one embodiment, the second mating half 285B of the repeatable fast exchange mount 285 is forced against the first mating half 285A by a holding force arrangement comprising permanent magnets 285C mounted in one or both of the first and second mating halves 285A or 285B. More generally, the holding force arrangement may comprise known means such as spring-loaded mechanical detents, or the like. With such a configuration, the second mating half 285B may be automatically connected to and separated from the first mating half 285A under program control (e.g. as controlled by the computer and user interface 206.) For example, in one embodiment the optical pen may include a collar 232 or the like, which may be guided under program control such that it is inserted between the arms of a mating fork included on a probe rack within the motion volume of a CMM. The CMM may then move the CRS optical probe 215' such that the arms of the fork bear on the collar 232 and force the mating halves of the repeatable fast exchange mount 285 apart, leaving the interchangeable optics element 280 hanging in the probe rack. The interchangeable optics element 280 may be mounted back to the base member 282 by the reverse of these operations. In addition, with such a configuration, in the event of a lateral collision with a workpiece, the interchangeable optics element 280 will separate from the base member 282, rather than being damaged.

In one embodiment, the repeatable fast exchange mount 285 may comprise three spheres or balls 285D which are fixed in the first mating half 285A in a first triangular pattern (e.g. an equilateral triangle), and a three radially oriented V-grooves 285E which are fixed in the second mating half 285B in a mating pattern. Such an embodiment of the repeatable fast exchange mount 285 allows the interchangeable optics element 280 to be mounted with the laterally oriented measurement beam 296 facing in any of three different orientations spaced 120 degrees apart. However, it will be appreciated that such an embodiment is exemplary only, and not limiting. Various other repeatable fast exchange mounting configurations may be used, provided that adequate mounting repeatability is provided, as is generally known in the art.

The interchangeable optics element 280 includes the chromatically dispersive optical portion 250 (e.g. analogous to the chromatically dispersive optical portion 150 described above with respect to FIG. 1.) In one embodiment, the base member 282 includes the end of an optical fiber 212 that is connected to the LED light source 264 and to the spectrometer arrangement 262' through a fiber connector 261. The end of optical fiber may be located proximate to a confocal aperture 295 that is fixed relative to the first mating half 285A of the repeatable fast exchange mount 285, which may generally surround the confocal aperture 295. In some embodiments, the end of the optical fiber provides the confocal aperture. In some embodiments, the confocal aperture 295 is provided by a thin aperture that is bonded in place proximate to or abutting the end of the optical fiber (e.g. on a holder or connector that holds the optical fiber). In the embodiment shown in FIG. 4A, the base member 282 includes an optical fiber end positioning arrangement 283 comprising an optical fiber holding element 283A (e.g. a fiber optic connector that mates with the connector 209, in this embodiment) and an optical fiber end positioning arrangement 283B that are fixed (e.g. bonded) in the base member 282 proximate to the first mating half 285A of the repeatable fast exchange mount 285.

In this embodiment, the optical fiber end positioning arrangement 283 may comprise an optical fiber holding element that holds the optical fiber (e.g. through the connector 209) and fixes the end of the optical fiber and the confocal aperture 295 relative to the first mating half 285A of the repeatable fast exchange mount 285. However, in other embodiments, the confocal aperture may be separately fixed to the base member 282 and the end of the optical fiber may be fixed proximate to that confocal aperture by a suitable optical fiber end positioning element, if desired, as described in greater detail below.

The interchangeable optics element 280 receives measurement light from, and returns measurement light to, the confocal aperture 295, and provides axial chromatic dispersion of the measurement light over a respective measuring range along a measuring axis. In one embodiment, the chromatically dispersive optical portion 250 may also include a reflective element 294, which directs the measurement beam laterally to the axis of the optical pen 220 (e.g. laterally relative to the axis of the tube 231).

Figure 5:
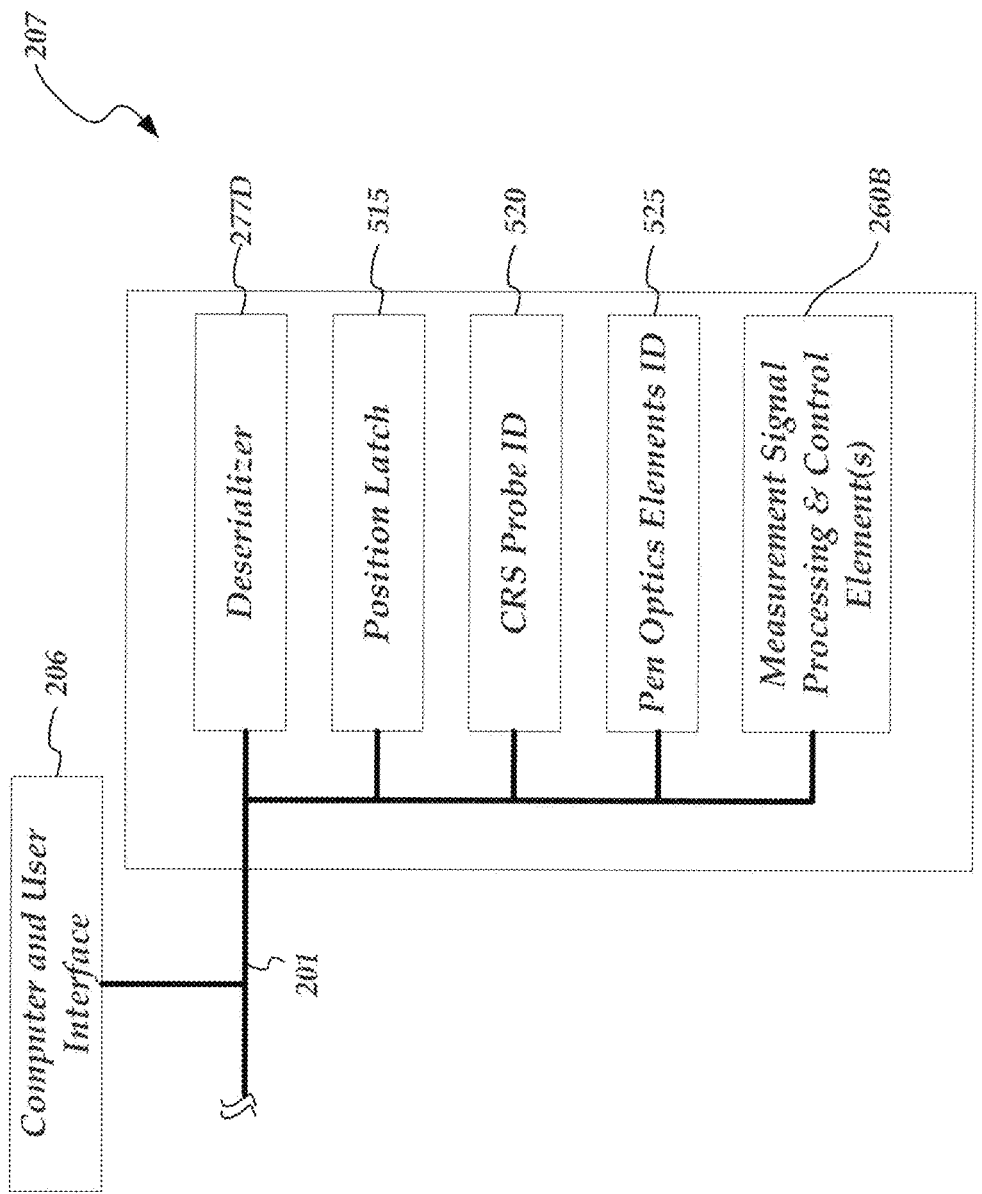
FIG. 5 is a block diagram illustrating the components of the probe controller of FIG. 2.

FIG. 5 is a block diagram of one embodiment of the computer and user interface 206 and the probe signal processing and control circuit 207 of FIG. 2. As shown in FIG. 5, the probe signal processing and control circuit 207 may include a deserializer 277D, a position latch 515, a CRS optical probe ID 520 and an optical pen ID 525. The components of the probe signal processing and control circuit 207 are coupled to one another and to the computer and user interface 206 by the data transfer line 201.

The deserializer 277D may work in conjunction with the serializer 277S shown in FIG. 3A, to allow various data signals to be serialized and communicated through the autojoint connection 230 using relatively few wires. The serializer 277S and a deserializer 277D are related to the utilization of certain low voltage differential signaling (LVDS) that may be used in some embodiments. Briefly, a synchronization signal is provided between a serializer and a deserializer, in order to ensure that they are synchronized. On the corresponding signal lines, clock signals are provided until the deserializer is finished, at which point the synchronization signal is switched, after which the relevant data signals are provided on the signal lines (as opposed to the previous clock signals.)

The position latch 515 relates to an XYZ latch signal. Briefly, an XYZ latch signal is provided for synchronizing the measurement positioning of the CRS optical probe with the measurement positioning of the coordinate measurement machine controller 202. In one embodiment, the position latch 515 communicates with the position latch 204 in the coordinate measurement machine controller 202 in order to ensure that the coordinates of the coordinate measurement machine 210 are properly synchronized. In other words, the position latch 515 and the position latch 204 combine to ensure the accuracy of the overall derived measurements, such that the CMM machine coordinates (which reflect the position of the CRS optical probe during a particular measurement) are properly combined with the CRS optical probe measurements (which are relative to the CRS optical probe position).

The CRS optical probe ID 520 is utilized for determining the identification of the CRS optical probe 215' (e.g. by reading and processing an identification signal derived from an identifying element included in the CRS optical probe 215'), and the optics elements ID 525 is utilized for determining the identification of the interchangeable optics element 280 (e.g. by reading and processing an identification signal derived from an identifying element included in the interchangeable optics element 280). The proper identification of the CRS optical probe 215' and the interchangeable optics element 280 allow proper configuration and calibration data to be utilized in order to ensure accurate operations and resulting measurements from the CRS optical probe 215' and interchangeable optics element 280.

Figure 6:
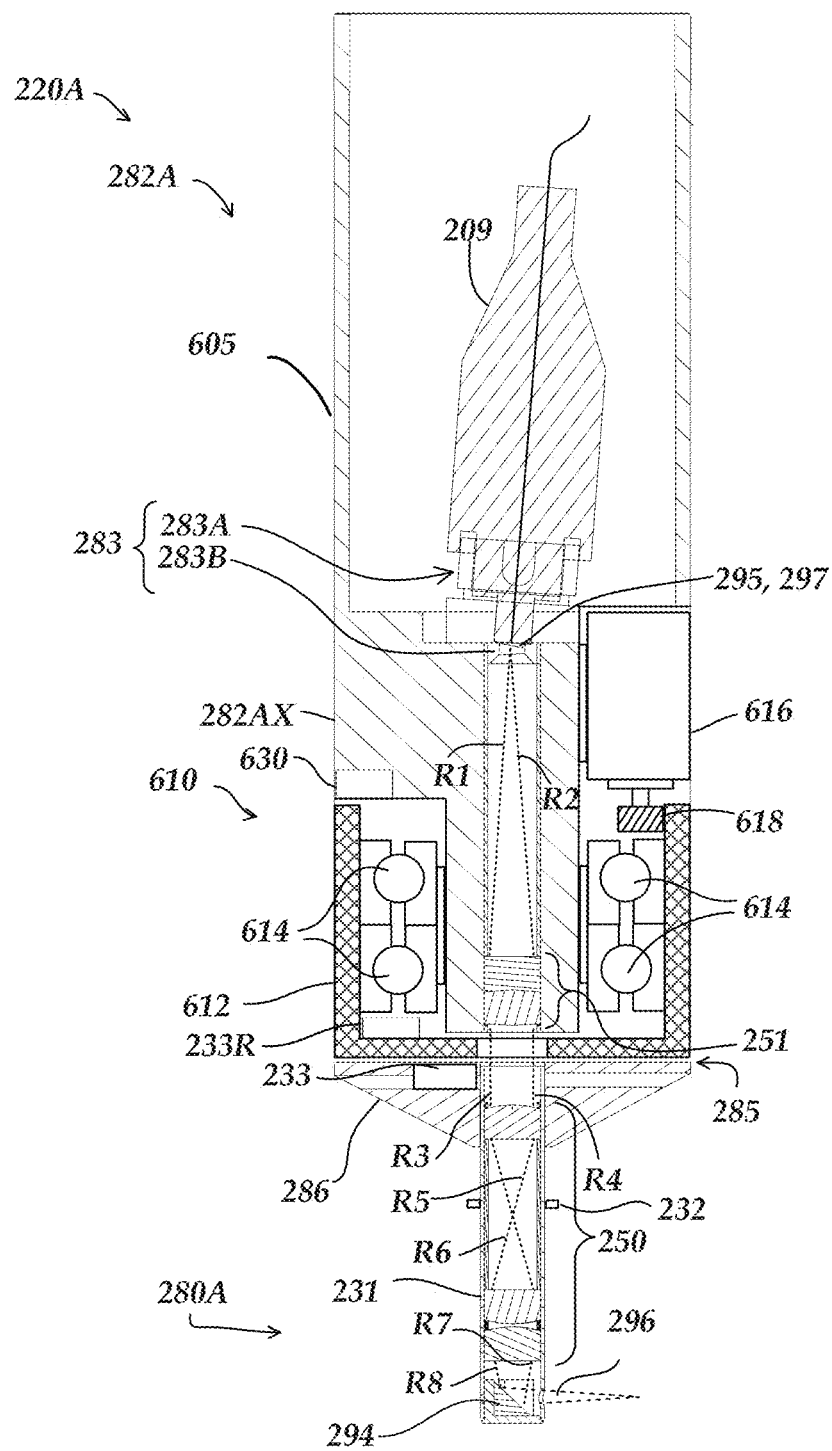
FIG. 6 is a diagram illustrating the components of an exemplary embodiment of an optical pen, which includes a rotary portion for rotating an interchangeable optics element, and an encoder for measuring and reporting position information.

FIG. 6 is a diagram illustrating the components of an exemplary embodiment of an optical pen 220A which includes a non-rotating or fixed portion 605, a rotary element 610 for rotating an interchangeable optics element 280A and the direction of the measurement beam 296, and an encoder 630 for measuring and reporting position information, such as a rotational angle of the optical pen and position information with respect to the Z axis, such as position information related to a position of a calibration object, for example as discussed in more detail with respect to FIGS. 7A to 13E, 16 and 20-27C. As shown in FIG. 6, the base member 282A is configured to include components of the non-rotating portion 605, the rotary element 610 and the encoder 630.

Some exemplary "bounding" confocal rays (or ray segments) are illustrated in FIG. 6. In particular, rays R1 and R2 are shown between a transfer lens 251 and the aperture 295, and rays R3 and R4 are shown between the transfer lens 251 and the chromatically dispersive optical portion 250. The transfer lens 251 may be a collimating or nearly collimating lens in some embodiments, and the rays R3 and R4 are shown to be approximately parallel or approximately collimated which may provide advantages in certain implementations. Rays R5 and R6 are shown within the chromatically dispersive optical portion 250, and emerge as rays R7 and R8 in the measurement beam 296. It will be appreciated that the operational position 297 of the confocal aperture is proximate to or at the best focus position of the lens system of the optical pen 220, and in particular, the focal position of the transfer lens 251, in this particular embodiment. The transfer lens 251 may be located within an extended section 282AX of the base member 282A.

As shown in FIG. 6, the rotary element 610 includes a rotating portion 612, which in this particular embodiment includes a surface for providing a first mating half of the repeatable fast exchange mount 285. The first mating half is coupled to the second mating half of the fast exchange mount 285 which is located on the front plate 286, in a similar configuration to that described above with respect to the FIGS. 4A and 4B. The rotary element 610 also includes bearings 614 which allow the rotating portion 612 to rotate, as well as a motor 616 and gears 618 for driving the rotation. Alternative configurations may also be utilized for the motor and rotation actuation (e.g., a motorized sleeve configuration, etc.). The rotation may produce smaller errors/effects when the transfer lens 251 is located in the base member 282A, due to the fact that the optical transmission of the broad collimated beam indicated by the parallel rays R3 and R4 passing through the rotation joint is less sensitive to changing alignment.

The encoder 630 senses position information indicative of positions of the components of the optical pen 220A (e.g., rotatory position information and position information with respect to the Z axis) and reports the position information, for example, via one or more cables (see probe head cable 211 of FIG. 2).

In one embodiment, the interchangeable optics element 280A may include an ID element 233 (mounted to the front plate 286, for example). A corresponding reader element 233R may be located in the optical pen base member 282A.

The ID element 233 may be encoded with particular identification information for the interchangeable optics element 280. The ID element 233 may in one embodiment comprise a radio frequency identification device (an RFID element), which may be a passive RFID element. The reader element 233R (e.g., an RFID reader element) is located in close enough proximity to be able to read the data from the ID element 233. In some embodiments, if the reader element 233R is not located adjacent to the ID element 233, a hole may be provided in the base member 282A so that the material of the base member does not obstruct the exchange of signals between the ID element 233 and the reader element 233R (e.g., radio signals, optical signals, an optical image, etc.). In some embodiments, the ID element 233 may comprise an identifying mark (e.g., a simple bar code) or color(s) and the reader element 233R may comprise a photodetector that provides a signal corresponding to the identifying mark or color(s). In some embodiments, the ID element 233 may comprise a passive resonant circuit having an identifying frequency and the reader element 233R may comprise an exciter/detector that provides a signal in response to the identifying frequency. The reader element 233R reports identification information based on the response signal, for example, via one or more cables (see probe head cable 211 of FIG. 2).

For ease of illustration, the rotary element 610 and the encoder 630 are shown in the form of functional blocks. It will be appreciated that the arrangements of the rotatory element 610, and the encoding element 630 are exemplary only, and not limiting. Various configurations may be altered to include similar components for rotating and extending the interchangeable optics elements, and reporting position information, with minor adaptations that will be apparent based on this disclosure.

In some embodiments, for calibration and accuracy purposes, the optical pen may be characterized by calibration data or information that includes or is based on radial distance data corresponding to, for example, a plurality of rotary positions of the interchangeable optics element, various focal and measurement distances associated with the optical pen 220A, the interchangeable optics element 280 and the chromatically dispersive optical portion 250, the fast exchange mount 285, etc. Such calibration data or information may compensate for various misalignments that may be a function of the rotation position, position with respect to the Z axis, and chromatic range sensor (CRS) measurement distances, and other errors (e.g., rotary encoder errors, z stage errors, etc.), as discussed in more detail below.

Figure 7A:
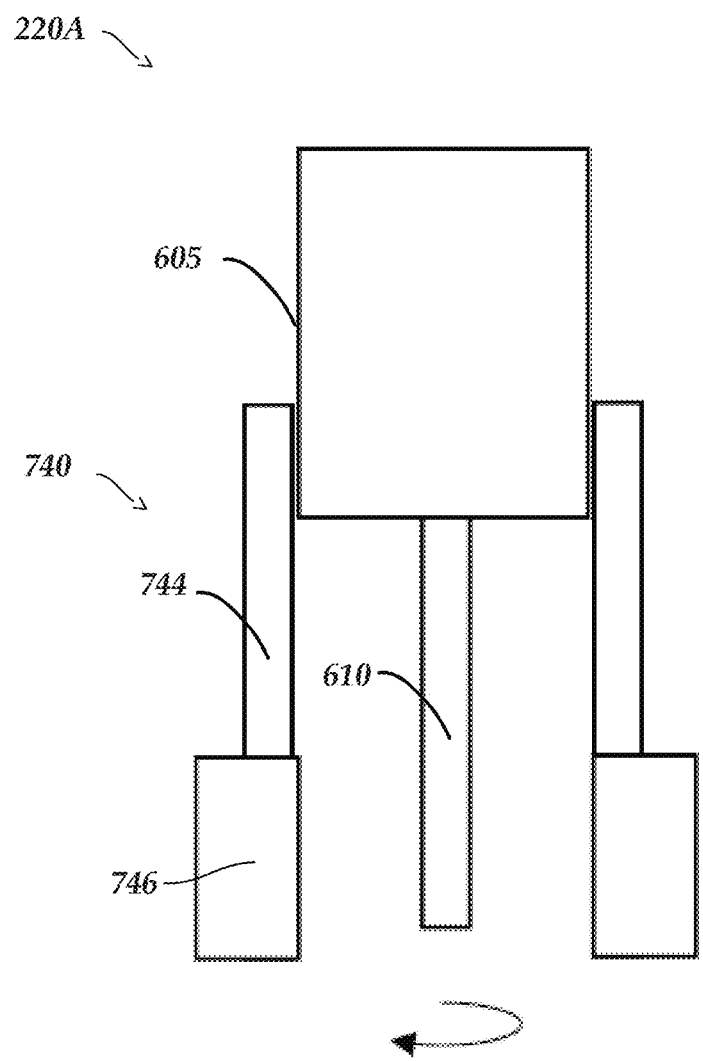
FIGS. 7A to 7C are cross-sectional diagrams illustrating exemplary calibration components of the optical pen of FIG. 6.
Figure 7B:
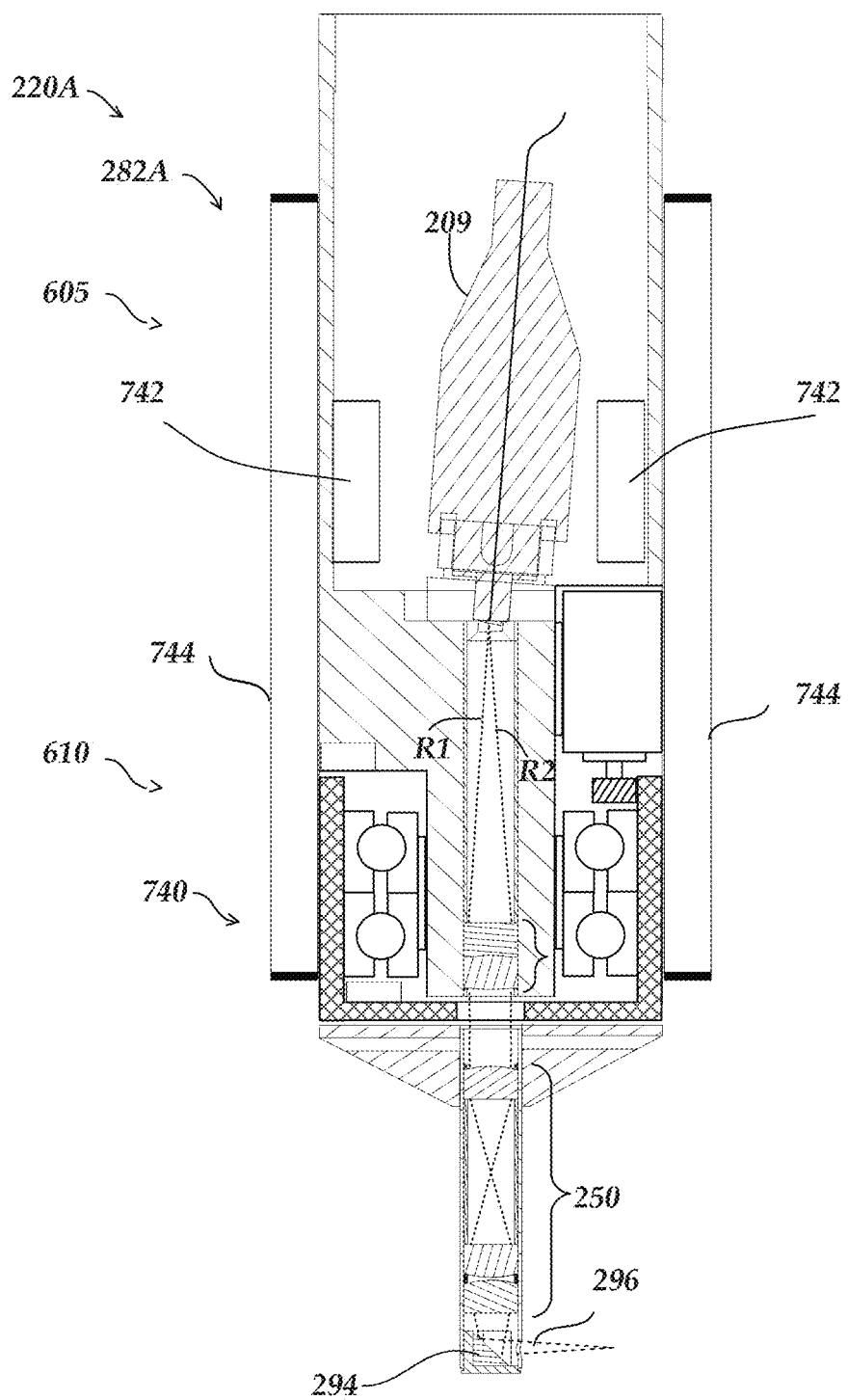
Figure 7C:
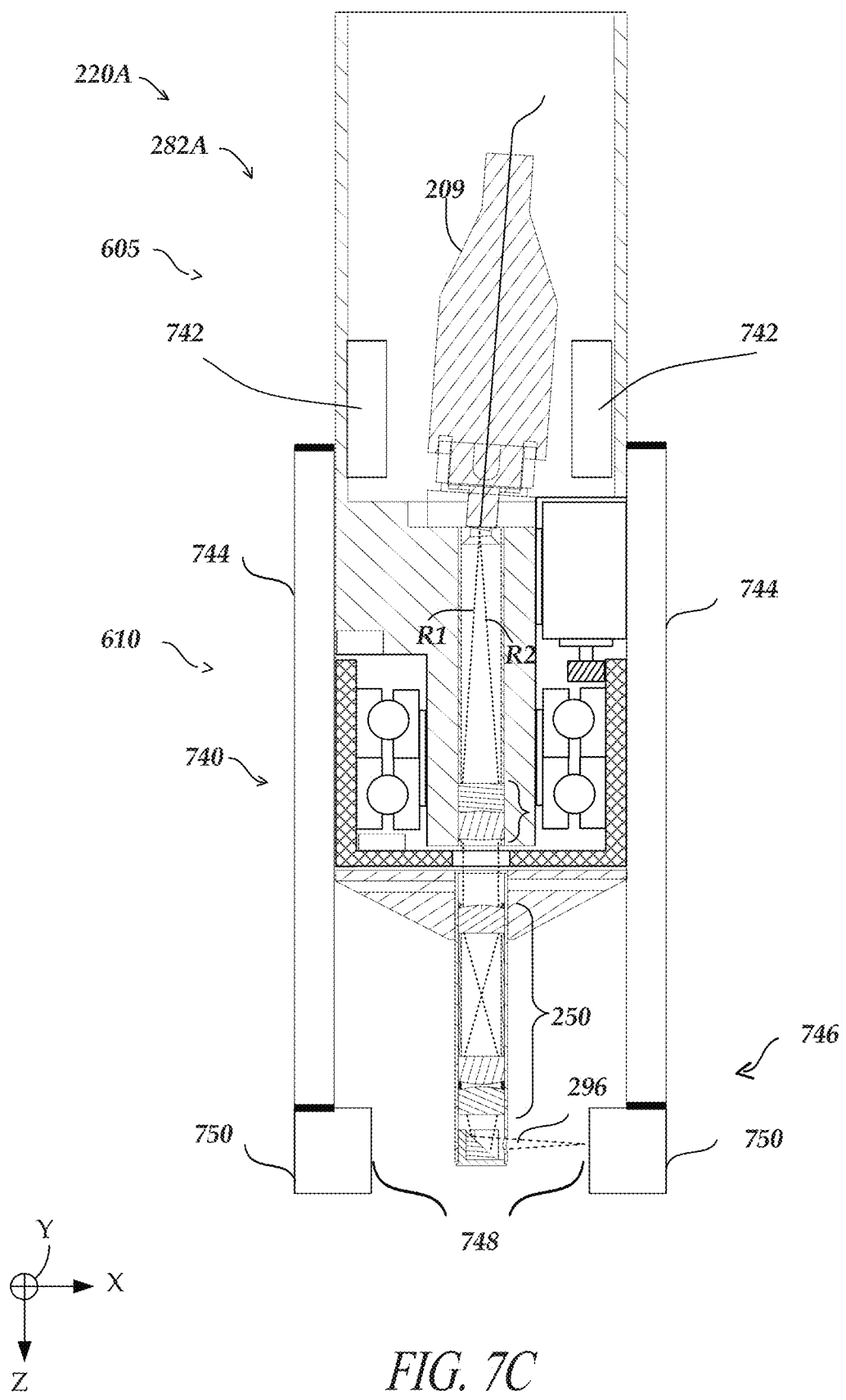

FIGS. 7A to 7C are diagrams illustrating exemplary calibration components 740 of the optical pen 220A of FIG. 6, which may be employed to obtain radial distance and other data used to calibrate the optical pen 220A. FIG. 7A is a conception diagram to provide an overview of the structure of an optical pen including calibration components, while FIGS. 7B and 7C provide more detailed illustrations of example embodiments. As illustrated in FIG. 7A, an optical pen 220A has a non-rotating or fixed portion 605 and a rotating portion 610. The calibration components 740 include a calibration gauge extension 744, movably attached to the non-rotating portion 605 of the optical pen 220A, and a calibration gauge or object 746. The calibration gauge 746 as illustrated is a cylindrical calibration object held in position relative to the rotating portion 610 of the optical pen 220A by calibration gauge extension 744. As the rotating element 610 rotates about the central axis of the optical pen 220A (the reference axis for the taking of measurements), measurements of the calibration object are taken (e.g., utilizing a measurement beam 296 as illustrated in FIG. 7C) to obtain radial distance measurements used to calibrate the optical pen 220A.

The calibration gauge extension 744 may use various holding force arrangements to hold a calibration object 746 in position relative to the rotating chromatic range sensor configuration of the optical pen 220A. For example, mechanisms similar to those discussed above with respect to the repeated fast exchange mount 285 may be employed. With such a configuration, the calibration object 746 may be automatically connected to, positioned, and separated from the calibration gauge extension 744 under program control (e.g. as controlled by the computer and user interface 206.)

As shown in FIGS. 7B and 7C, the calibration components 740 also include an extension actuator 742, which may include bearings, motors and gears (while these are not shown for ease of illustration, the bearings 614, motor 616 and gears 618 are analogous components of the rotary element 610 of FIG. 6) to facilitate positioning of the calibration gauge extension 744 between a storage position (as shown in FIG. 7B) and an extended calibration position (as shown in FIGS. 7A and 7C). FIG. 7B illustrates an example configuration in which the calibration gauge extension 744 is in the storage position and is not currently coupled to a calibration object 746'. During calibration operations employing a calibration gauge or object 746', the calibration gauge extension 744 may be moved into the extended calibration position. Otherwise, the calibration gauge extension 744 may be stored in the storage position, so as not to interfere with other measurements taken using the optical pen 220A (e.g., measurements of the internal surfaces of a threaded hole, as discussed above with reference to FIG. 2). As noted above, in one implementation, when the calibration gauge extension 744 is moved to the extended calibration position, it may be coupled to a calibration object 746', as illustrated in FIG. 7C.

In some embodiments, the optical pen 220A and the calibration object 746' are configured such that the calibration object 746' may be retained on the optical pen. For example, the calibration object 746' may be retained on the calibration gauge extension in a retracted position during a retracted time period, such that the calibration gauge extension 744 and the calibration object 746' do not obstruct or interfere with the radial distance sensing beam (i.e., the measurement beam 296) during normal measurement operations during the retracted time period. At a calibration time period, the calibration object 746' may be moved and retained on the calibration gauge extension in a calibration position.

In some embodiments, the calibration gauge extension 744 may be positioned by the extension actuator 742 in one of a plurality of extended calibration positions, to facilitate gathering calibration radial distance at different CRS measurement distances or focal lengths. In such circumstances, the encoder may report Z axis position information related to the position of the calibration object with respect to the optical pen 220A. In a manner similar to that discussed above with respect to the interchangeable optics element 280A, the calibration object 746' may include an ID element, and the calibration gauge extension 744 may include a corresponding reader element.

Alternative configurations may also be utilized for the extension actuator 742 (e.g., a motorized sleeve configuration, etc.). In some embodiments, the calibration gauge extension 744 arranges a calibration gauge or object 746' in a constrained relationship relative to the rotating chromatic range sensor configuration of the optical pen 220A, as discussed in more detail below.

As illustrated in FIG. 7C, a calibration gauge or object 746' comprises a cylindrical ring gauge having an inside surface 748 and an outside surface 750. Other calibration objects may be employed, and various materials (e.g., metals, glass, etc.) may be employed in a calibration object. In an embodiment, one or more of the inside surface 748 and the outside surface 750 may contain printed markings or patterned surfaces (e.g., see FIGS. 9A-9D) or various combinations thereof, which, when scanned by the measurement beam 296, provide calibration data that may be used to generate calibration information related to the optical pen 220A.

Figure 8A:
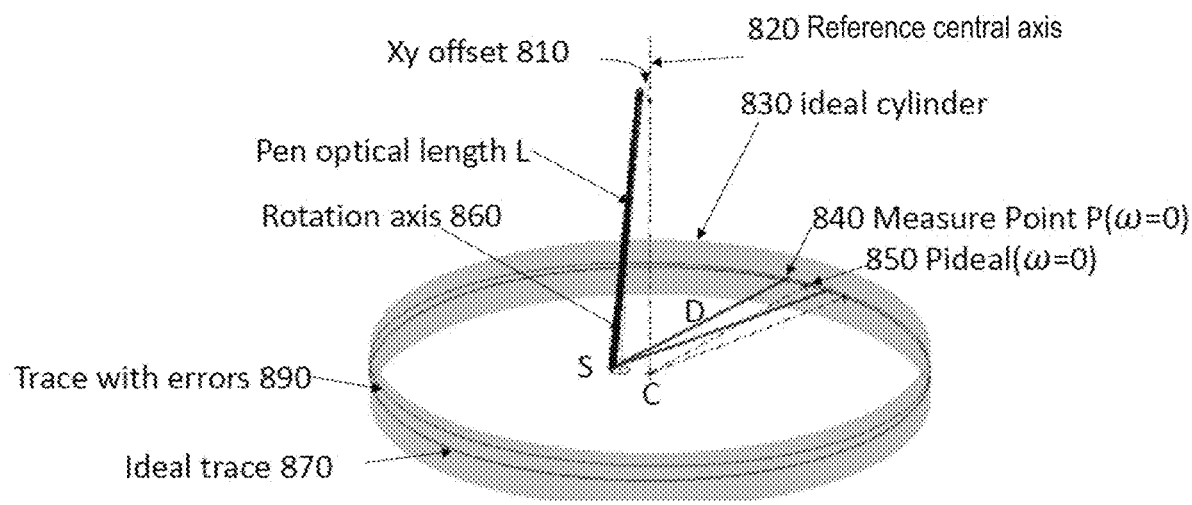
FIGS. 8A to 8C are conceptual diagrams illustrating example misalignments that may result in measurement errors when using a rotating optical pen to take measurements and parameters which may be taken into consideration to compensate for such errors.
Figure 8B:
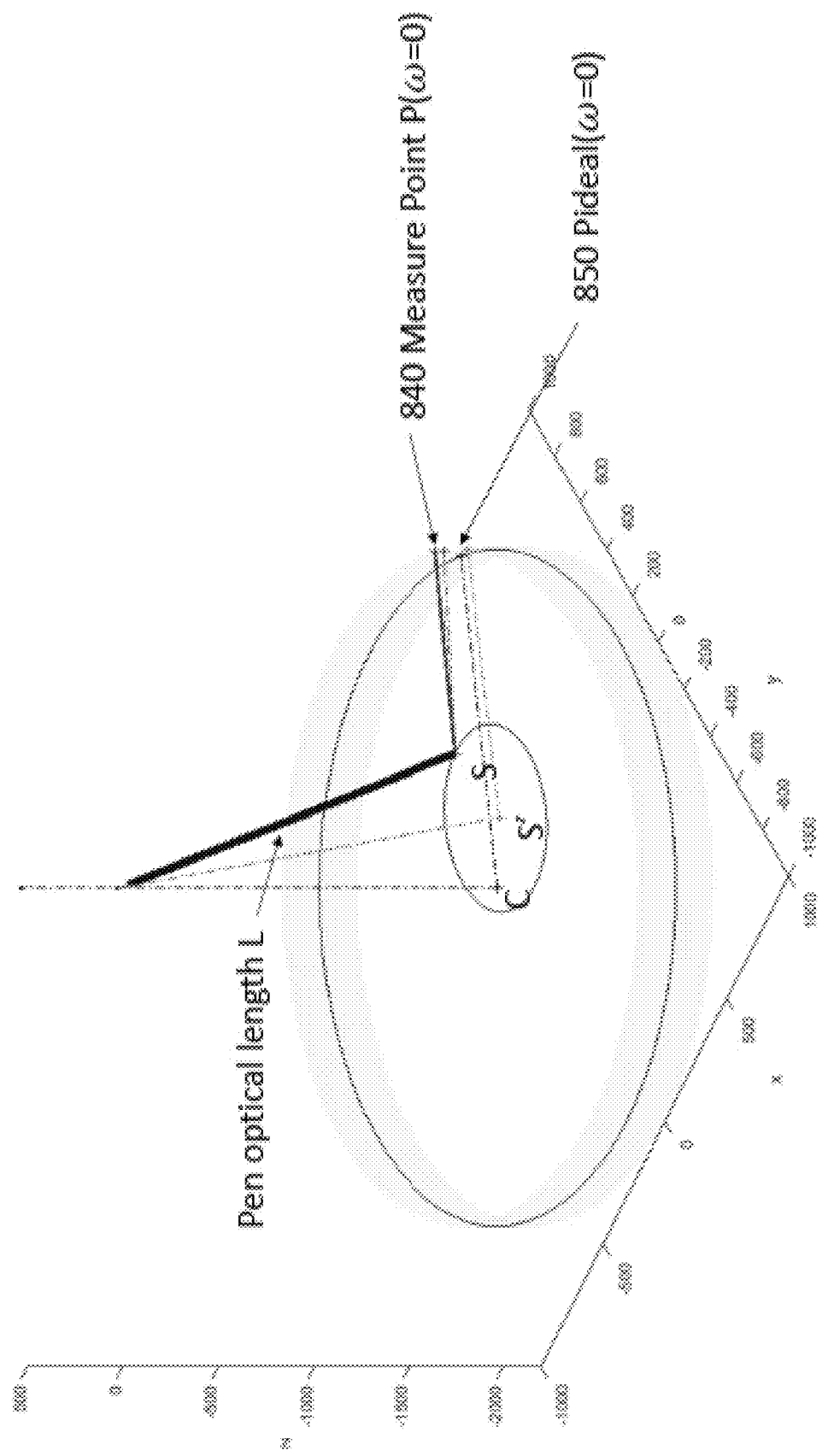
Figure 8C:
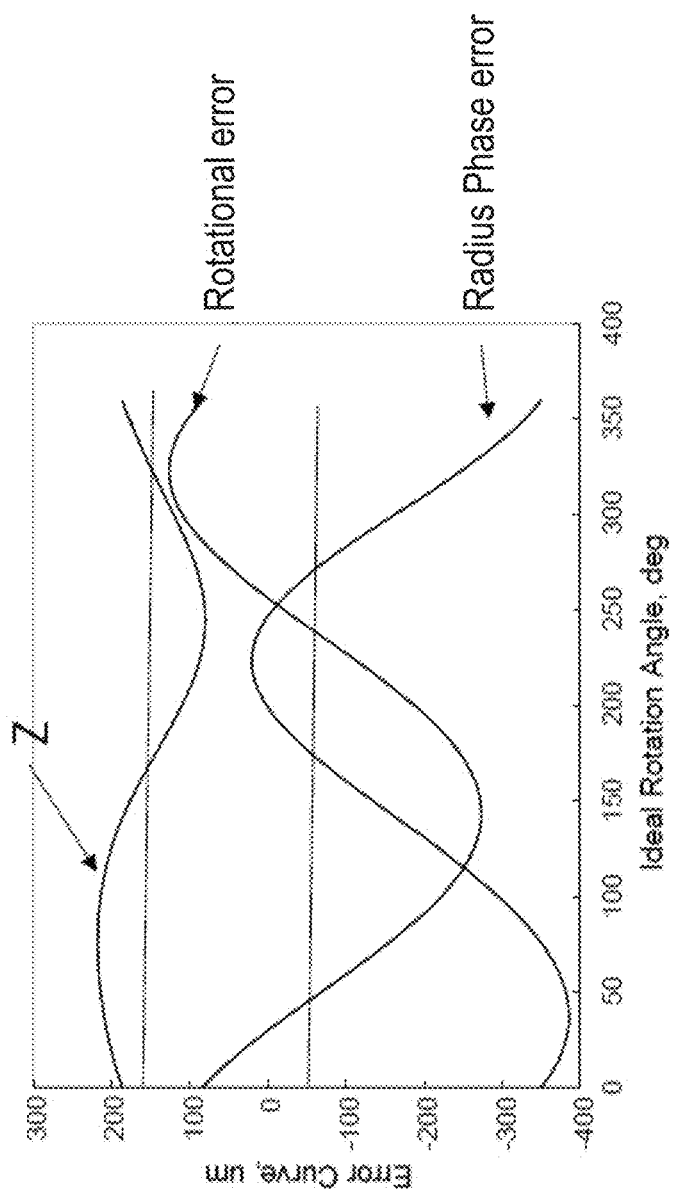

FIGS. 8A to 8C are conceptual diagrams illustrating in an exaggerated manner some example misalignments that may result in measurement errors when using an optical pen to take measurements, and parameters which may be taken into consideration to compensate for such errors. As shown in FIG. 8A, in an ideal case an optical pen (see optical pen 220A of FIG. 6) has a reference central axis 820. When taking measurements of a surface of an ideal cylinder 830, the reference central axis 820 is aligned with an ideal center C of the ideal cylinder 830, and an incidence angle of the measurement beam (see measurement beam 296 of FIG. 7C) is an ideal constant with respect to the normal of the surface of the ideal cylinder 830. Ideal measurements would indicate distances from the ideal center C to ideal points along an ideal trace 870 of the ideal cylinder 830. Example ideal points along an ideal trace 870 are illustrated in FIGS. 8A and 8B, including an ideal point Pideal 850 at a rotational angle $\omega=0$.

Misalignments of the optical pen or other components, however, may introduce measurement errors (e.g., as may be caused by various factors, such as misalignments of the fast exchange mount 285, etc.). For example, the optical axis of an optical pen may have an xy offset 810 from a reference central axis 820, and the rotational axis 860 of the optical pen along the optical pen length L may be misaligned with respect to the reference central axis 820 of the optical pen 220A. In addition, the reflective element 294 (see FIGS. 2 and 7B) may be misaligned from the optical axis of the optical pen. As a result, measurements taken with respect to measurement points may be taken from position S which orbits around a non-ideal center S', as illustrated in more detail in FIG. 8B. These, along with other possible misalignments, as illustrated in more detail in FIG. 8B, result in the measurement points being on a non-ideal trace, or a trace with errors 890. Example measurement points having associated misalignment errors are shown in FIGS. 8A and 8B, including a measurement point 840 at a rotational angle $\omega=0$. In order to better illustrate certain aspects, the examples in the provided illustrations include certain exaggerated geometries (e.g., the Z axis has been compressed to better illustrate the potential misalignments and errors, etc.) FIG. 8B illustrates additional details of example misalignments that can cause harmonic errors. Here, a reference central axis m (i.e., a mounting axis) corresponds to the reference central axis 820 of FIG. 8A. A rotation axis r corresponds to the rotation axis 860 of FIG. 8A. An optical axis o is illustrated as lying collinear with the pen optical axis along pen optical length L. The axis designations m, r and o are used in subscripts for various misalignment parameters, some of which are illustrated in FIG. 8B. The mounting axis misalignment angle $\theta_m$ gives the misalignment angle of the mounting axis m relative to the rotational axis r occurring within a plane containing the rotational axis and oriented at a mounting axis misalignment rotational orientation angle $\phi_m$ (not shown in the illustration). The rotational axis misalignment angle $\theta_r$ gives the misalignment angle of the optical axis o relative to the rotational axis r occurring within a plane containing the rotational axis and oriented at a rotational misalignment orientation angle $\phi_r$ (not shown in the illustration). The final measurement beam leaving the pen can also have pointing errors designated by output normal elevation (nominally vertical direction) angle error $\delta\theta_o$ and output normal rotational (nominally horizontal direction) axis error $\delta\phi_o$ (not shown).

FIG. 8C illustrates, using the same exaggerated geometries shown in FIG. 8B, an example of first harmonic errors that may be introduced by various misalignments of the optical pen. For this example, as tabulated, the optical pen has an X axis offset $\delta x$ of 50 µm, a Y axis offset $\delta y$ of −40 µm, which make up the x and y components of xy offset 810 in FIG. 8A. The other tabulated parameters are defined in the description of FIG. 8B above and have the example (exaggerated) values for a mounting axis misalignment angle $\theta_m$ of 6°, for a mounting axis misalignment rotational orientation angle $\phi_m$ of 240 µm, a mounting axis clocking error of $\delta\phi_m$ (not shown) of 5°, an ideal optical pen length L of 2000 µm (shortened to exaggerate errors in FIG. 8B), a rotational axis misalignment angle $\theta_r$ of 8°, a rotational axis misalignment orientation angle $\phi_r$ of 40°, an output normal rotational axis error $\delta\phi_o$ of 10°, an output normal elevation angle error $\delta\theta_o$ of 5°, and an ideal calibration measurement distance of 1000 µm. To a degree, the rotational related errors (symbol $\phi$) are coupled to rotational offset errors and phase of the harmonic errors, and the axis misalignments and elevation angle errors (symbol $\theta$) are coupled to radius and Z offset and harmonic amplitude errors. As illustrated, the radius error is primarily a first harmonic that as illustrated oscillates around a radius offset error of approximately −180. The Z error is primarily a first harmonic error that oscillates around a constant Z error offset, which as illustrated is an offset constant of approximately 180 µm. The rotational error is primarily a first harmonic that as illustrated oscillates around a rotational offset constant of approximately −50 µm. All three curves may also have a small amount of higher order harmonic content. It will be appreciated that in this example various aspects have been exaggerated in order to better illustrate the potential misalignments and resulting errors. In certain implementations, actual misalignments may be on the order of 0.1 to 1 degree, and actual errors (other than from xy offset) may be on the order of single digit micrometers or smaller.

As discussed in more detail elsewhere herein, radial distance measurements taken of a calibration object at given rotational angle wo and optionally Z may be used to generate calibration data. The calibration data may in turn be used to adjust measurement data (e.g., radial distance data) obtained when an optical pen of a coordinate measurement machine is used to take measurements of a workpiece. Calibration data in addition to radial distance data generated using a calibration object may be employed as part of or to generate calibration information. For example, measurements taken using an interferometer to determine chromatic range sensor distances associated with an optical pen (e.g., measurement distances at various light wave frequencies) or with the calibration object, may be employed in some embodiments. In another example, Z axis information related to a position of a calibration object with respect to an optical pen may be employed in some embodiments. In another example, radial distance measurements taken of multiple calibration objects, such as measurements taken of multiple cylindrical calibration objects, measurements taken of multiple spherical calibration objects, or measurements taken of multiple types of calibration objects (e.g., measurements taken of a cylindrical calibration object and of a spherical calibration object), may be employed in some embodiments.

Figure 9A:
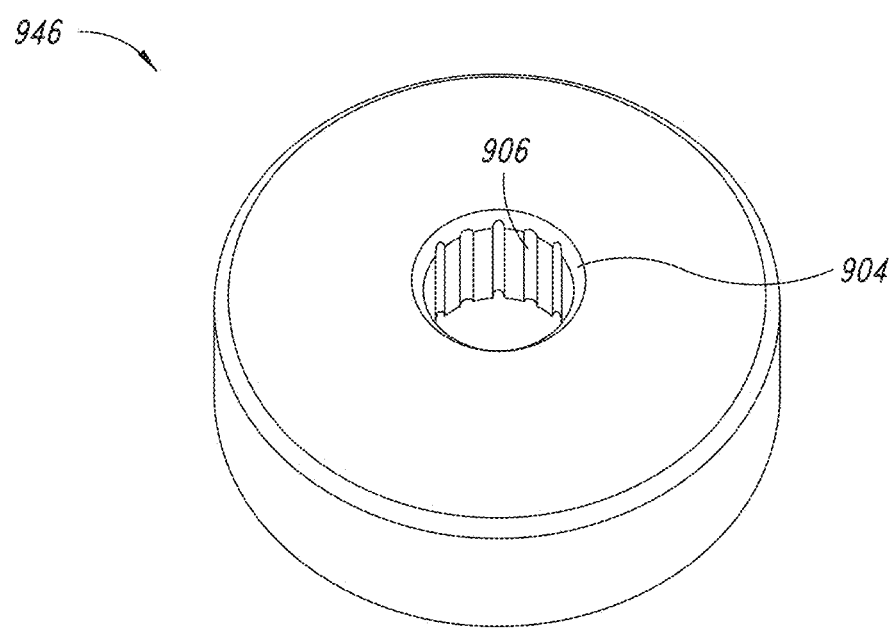
FIGS. 9A to 9D illustrate an example embodiment of a calibration object which takes a form of a ring gauge.
Figure 9B:
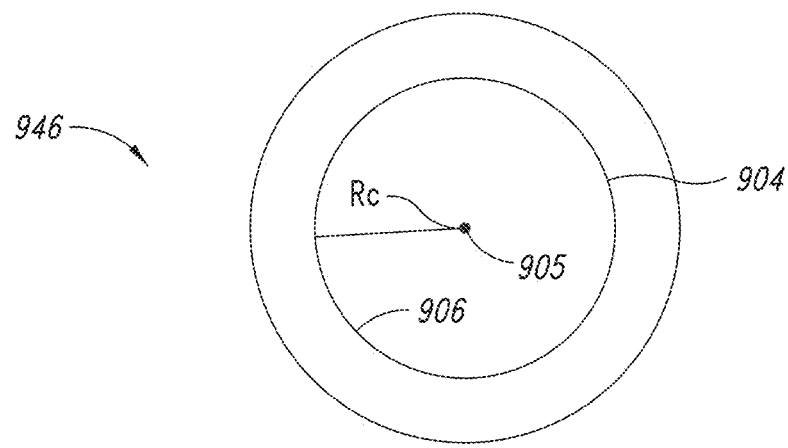

FIG. 9A to 9D illustrate a first embodiment of a calibration object 946 in the form of a cylindrical ring gauge. FIG. 9A is a perspective diagram and FIG. 9B is a cross-sectional diagram of a cylindrical ring gauge 946. The cylindrical ring gauge 946 has an inner surface 904 which has known features having known positional relationships with each other, such as a printed or textured pattern 906. The inner surface 904 is a nominally cylindrical calibration surface having a central axis 905 that extends along a Z direction that is intended to be aligned approximately parallel to the rotation axis of a CRS optical pen when calibration measurements are performed (e.g., see reference central axis 820 and rotation axis 860 of FIG. 8A). The first nominally cylindrical calibration surface 904 as illustrated is arranged at a known first radius Rc from the central axis 905 that extends along the Z axis.

Figure 9C:
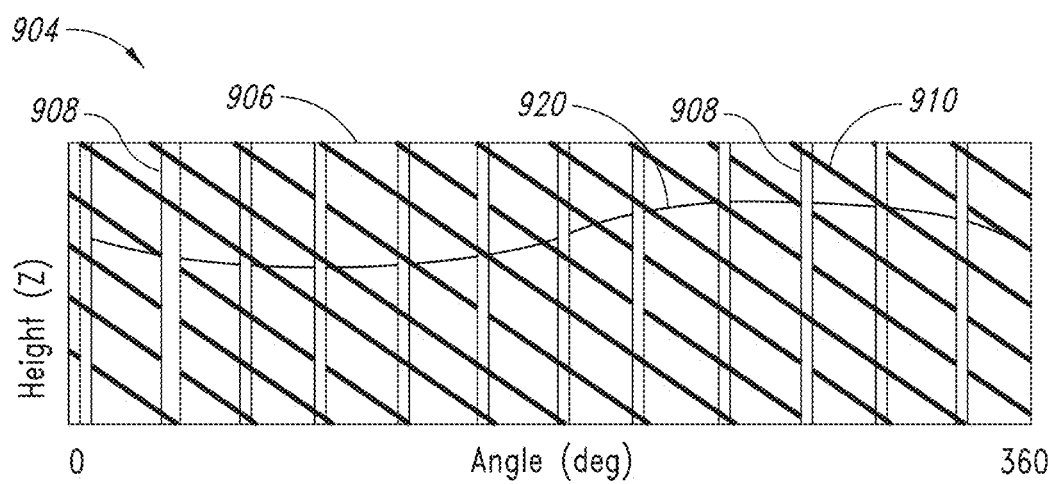
Figure 9D:
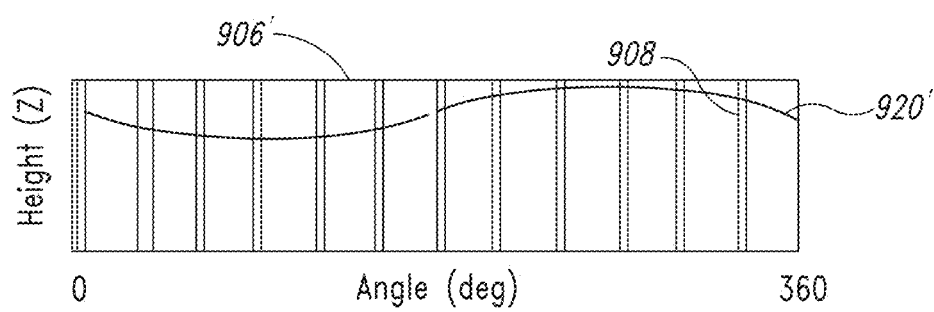

Example patterns are conceptually illustrated in FIGS. 9C and 9D, which show example patterns in the form of a rolled-out print proof or bore map of a pattern to be applied to or formed in the inner surface 904. The printed or textured pattern 906 may include a first set of angular reference features (e.g., reference lines, etc.) formed on or in the first nominally cylindrical calibration surface, wherein the angular reference features are configured to be sensed by the radial distance sensing beam and are located at known angles or known angular spacings around the central axis from one another on or in the first nominally cylindrical calibration surface. The features of the patterns can be detected by an optical pen, such as the optical pen 220A of FIGS. 7A to 7C. For example, black and white, grayscale or different colors in printed patterns, different depths or shapes of textured patterns, and various combinations thereof may be employed in various embodiments.

As illustrated in FIG. 9C, the pattern 906 has rotational indicator or vertical reference lines 908 spaced apart at known intervals, which may be regular or irregular, and Z axis indicator or angled reference lines 910 spaced apart at known intervals, which may be regular or irregular. The vertical lines 908 provide rotational positional calibration information and angled lines 910 provide z-axis positional calibration information in relation to the rotational indicator or vertical reference lines 908. The lines 908, 910 may have uniform thicknesses or may have varying thicknesses. For example, one of the vertical lines 908 as illustrated is a reference line having a different thickness than the other vertical lines to indicate a particular rotational position on the calibration gauge 946. Multiple reference lines may be employed to indicate multiple specific positions on the calibration gauge (e.g., a midpoint). When the pattern is a textured pattern, the pattern 906 of FIG. 9C may represent a bore map indicating positions of indentions or protrusions formed in the inner surface 904 of the calibration object. In certain implementations, the inner surface 904 may otherwise be smooth.

For ease of illustration, the vertical lines 908 of the pattern 906 of FIG. 9C are shown as white bars and the diagonal lines 910 are shown as black bars. In practice for printed pattern embodiments, the same color may be used for both types of bars (e.g., black), various colors may be used for both types of bars (e.g., to indicate an angular position associated with the bar), etc., and various combinations thereof. As noted above, for textured patterns, indentions may be employed, which may have different widths and depths to facilitate the measurement of calibration information.

FIG. 9C also illustrates an example calibration measurement trace 920. Positional information related to the measurement trace 920 taken by the optical pen 220A (e.g., position information provided by the encoder 630 of FIG. 6 as the measurements related to the trace 920 are taken) may be used together with measurement results associated with the trace 920 (e.g., radial distance measurement data, Z position measurement data) as calibration data or information or to generate calibration data or information, for example based on differences between the measured results and ideal results at respective measurement positions.

The pattern 906' of FIG. 9D is similar to the pattern 906 of FIG. 9C, except that the pattern 906' does not include the angular lines 910 of the pattern 906 of FIG. 9C, and thus the trace 920' measures the calibration information related to the calibration object using only the vertical lines 908. Z-axis calibration information, if desired, may be obtained through other means, e.g., detecting the edge of the top or the bottom surface of the calibration object 946 as the calibration object is moved into position, etc. Other patterns may also or alternatively be employed (e.g., angled grids, horizontal plus angular lines, etc.) in some embodiments.

Figure 10:
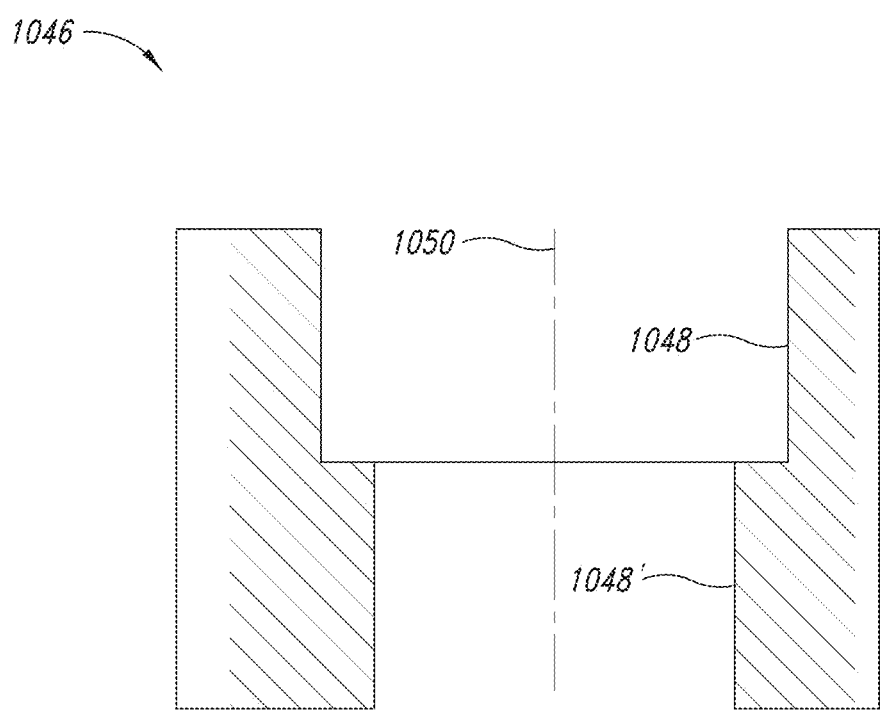
FIG. 10 illustrates an example embodiment of a calibration object which takes a form of a stepped ring gauge.

FIG. 10 is a cross-sectional view of a second embodiment of a calibration object 1046 having a central axis 1005. The calibration object 1046 is a stepped diameter ring gauge having a first inner surface 1048 with a first diameter, and a second inner surface 1048' with a second diameter, smaller than the first diameter. One or both of the first inner surface 1048 and the second inner surface 1048' may be a patterned surface (e.g., having printed or textured pattern, see FIGS. 9C and 9D), for use in the taking of calibration measurements. The use of a stepped diameter ring gauge 1046 facilitates taking calibration measurements at multiple measurement distances, as well as the taking of Z axis-related calibration measurements. The calibration gauge extension 744 (see FIGS. 7A-7C), may position the calibration gauge 1046 at a first extended position with respect to the measurement beam 296 to facilitate the taking of calibration readings of the first inner surface 1048, and may position the calibration gauge 1046 at a second extended position with respect to the measurement beam 296 to facilitate the taking of calibration readings of the second inner surface 1048'. Detection of transitions between the first inner surface 1048 and the second inner surface 1048' may be used to obtain Z-axis calibration information in some embodiments.

Figure 11A:
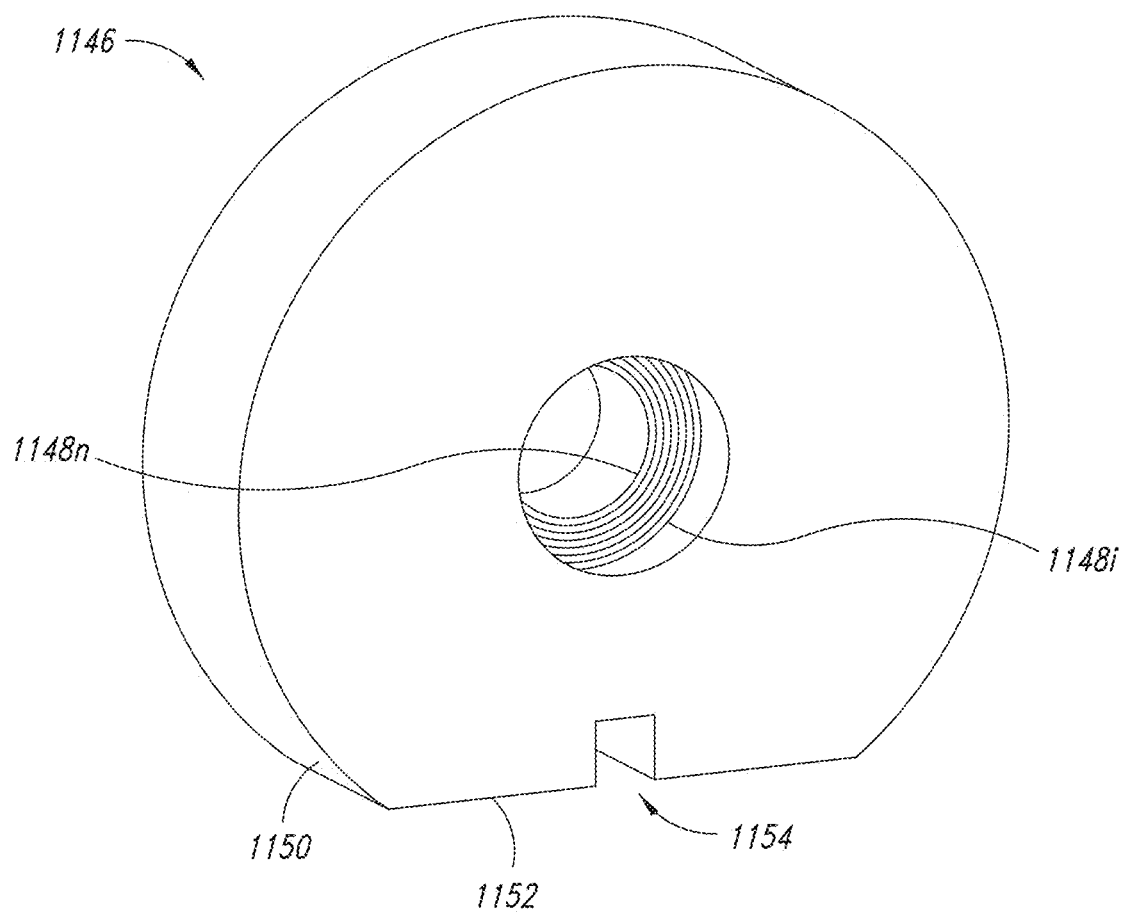
FIGS. 11A to 11C are cross-sectional and conceptual diagrams illustrating another example embodiment of a calibration object which takes a form of a stepped ring gauge.
Figure 11B:
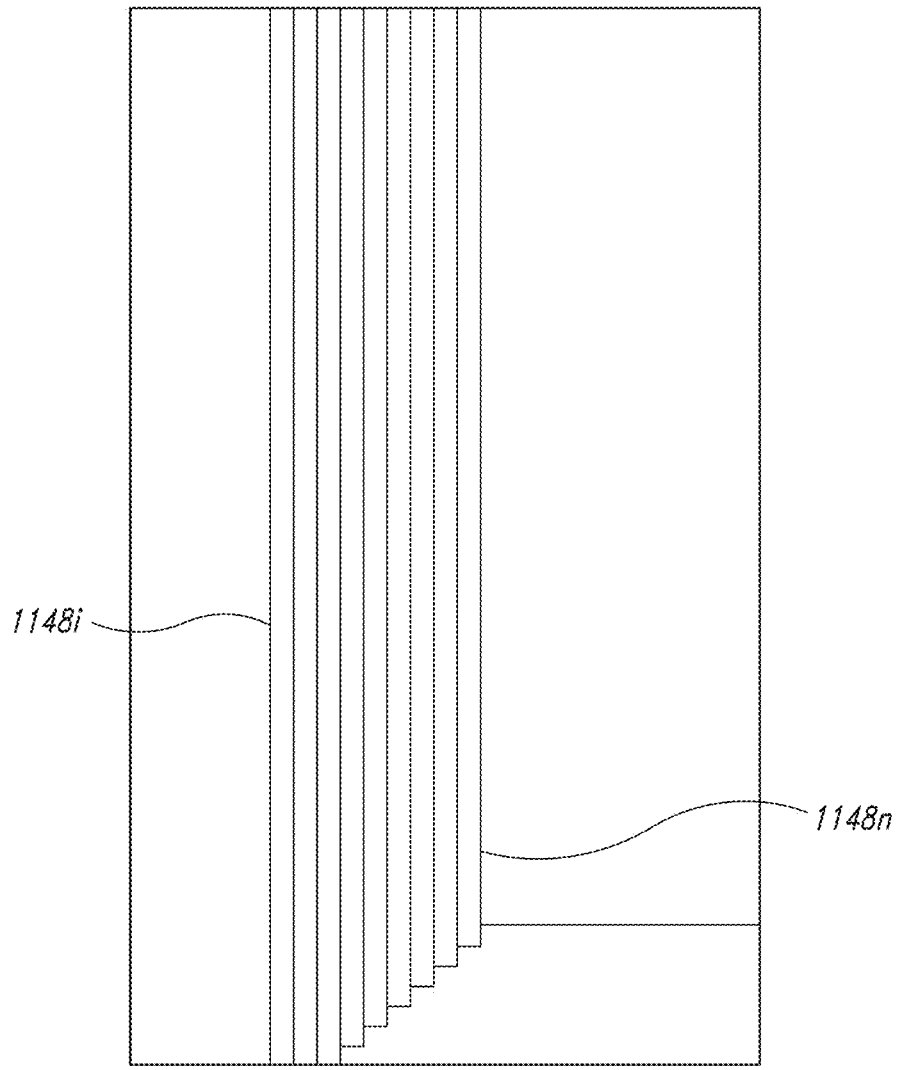
Figure 11C:
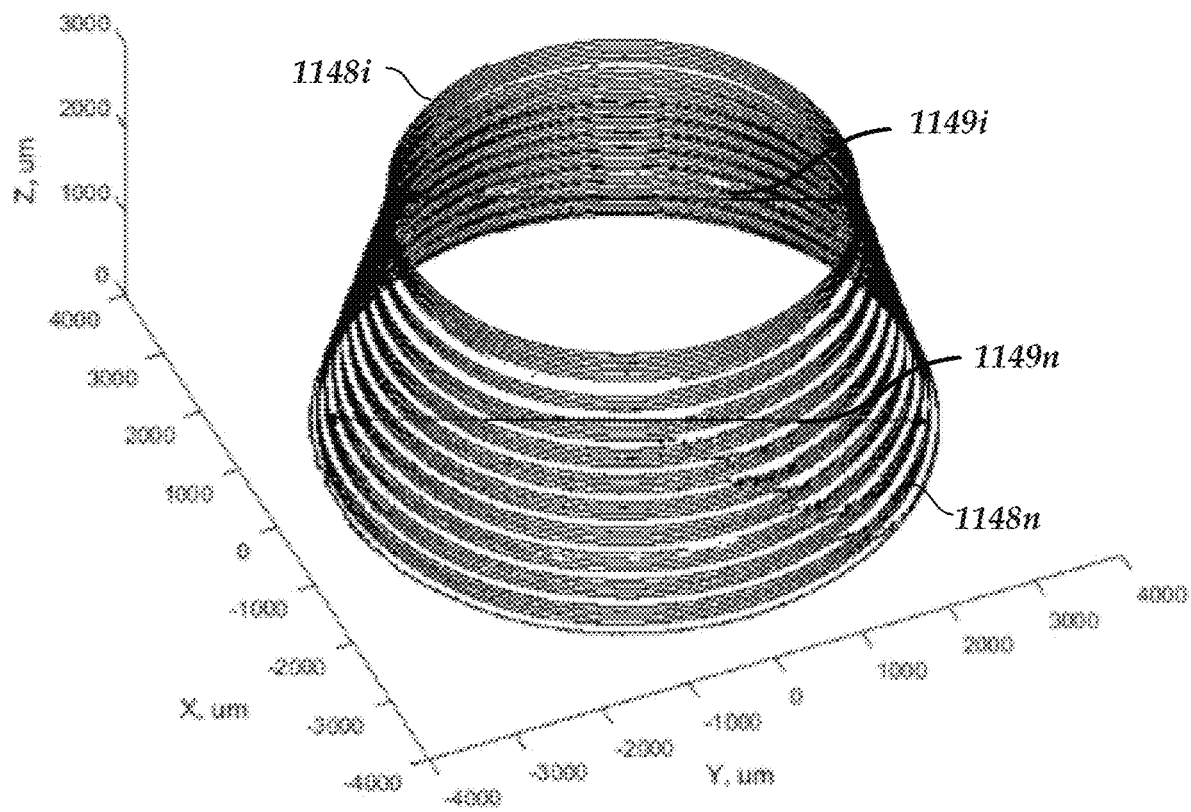

FIG. 11A is a perspective view of another embodiment of a calibration object 1146 in the form of a ring gauge, while FIGS. 11B and 11C are conceptual illustrations of certain aspects of a calibration object 1146' in the form of a ring gauge, similar to that of FIG. 11A. The calibration object 1146 of FIG. 11A has a plurality of inner circular-shaped surfaces 1148$i$ to 1148$n$ with stepped diameters 1149$i$ to 1149$n$, and the similar calibration object 1146' of FIGS. 11B and 11C has a plurality of inner circular-shaped surfaces 1148$i$' to 1148$n$' with stepped diameters 1149$i$' to 1149$n$'. One or more of the inner circular-shaped surfaces 1148$i$ to 1148$n$ or 1148$i$' to 1148$n$' may be patterned surfaces (e.g., having printed or textured patterns, see FIGS. 9C, 9D, 13D and 13E), for use in the taking of calibration measurements. In the version of FIG. 11A, there are seven stepped inner surfaces, while in the version of FIGS. 11B and 11C there are ten stepped inner surfaces. FIG. 11B is in the form of a rolled-out or bore map of the ten stepped inner surfaces of the ring gauge 1146'. FIG. 11C shows a 3D plot of representative measurement data collected in a spiral scan in the Z direction using a rotating optical pen on the stepped inner diameters 1149$i$' to 1149$n$' of the inner circular-shaped surfaces 1148$i$' to 1148$n$' of the ring gauge 1146'. The use of multiple stepped surfaces in the calibration objects 1146 and 1146' facilitates obtaining measurements (e.g., radial distance measurements) over a range of distances, which may be used to generate calibration information for a range of CRS distances of an optical pen, as well as the obtaining of Z-axis calibration data.

The outer surface 1150 of the ring gauge 1146 as illustrated in FIG. 11A has a flat face 1152 including a recess 1154. The flat face 1152 and the recess 1154 may facilitate the arrangement of the ring gauge 1146 by a calibration gauge extension in a constrained relationship relative to a rotating chromatic range sensor configuration of an optical pen (see calibration gauge extension 744 of optical pen 220A of FIGS. 7A to 7C). Specifically, the flat face 1152 may serve as a reference surface for the rotational angle ω of the optical pen as mounted in a measurement platform (to set ω=0), and the orthogonal surfaces of the recess 1154 may serve as a reference for alignment to a Z-axis direction. For example, the flat face 1152 and the recess 1154 may be sized and shaped to receive a corresponding tab or protrusion (not shown) of a calibration gauge extension to hold the ring gauge 1146 in a constrained relationship with respect to a rotating chromatic range sensor configuration. Other positioning schemes may be employed (e.g., flat faces on opposite sides of the ring gauge, recesses having different shapes, tabs on calibration object and corresponding recesses on the calibration gauge extension, etc., and various combinations thereof).

Figure 12A:
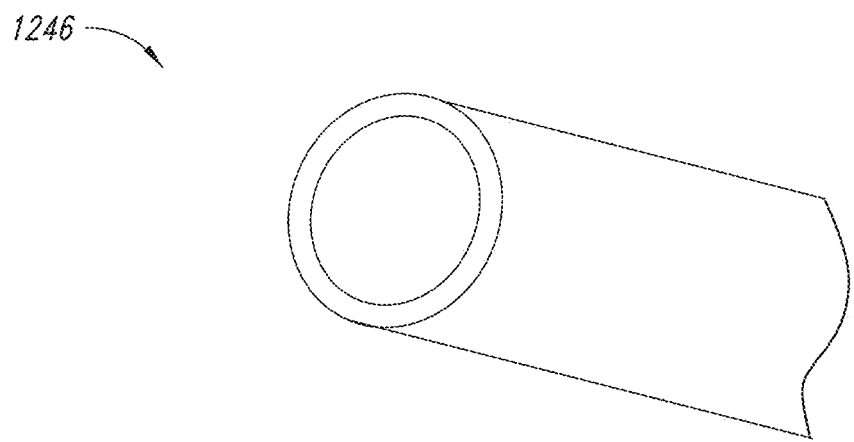
FIGS. 12A to 12C illustrate example embodiments of a calibration object which takes the form of one or more precision glass tubes.
Figure 12B:
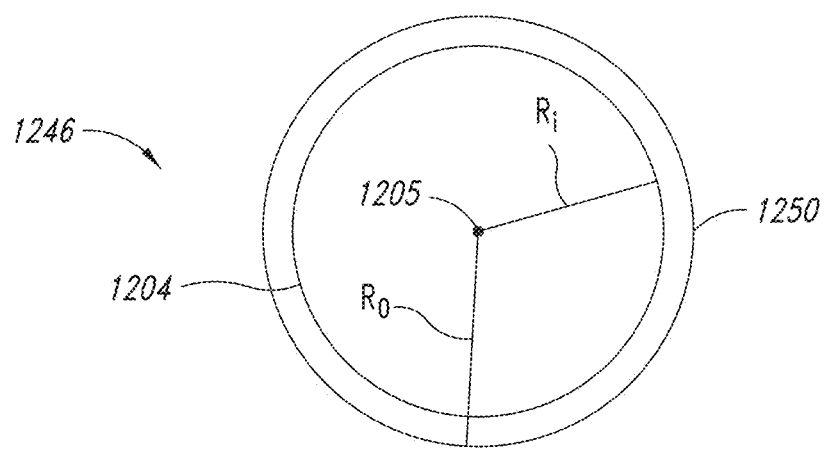

FIG. 12A is a perspective view and FIG. 12B is a cross-sectional view of another embodiment of a calibration object 1246 in the form of a precision glass tube. With reference to FIG. 12B, the precision glass tube 1246 has a nominally cylindrical inner surface 1204 and a nominally cylindrical outer surface 1250. One or both of the inner surface 1204 and the outer surface 1250 may be patterned surfaces (e.g., having printed or textured patterns, see FIGS. 9C, 9D, 13D and 13E), for use in the taking of calibration measurements. The patterns of a nominally cylindrical surface may include non-patterned portions (e.g., gaps or windows between reference lines) to facilitate taking measurements related to a pattern on another nominally cylindrical surface. For example, a pattern on nominally cylindrical inner surface 1204 may have gaps or windows (see windows 1374 of FIG. 13D) through which features of a pattern on nominally cylindrical surface 1250 may be viewed, measured, or otherwise detected.

The inner surface 1204 and the outer surface 1250 are nominally cylindrical calibration surfaces having a central axis 1205 that extends along a Z direction that is intended to be aligned approximately parallel to the rotational axis of a CRS optical pen (e.g., see reference central axis 820 and rotation axis 860 of FIG. 8A) when calibration measurements are performed. The first nominally cylindrical calibration surface 1204 as illustrated is arranged at a known first radius Ri from the central axis 1205 that extends along the Z axis. The second nominally cylindrical calibration surface 1250 as illustrated is arranged at a known second radius Ro from the central axis 1205 that extends along the Z axis.

In some embodiments, the inner surface 1204 may have a pattern used for measuring one type of calibration information (e.g., a pattern which facilitates measuring angular positional information) and the outer surface 1250 may have a pattern which facilitates measuring another type of calibration information (e.g., a pattern which facilitates measuring Z axis-related positional information). In some embodiments, the outer surface 1250 may be a patterned surface, while the inner surface 1204 may be a transparent or semi-transparent surface without a pattern. In such embodiments, distance (radius) measurements may be obtained by detecting the inner surface 1204 and the outer surface 1250 (e.g., with conversion from optical thickness to physical thickness using a known or measured refractive index of the material as needed), and angular and Z axis positional measurements may be obtained by detecting features of the pattern of the outer surface 1250.

Figure 12C:
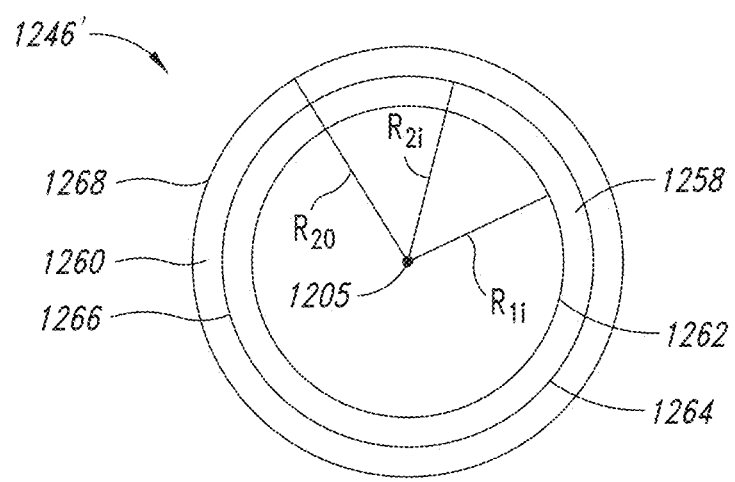

FIG. 12C illustrates an embodiment of a calibration object 1246' comprising two nested precision glass tubes, an inner tube 1258 and an outer tube 1260. The inner tube 1258 has an inner nominally cylindrical calibration surface 1262 and an outer nominally cylindrical calibration surface 1264. The outer tube 1260 has an inner nominally cylindrical calibration surface 1266 and an outer nominally cylindrical calibration surface 1268. The calibration surfaces 1262, 1264, 1266, 1268 have a central axis 1205 that extends along a Z direction that is intended to be aligned approximately parallel to the rotation axis of a CRS optical pen when calibration measurements are performed (e.g., see reference central axis 820 and rotation axis 860 of FIG. 8A). The nominally cylindrical calibration surface 1262 as illustrated is arranged at a known radius $R_{1i}$ from the central axis 1205 that extends along the Z axis. The nominally cylindrical calibration surfaces 1264 and 1266 as illustrated are each approximately arranged at a known radius $R_{2i}$ from the central axis 1205 that extends along the Z axis (for ease of illustration, the difference between the radius of the nominally cylindrical calibration surfaces 1264 and 1266 is assumed to be negligible). The nominally cylindrical calibration surface 1268 as illustrated is arranged at a known radius $R_{2O}$ from the central axis 1205 that extends along the Z axis.

One or more of the nominally cylindrical inner surface 1262 of the inner tube 1258, the nominally cylindrical outer surface 1264 of the inner tube 1258, the nominally cylindrical inner surface 1266 of the outer tube 1260 and the nominally cylindrical outer surface 1268 of the outer tube 1260 may be patterned surfaces (e.g., having printed or textured patterns, see FIGS. 9C, 9D, 13D and 13E), for use in the taking of calibration measurements.

The patterns of a nominally cylindrical surface may include non-patterned portions (e.g., gaps between reference lines or windows) to facilitate taking measurements related to a pattern on another nominally cylindrical surface. For example, a pattern on nominally cylindrical inner surface 1262 of the inner tube 1258 may have gaps or windows through which features of a pattern on nominally cylindrical inner surface 1266 of the outer tube 1260 may be viewed, measured, or otherwise detected, in a manner similar to that discussed above with reference to FIG. 12B.

In some embodiments, the outer surface 1268 of the outer tube 1260 may be a patterned surface, while other surfaces of the inner tube 1258 and the outer tube 1260 may be transparent or semi-transparent surfaces without a pattern. Distance (radius) measurements may be obtained by detecting one or more of the inner surface 1262 of the inner tube 1258, the outer surface 1264 of the inner tube 1258, the inner surface 1266 of the outer tube 1260, and the outer surface 1268 of the outer tube 1260, and rotational and Z axis-related positional measurements may be obtained by detecting features of the pattern of the outer surface 1268 of the outer tube 1260. Various combinations of patterned and non-patterned surfaces and/or of types of patterns may be employed in some embodiments. Additional nested tubes may be employed in some embodiments. A bottom cap or other holding structure may be employed to hold the nested tubes 1258, 1260 in position with respect to each other. A nested glass tube embodiment facilitates obtaining calibration information over a range of CRS measurement distances of an optical pen, as well as the obtaining of Z-axis calibration data, without repositioning the calibration object for multiple gauge distance measurements. Physical distances may be obtained from optical distances or thicknesses as needed in a manner similar to that discussed above with reference to FIG. 12B.

Figure 13A:
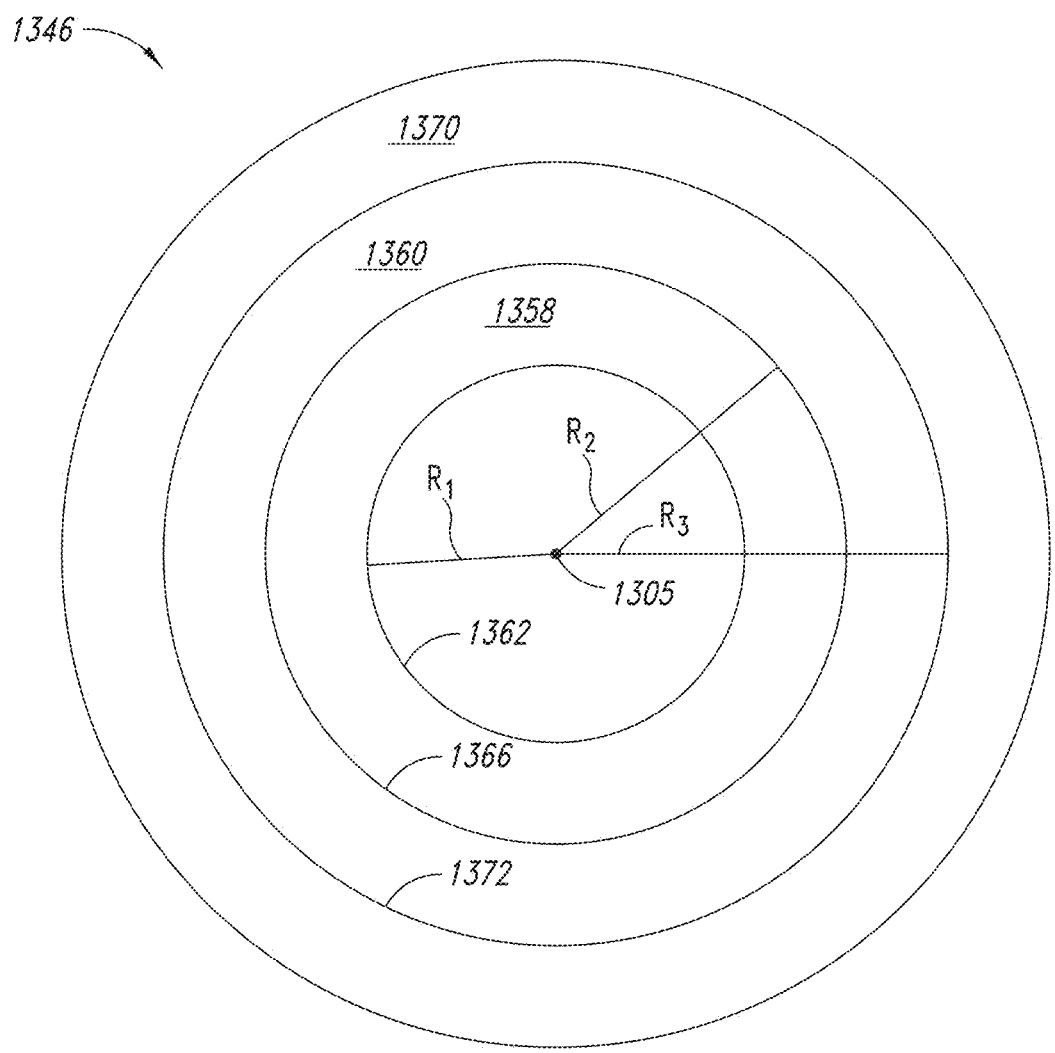

FIGS. 13A to 13E illustrate embodiments of a calibration object 1346 in the form of a plurality of nested precision metal tubes 1358, 1360 and 1370. In FIGS. 13A to 13E, the size of the nested metal tubes 1358, 1360 and 1370 is exaggerated, and the spacing between tubes may be assumed to be negligible or may be exaggerated for ease of illustration. Some embodiments may employ more than the three nested metal tubes as illustrated (e.g., 7 or more tubes, etc.) FIG. 13A is a cross-sectional view of the calibration object 1346. The precision metal tube 1358 has an inner surface 1362, the precision metal tube 1360 has an inner surface 1366 and the precision metal tube 1370 has an inner surface 1372. The inner surfaces 1362, 1366 and 1372 are nominally cylindrical calibration surfaces having a central axis 1305 that extends along a Z direction that is intended to be aligned approximately parallel to the rotation axis of a CRS optical pen (e.g., see reference central axis 820 and rotation axis 860 of FIG. 8A) when calibration measurements are performed. The nominally cylindrical calibration surfaces 1362, 1366 and 1372 are arranged at known radii (as illustrated, respectively $R_1$, $R_2$ and $R_3$) from the central axis 1305 that extends along the Z axis.

Figure 13B:
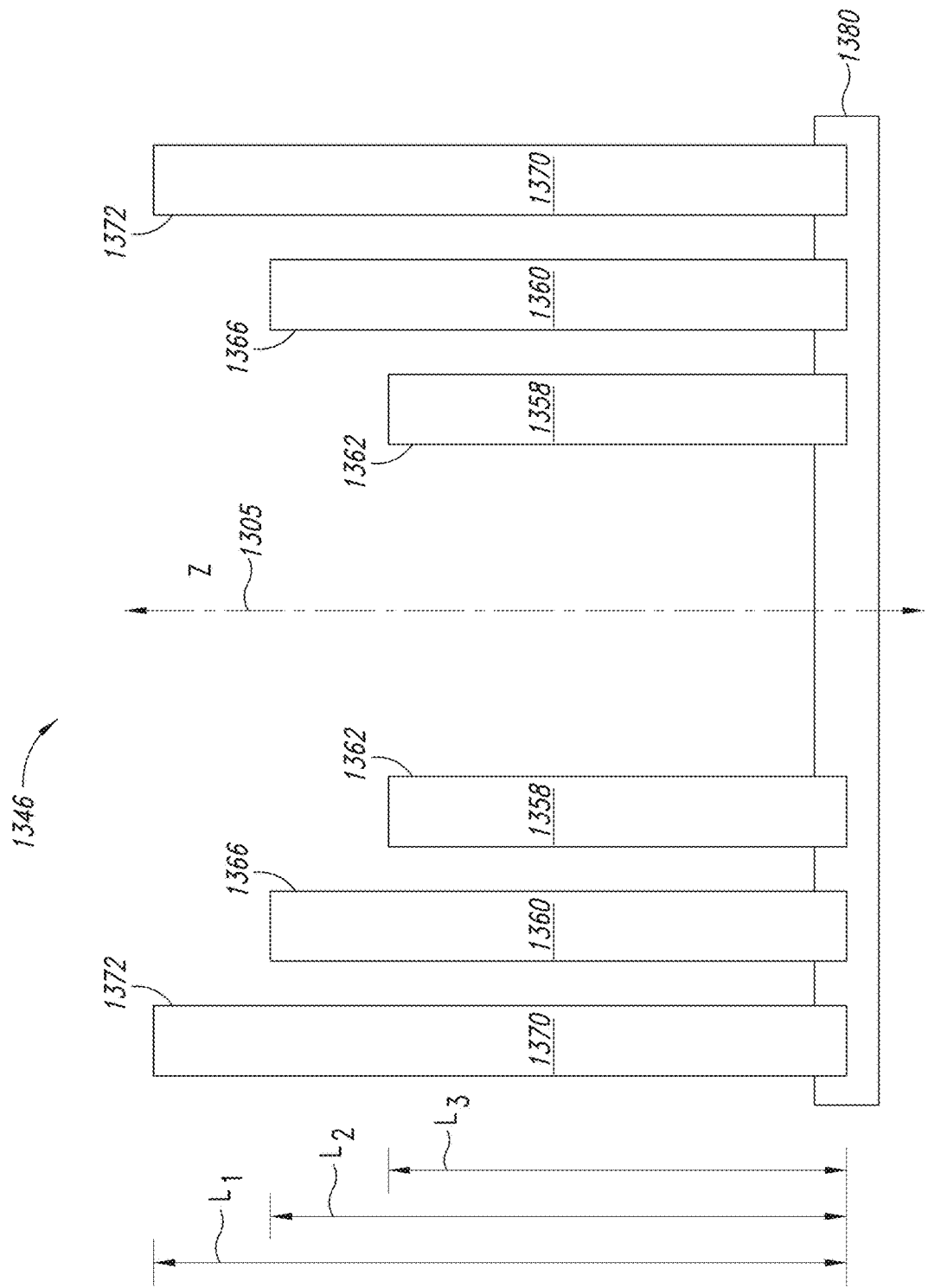

FIG. 13B is a side cross-sectional view illustrating an embodiment in which the nested metal tubes 1358, 1360 and 1370 have different lengths L1, L2, L3 along the Z axis 1305. A portion of one or more of the inner surface 1362 of the metal tube 1358, the inner surface 1366 of metal tube 1360 and the inner surface 1372 of the tube 1370 may be a patterned surface (e.g., having printed or textured patterns, see FIGS. 9C and 9D), for use in the taking of calibration measurements in a manner similar to that described above with respect to the stepped diameter ring gauge 1046 of FIG. 10 and stepped diameter ring gauges 1146 and 1146' of FIGS. 11A to 11C.

The calibration gauge extension 744 (see FIGS. 7A-7C) may position the calibration gauge 1346 at a first extended position with respect to the measurement beam 296 to facilitate the taking of calibration readings of the inner surface 1362, may position the calibration gauge 1346 at a second extended position with respect to the measurement beam 296 to facilitate the taking of calibration readings of the inner surface 1366, and may position the calibration gauge 1346 at a third extended position with respect to the measurement beam 296 to facilitate the taking of calibration readings of the inner surface 1372. Detection of transitions between the inner surfaces 1362, 1366, 1372 may be used to obtain Z-axis calibration information, in addition to or instead of Z-axis calibration information based on patterns on one or more of the inner surfaces 1362, 1366, 1372. In various implementations, other configurations may also or alternatively be utilized (e.g., a pattern may be included on an inner surface of an outer tube as viewed through an opening or window in an inner tube, etc., as will be described in more detail below with respect to FIGS. 13D and 13E).

Figure 13D:
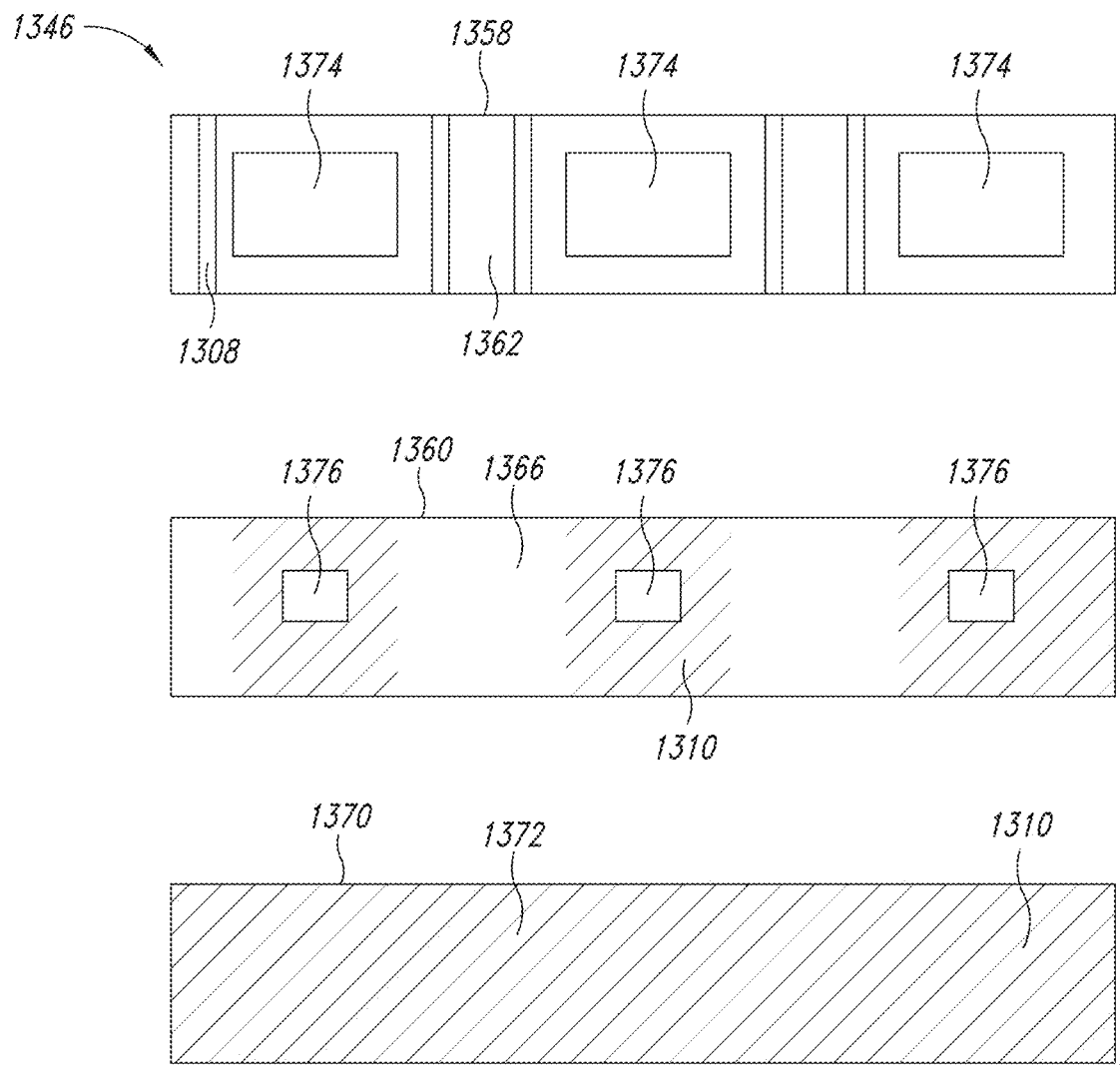
Figure 13E:
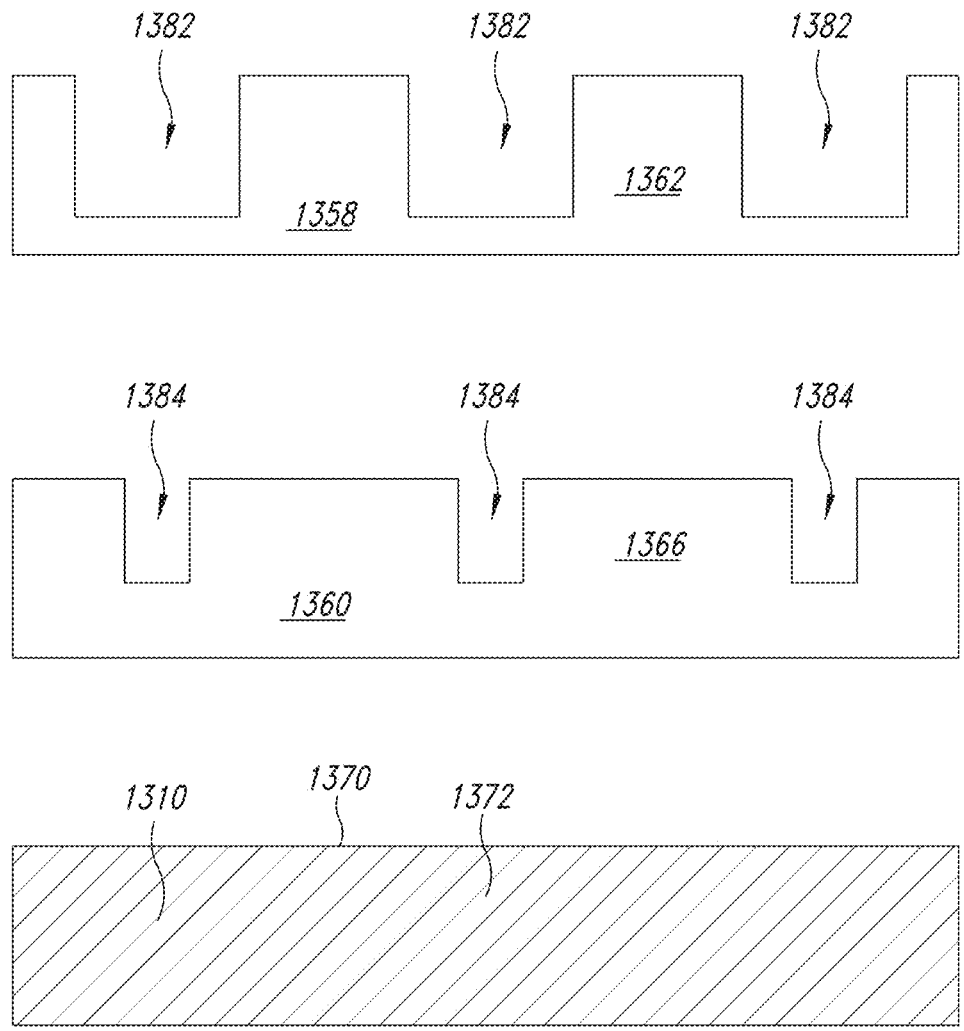

FIGS. 13C to 13E illustrate an embodiment of the calibration gauge 1346 in which the nested metal tubes 1358, 1360 and 1370 may generally have a same length L1 along the Z axis 1305. The lengths may be slightly tapered (not shown) to facilitate providing good concentricity and alignment. As discussed in more detail below with respect to FIGS. 13D to 13E, which conceptually illustrate example patterns, the inner tubes (as illustrated, the metal tube 1358 and the metal tube 1360) may have patterns in the form of windows or cuts extending through the sides of the tubes around the circumference to allow the measurement beam 296 to pass through to larger radius tube wall(s). One or more of the remaining portions of the inner surface 1362 of tube 1358, the inner surface 1366 of tube 1360, and the inner surface 1372 of tube 1370 may comprise patterned surfaces (e.g., having printed or textured patterns, see FIGS. 9C and 9D), for use in the taking of calibration measurements in a manner similar to that described above.

As illustrated, the calibration object 1346 has a cap 1380 to hold the tubes 1358, 1360, 1370 in position with respect to one another. The calibration gauge extension 744 (see FIGS. 7A-7C) may engage with the cap 1380 to arrange the calibration gauge 1346 in a constrained relationship with respect to a rotating chromatic range sensor configuration (see FIGS. 7A-7C). A nested metal tube embodiment as illustrated in FIGS. 13D and 13E facilitates obtaining calibration information over a range of CRS distances of an optical pen, as well as the obtaining of Z-axis calibration data, without repositioning the calibration object for each gauge distance $R_1$, $R_2$, $R_3$.

FIG. 13D conceptually illustrates the calibration object 1346 in which the inner nested tube 1358 has a pattern in the form of windows 1374 extending through the tube 1358, and the middle nesting tube has a pattern in the form of windows 1376 extending through the tube 1360. FIG. 13D illustrates an example pattern in the form of a rolled-out window/print proof/bore map of a pattern or patterns to be applied to or formed in the inner surfaces 1362, 1366, 1372 of the tubes 1358, 1360, 1370.

The windows 1374 of the inner tube 1358 and the windows 1376 of the middle tube are sized, and the inner and middle tubes 1358, 1360 are positioned so that, in operation, a rotating chromatic range sensor configuration (see FIGS. 7A-7C) can detect the windows 1376 of the tube 1360 though the openings of the windows 1374 in the tube 1358, and can detect a portion of the inner surface 1372 of the outer tube 1370. The detection of the windows 1374, 1376 and surfaces 1362, 1366, 1372 by a rotating chromatic range sensor configuration (see FIGS. 7A-7C) may provide calibration measurement data for use as or to generate calibration data or information.

In addition, one or more of the inner surfaces 1362, 1366, 1372 may include patterned surfaces (e.g., having printed or textured patterns, see FIGS. 9C and 9D), which may also be used to take calibration measurements. As illustrated, surface 1362 of tube 1358 includes vertical pattern lines 1308, surface 1366 of tube 1360 includes angled lines 1310, and surface 1372 of tube 1370 includes angled lines 1310. While the windows 1374, 1376 as illustrated are vertical rectangles, some or all of the windows may have angled sides, which may be employed to provide Z axis calibration measurement data (e.g., instead of or in addition to, the angled lines 1310).

The embodiment illustrated in FIG. 13E is similar to the embodiment of FIG. 13D, except that instead of windows, the inner nested tube 1358 has a pattern in the form of cuts 1382 extending through the tube 1358, and the middle nesting tube has a pattern in the form of cuts 1384 extending through the tube 1360. FIG. 13E illustrates an example pattern in the form of a rolled-out cut/print proof/bore map of a pattern or patterns to be applied to or formed in the inner surfaces 1362, 1366, 1372 of the tubes 1358, 1360, 1370.

The cuts 1382 of the inner tube 1358 and the cuts 1384 of the middle tube 1360 are sized, and the inner and middle tubes 1358, 1360 are positioned with respect to each other so that, in operation, a rotating chromatic range sensor configuration (see FIGS. 7A-7C) can detect the cuts 1384 of the tube 1360 though the openings of the cuts 1382 in the tube 1358, and can detect a portion of the inner surface 1372 of the outer tube 1370 through at least some partially aligned openings of the cuts 1382 and 1384. The detection of the cuts 1382, 1384 and surfaces 1362, 1366, 1372 by a rotating chromatic range sensor configuration (see FIGS. 7A-7C) may provide calibration measurement (distance) data for use as or to generate calibration data or information. In addition, as noted above one or more of the inner surfaces 1362, 1366, 1372 may include patterned surfaces (e.g., having printed or textured patterns, such as angled lines 1310), which may also be used to take calibration measurements.

Figure 14:
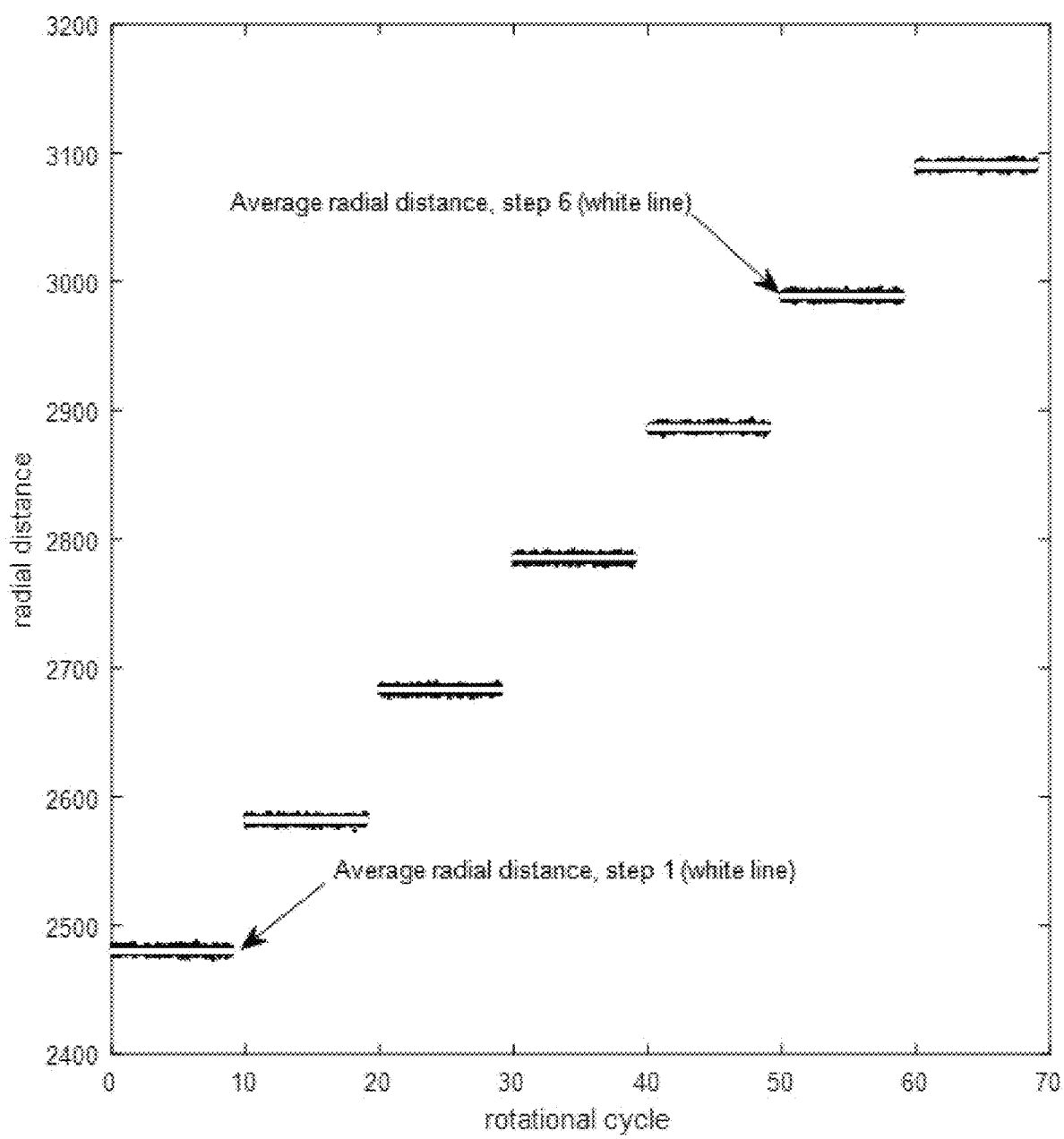
FIG. 14 is a graphical representation of an example set of measured radial data associated with an optical pen.

FIG. 14 is a graphical representation of calibration test data gathered using a cylindrical calibration object provided for the taking of measurements at seven calibration steps and plotted in cylindrical coordinates (Z-axis into the page). For example, a calibration ring gauge may be utilized having seven or more concentric calibration surfaces, such as stepped calibration surfaces (see, e.g., FIGS. 11A to 11C and 13B), and/or calibration surfaces that may generally be aligned in a plane perpendicular to the Z axis of the rotating chromatic range sensor system (e.g., see FIGS. 12C and 13C to 13E), etc. The vertical axis represents the radial distance measured and the horizontal axis represents the optical pen rotational angle plotted in units of rotational cycles. In some implementations, the measuring at different radial distances may comprise repositioning the calibration object with respect to the Z axis (e.g., adjusting a position of the calibration object using the calibration gauge extension 744 of FIGS. 7A to 7C for calibration objects with stepped surfaces, such as the embodiments shown in FIGS. 11A to 11C and 13B), possibly adjusting control parameters of a probe signal processing and control circuit (see probe signal processing and control circuit 207 of FIGS. 2 and 5), and/or scanning a Z-axis stage built into the extension or platform to make a spiral scan, etc.

Table 1 below illustrates example causes of errors in a rotating chromatic range sensor configuration. See also FIG. 8C, discussed above.

TABLE 1

| Misalignments and Resulting Errors | |
| --- | --- |
| Misalignment | Example Errors |
| Turning prism orientation (see reflective element 294 of FIG. 6) | Z offset $Z_o$<br>Rotational offset $\varphi_o$<br>Radius scaling (linear correction term ($R_L$))<br>Z scaling (linear correction term ($Z_L$)) |

TABLE 1-continued

Misalignments and Resulting Errors

| Misalignment | Example Errors |
| --- | --- |
| Rotational axis misalignment with respect to mounting axis and pen optical axis (see Rotational Axis 860 of FIG. 8A and axes m, r, o; labeled in FIG. 8B). | Radius offset $R_o$<br>Z axis First harmonic error $C_{Z1}$<br>Radius Second harmonic error $C_{R2}$ |
| Rotation XY offset from mount (see exchange mount 285 of FIG. 6) | Radius First harmonic error $C_{R1}$<br>Rotational First harmonic error $C_{\varphi 1}$ |

The errors introduced by misalignments also may be represented using sets of equations, which may be compared to measurement data collected on calibration artifacts to generate calibration data or information used to compensate for the errors (e.g., used to adjust test measurement results). For example, curve fitting to the measured data may be employed to determine the coefficients of the equations representing the errors.

In one example, errors in measurements may be represented by the following relationships (Equation 1):

$$\begin{bmatrix} \Delta R \\ \Delta \varphi \\ \Delta Z \end{bmatrix} = \begin{bmatrix} R_0 + R_L D_C + C_{R1}\cos(2\pi\omega_c + \theta_{R1}) + C_{R2}\cos(4\pi\omega_c + \theta_{R2}) \\ \varphi_0 + \varphi_L D_C + C_{\varphi 1} D_C \sin(2\pi\omega_c + \theta_{\varphi 1}) + C_{\varphi 2} D_C \sin(4\pi\omega_c + \theta_{\varphi 2}) \\ Z_0 + Z_L D_C + C_{z1} D_C \sin(2\pi\omega_c + \theta_{z1}) + C_{z2} D_C \sin(4\pi\omega_c + \theta_{z2}) \end{bmatrix}$$

where the measurement input data variables are $D_C$ and $\omega_c$ ($Z_c$, which does not appear above, is a third measurement input that can be collected); the errors in measurements are $\Delta R$, $\Delta \varphi$ and $\Delta Z$; and the fitting coefficients up to second harmonics are the remainder of symbols, all as defined below:

$D_C$ represents the compensated distance measurement data from the optical pen, which is calibrated to be linear when not rotating, but may have an offset and scaling error when used in rotational measurement, resulting from various mechanical misalignments in the measurement system;

$\omega_c$ represents the compensated rotary angle output of the optical pen rotary encoder;

$Z_c$ represents the compensated Z-axis stage position output of the optical pen rotary encoder platform;

$\Delta R$ represents the radial distance measurement error, which contains terms having the following coefficients:

$R_0$ represents a radial offset constant term;
$R_L$ represents a radial linear (scaling) term coefficient;
$C_{R1}$ represents a radial first harmonic term amplitude coefficient;
$\theta_{R1}$ represents a radial first harmonic term phase coefficient;
$C_{R2}$ represents a radial second harmonic amplitude coefficient;
$\theta_{R2}$ represents a radial second harmonic term phase coefficient;

$\Delta \varphi$ represents the rotational measurement error, which contains terms having the following coefficients:

$\varphi_0$ represents a rotational offset constant term;
$\varphi_L$ represents a rotational linear (scaling) term coefficient;
$C_{\varphi 1}$ represents a rotational first harmonic amplitude coefficient;
$\theta_{\varphi 1}$ represents a rotational first harmonic phase coefficient;
$C_{\varphi 2}$ represents a rotational second harmonic amplitude coefficient;

$\theta_{\varphi 2}$ represents a rotational second harmonic phase coefficient;

$\Delta Z$ represents the Z-axis measurement error, which contains terms having the following coefficients:

$Z_0$ represents a Z-axis offset constant term;
$Z_L$ represents a Z-axis linear (scaling) term coefficient;
$C_{z1}$ represents a Z-axis first harmonic term amplitude coefficient;
$d_{z1}$ represents a Z-axis first harmonic term phase coefficient;
$C_{z2}$ represents a Z-axis second harmonic term amplitude coefficient;
$\theta_{Z2}$ represents a Z-axis second harmonic term phase coefficient;

where the second harmonic terms may be treated as negligible in some embodiments. In other embodiments, second and even higher harmonic terms may be included.

The fully compensated measurements for a rotating CRS measurement system may be represented in cylindrical coordinates by the following relationships (Equation 2):

$$\begin{bmatrix} R \\ \varphi \\ Z \end{bmatrix}_{RCPS,c} = \begin{bmatrix} D_c - \Delta R \\ \varphi_c - \Delta \varphi \\ Z_c - \Delta Z \end{bmatrix}$$

Where terms on the right are defined as above, and
$R_{RCPS,c}$ represents the fully compensated, measured radial distance;
$\varphi_{RCPS,c}$ represents the fully compensated, measured rotational angle;
$Z_{RCPS,c}$ represents the measured Z-axis distance.

FIG. 14 is an example of a Z-axis projection of compensated data of the calibration artifact shown in FIG. 11B plotted in cylindrical coordinates. The data is compensated for at least Radius offset.

The data may be transformed from cylindrical coordinates into Cartesian coordinates as follows (Equation 3):

$$\begin{bmatrix} \Delta X \\ \Delta Y \\ \Delta Z \end{bmatrix}_{RCPS,c} = \begin{bmatrix} R\cos(2\pi\varphi) \\ R\sin(2\pi\varphi) \\ Z \end{bmatrix}_{RCPS,c}$$

The transforms may be employed to help visualize the data. FIG. 11C is an example of the data from FIG. 14 transformed to and plotted in Cartesian coordinates. The transforms may also be employed to normalize the data. For example, the data may be transformed into Cartesian coordinates, rotational and translational transformations may be applied to align the data with the Z-axis, and then the data may be transformed back into cylindrical coordinates.

In some cases, measurements of interest may be within a small radius measurement range, and calibration to a single calibration artifact radius is sufficient. In these cases, linear coefficients $R_L$, $\varphi_L$ and $Z_L$ may be set to zero and the fit may only include constant offset terms $R_0$, $\varphi_0$ and $Z_0$ along with harmonic terms as needed (for example only $1^{st}$ and $2^{nd}$ harmonic terms in radius may be needed). In other cases, measurements may span the full radius range of the optical pen, and separate ring gauges or, desirably, a multi-step ring gauge, can be used to calibrate the full range of radii measurements. Potential rotational and Z-axis errors at different radii can also be calibrated if desired, with a calibration artifact that has the requisite markings or features for rotational and Z calibration. In such a case, linear fits may include both linear coefficients $R_L$, $\varphi_L$ and $Z_L$ and constant offset terms $R_0$, $\Phi_0$ and $Z_0$. Fits could be to these parameters as well as harmonic coefficients simultaneously. In some cases it may be desirable to average radii data (see "average radial distance" labels in FIG. 14) over complete, integral rotation cycles (thereby averaging out harmonic content) and then fit linearity and offset terms only at the multiple gauge radii R, average radii data to determine the linear correction coefficients $R_L$, $\varphi_L$ and $Z_L$ and constant offset correction terms $R_0$, $\varphi_0$ and $Z_0$.

Figure 15:
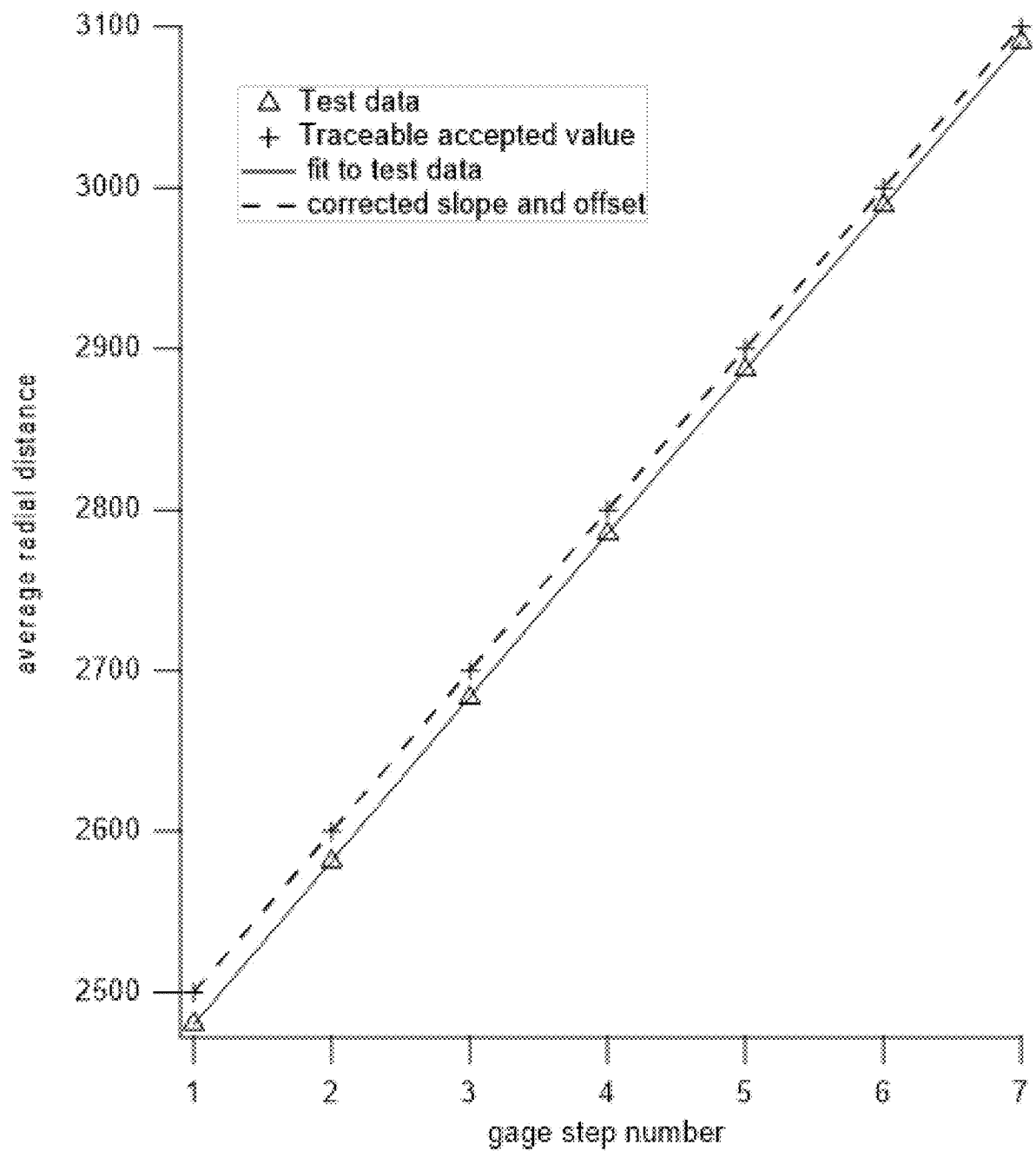
FIG. 15 is a graphical representation of a corrected slope and offset determined based on the example set of measured radial distance data of FIG. 14.

As an example, FIG. 15 is a graphical representation of the calibration test data of FIG. 14 and indications of traceable accepted values. The vertical axis of FIG. 15 represents the average radial distances and the horizontal axis FIG. 15 represents the gauge number (step number in the case of a stepped gauge) of the calibration object. At a given radial distance or step, the difference between the test data and the traceable accepted value corresponds to the radius error $\Delta R$ at that distance or step. A line fit directly to the test data shows good linearity but some offset and slope error from the traceable accepted values from the multi-step calibration artifact. A linear fit (dotted line) of measured average radial distances to the traceable accepted values for the radii of the steps (i.e, $\Delta R = R_0 + R_L D_C$ from EQUATION 1) results in a measurement calibrated to the traceable accepted value with corrected slope $R_L$ and offset $R_0$ calibration coefficients determined. The corrected slope and offset may be used to calibrate a rotating point chromatic sensor configuration for accurate radius measurements over the measurement range. Similar corrections can be made for Z-axis and rotational angle as desired, from Z-axis or rotational angle reference patterns in calibration artifacts at different radii.

Figure 16:
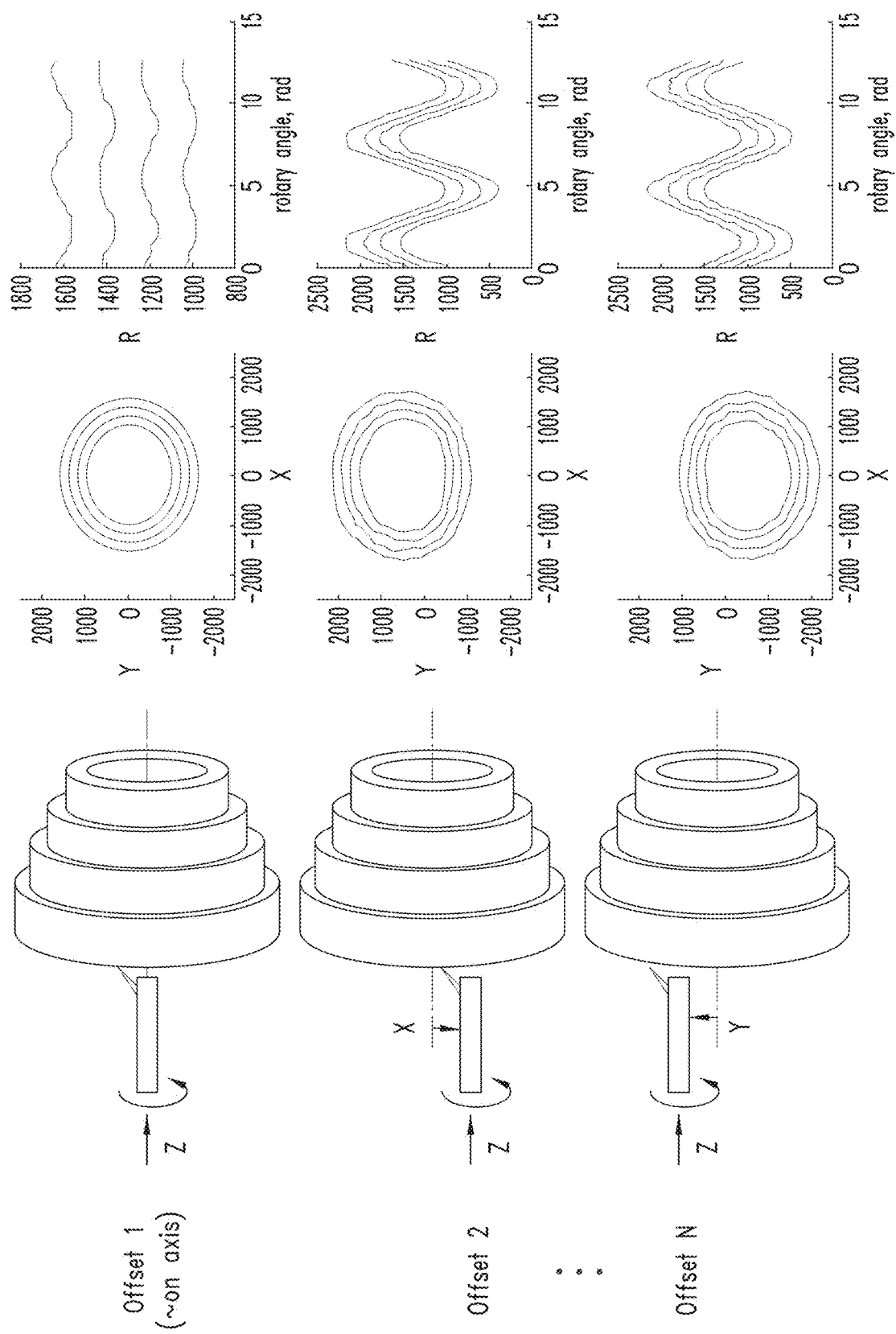
FIG. 16 is a conceptual diagram illustrating an embodiment of obtaining radial distance data at a plurality of gauge distances and a plurality of offsets of the axis of rotation of an optical pen with respect to a central axis of a calibration object.

FIG. 16 is a graphical representation of obtaining a set of more continuous calibration distance measurements at a range of different distances (as illustrated, at four different gauge distances) and different offsets (as illustrated, at N offsets). By comparing the measurements at the different gauge distances and offsets, errors that are due to mechanical rotation (which have a common mode in terms of the rotational angle) may be separated from errors that are due to the CRS pen calibration (which have a common mode in terms of the measured CRS distance), for example, by using simultaneous curve fitting.

Through the use of the XY offsets from the axis of a gauge (e.g., a multi-distance gauge) and the use of the gauge distance steps, there may be measurement distance data associated with every CRS distance within a CRS range. This may facilitate a continuous calibration of CRS distance, as opposed to a piecewise linear calibration based simply on the radius at each ring gauge distance or step. For example, a first calibration with an ideal axis of an optical pen centered in the calibration object may be performed to remove harmonic errors. As illustrated in FIG. 16, offset 1 aligns the ideal axis of the optical pen with the center axis of the calibration object. This data may be used to produce a correction at particular radius measurements with small deviations. Calibration distance measurements may then be taken at a plurality of offsets (e.g., offset 2 to offset N) of the ideal axis of the optical pen from the calibration object central axis. In various implementations the generated data may include measurements at a continuous range of radii. In various implementations, the XY offset may result in a small, oscillating deviation in the sensor alignment to the ring gauge or analogous workpiece surface normal. It is possible, depending on surface types of the calibration artifact, that a radius measurement error may result from such a deviation. In such implementations, the surface may be known and the angle deviation may be deterministic, so a look up table or similar calculation may be employed to correct for such an error, if needed.

It will be appreciated that a ring gauge (i.e., calibration object) approach as described herein may be particularly advantageous for calibrating an optical pen when the optical pen's axis is able to be aligned to the ring gauge axis, and workpiece measurements are subsequently made with a corresponding alignment (e.g., a same alignment). Such configurations may be achieved in various platforms (e.g., SCARA robot, vision system, CMM with fixed autojoint, etc.) For example, in some such configurations, the probe may be held in a fixed (e.g., vertical) orientation (i.e., which may be utilized for both a calibration process as well as performing measurements of workpieces), and for a calibration process the ring gauge may be mounted to the platform in a corresponding fixed (e.g., vertical) orientation.

Figure 17:
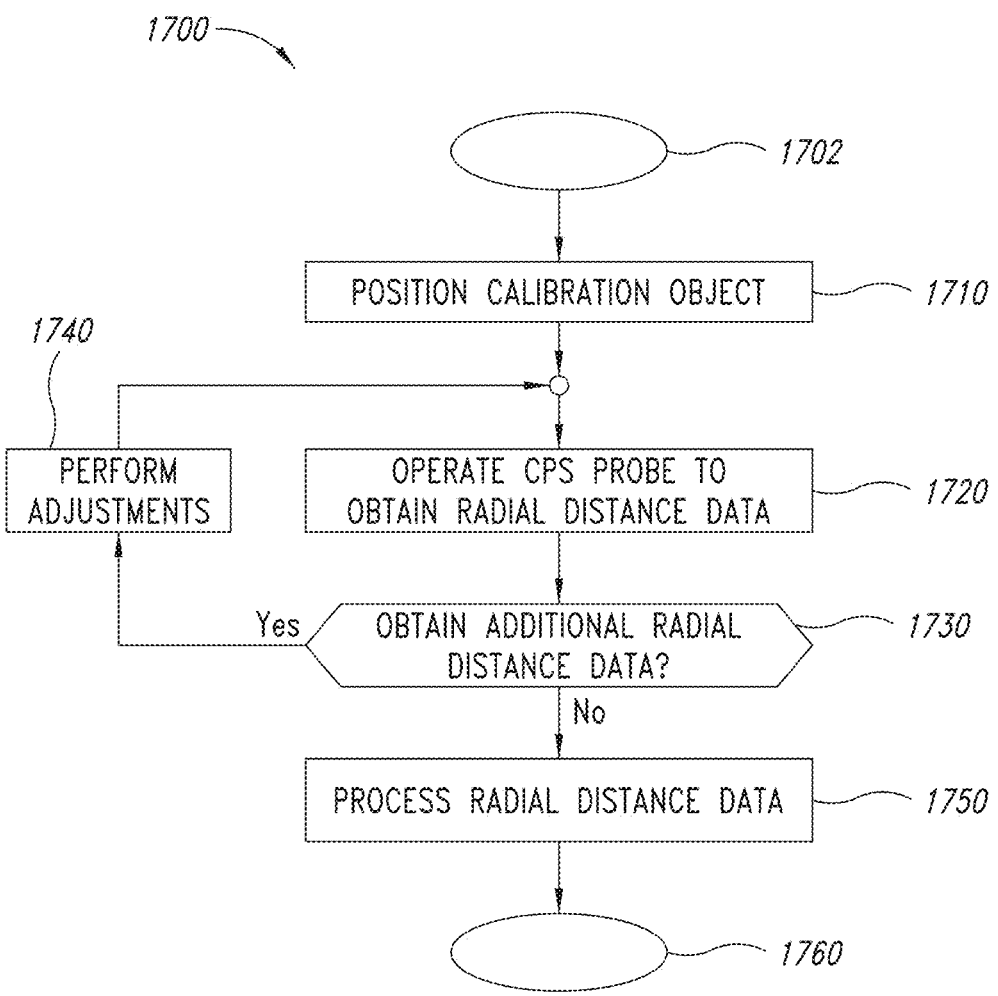
FIG. 17 is a flow diagram illustrating one exemplary embodiment of a routine for calibrating a rotating chromatic range sensor configuration of a CMM.

FIG. 17 is a flow diagram illustrating one exemplary embodiment of a routine 1700 for calibrating a rotating chromatic range sensor configuration of a CMM, which may be employed, for example, by one or more of the embodiments of a CMM with a calibration object as described herein. In an embodiment, the routine provides calibration data or information for correcting misalignment errors for a rotating chromatic range sensor configuration that is configured to direct a radial distance sensing beam along a radial direction relative to a rotation axis, and to rotate the radial distance sensing beam about the rotation axis.

The routine 1700 begins at 1702, when the routine may be called, for example, by a probe signal processing and control circuit (e.g., probe signal processing and control circuit 207 of FIGS. 2 and 5). The routine 1700 proceeds from 1702 to 1710.

At 1710, a calibration object (see, e.g., cylindrical calibration object 746 of FIGS. 7A and 7C, cylindrical calibration objects 946 of FIGS. 9A to 9D, cylindrical calibration object 1046 of FIG. 10, cylindrical calibration objects 1146 and 1146' of FIGS. 11A to 11C, cylindrical calibration object 1246 of FIGS. 12A and 12B, cylindrical calibration object 1246' of FIG. 12C, cylindrical calibration objects 1346 of FIGS. 13A to 13E) is positioned with respect to the rotating chromatic range sensor configuration of a CMM (see FIGS. 6 and 7A to 7C). The calibration object has at least a first nominally cylindrical calibration surface (see, e.g., surfaces 1148*i* to 1148*n* and 1148*i*' to 1148*n*' of FIGS. 11A to 11C) having a central axis that extends along a Z direction that is intended to be aligned approximately parallel to the rotation axis of the CMM. The first nominally cylindrical calibration surface is arranged at a known first radius from the central axis of the calibration object that extends along the Z direction.

The first nominally cylindrical calibration surface may include one or more reference features formed on or in the first nominally cylindrical calibration surface, such as a first set of vertical reference features (see, e.g., vertical lines 908 of FIG. 9C), a first set of angular reference features (see, e.g., angled lines 910 of FIG. 9C), etc. The reference features may be configured to be sensed by the radial distance sensing beam and located at known positions with respect to one another (e.g., angular reference features may have known angles or known angular spacings around the central axis from one another on or in the first nominally cylindrical calibration surface).

The calibration object may be arranged in a constrained relationship relative to the rotating chromatic range sensor configuration, wherein the direction of the rotation axis and the direction of the central axis are in a nominally fixed angular relationship relative to one another and are parallel to within a threshold value, for example, to within 5 degrees of one another. The calibration object may be held in the constrained relationship, for example, by a calibration gauge extension of the rotating CRS configuration (see, e.g., calibration gauge extension 744 of FIGS. 7A to 7C). The routine 1700 proceeds from 1710 to 1720.

At 1720, the routine operates the rotating chromatic range sensor configuration to provide a first set of radial distance measurement data acquired while rotating the radial distance sensing beam about the rotation axis at a first Z coordinate along the Z direction relative to the calibration object, the radial distance measurement data referenced to a sensed rotational angle of the radial distance sensing beam about the rotation axis. For example, an encoder (see encoder 630 of FIG. 6) may provide sensed rotational angle information. The routine 1700 proceeds from 1720 to 1730. At 1730, the routine 1700 determines whether to obtain an additional set of radial distance measurement data. When it is determined at 1730 to obtain an additional set of radial distance measurement data, the routine 1700 proceeds from 1730 to 1740.

At 1740, the routine performs optional adjustments to facilitate obtaining the additional set of radial distance data, such as repositioning a stepped calibration object (e.g., calibration object 1146 of FIGS. 11A to 11C) using a calibration gauge extension (e.g., calibration gauge extension 744 of FIGS. 7A to 7C) or otherwise adjusting the position of the calibration object and/or CRS probe relative to one another, adjusting signal processing routines, etc. From 1740, the routine 1700 returns to 1720 to operate the CRS probe to obtain the additional set of radial distance measurement data.

When it is not determined at 1730 to obtain an additional set of radial distance measurement data, the routine proceeds from 1730 to 1750. At 1750, the routine 1700 processes the obtained set(s) of radial distance measurement data referenced to the sensed rotation angle to determine the calibration data, wherein the calibration data is configured to be usable to characterize or compensate radial distance measurement errors as a function of the sensed rotational angle of the radial distance sensing beam about the rotation axis. The routine 1700 proceeds from 1750 to 1760, where the routine may terminate or perform additional processing (such as storing the calibration data and/or determining additional calibration data, etc.)

Embodiments of the routine 1700 may perform more acts than illustrated, may perform fewer acts than illustrated, and may perform acts in various orders or sequences. For example, in an embodiment the routine 1700 may obtain radial distance data sets for multiple measurement distances in parallel (e.g., when taking measurements of a calibration object having multiple calibration surfaces generally aligned in a plane perpendicular to the Z axis of the rotating chromatic range sensor system (see FIGS. 12C and 13C to 13E). In an embodiment the routine 1700 may process one or more radial distance measurement data sets before the obtaining of data sets is complete. In another example, in some embodiments, the calibration information may include data obtained using an interferometer, such as ideal CRS distances associated with the optical pen, radii of one or more nominally cylindrical calibration surfaces, etc. The routine 1700 may be modified to include retrieving the data obtained using the interferometer and/or to include performing measurements using the interferometer.

As mentioned above, other calibration objects may be employed in addition to, or instead of, cylindrical calibration objects. For example, a spherical calibration object may be employed.

Figure 18:
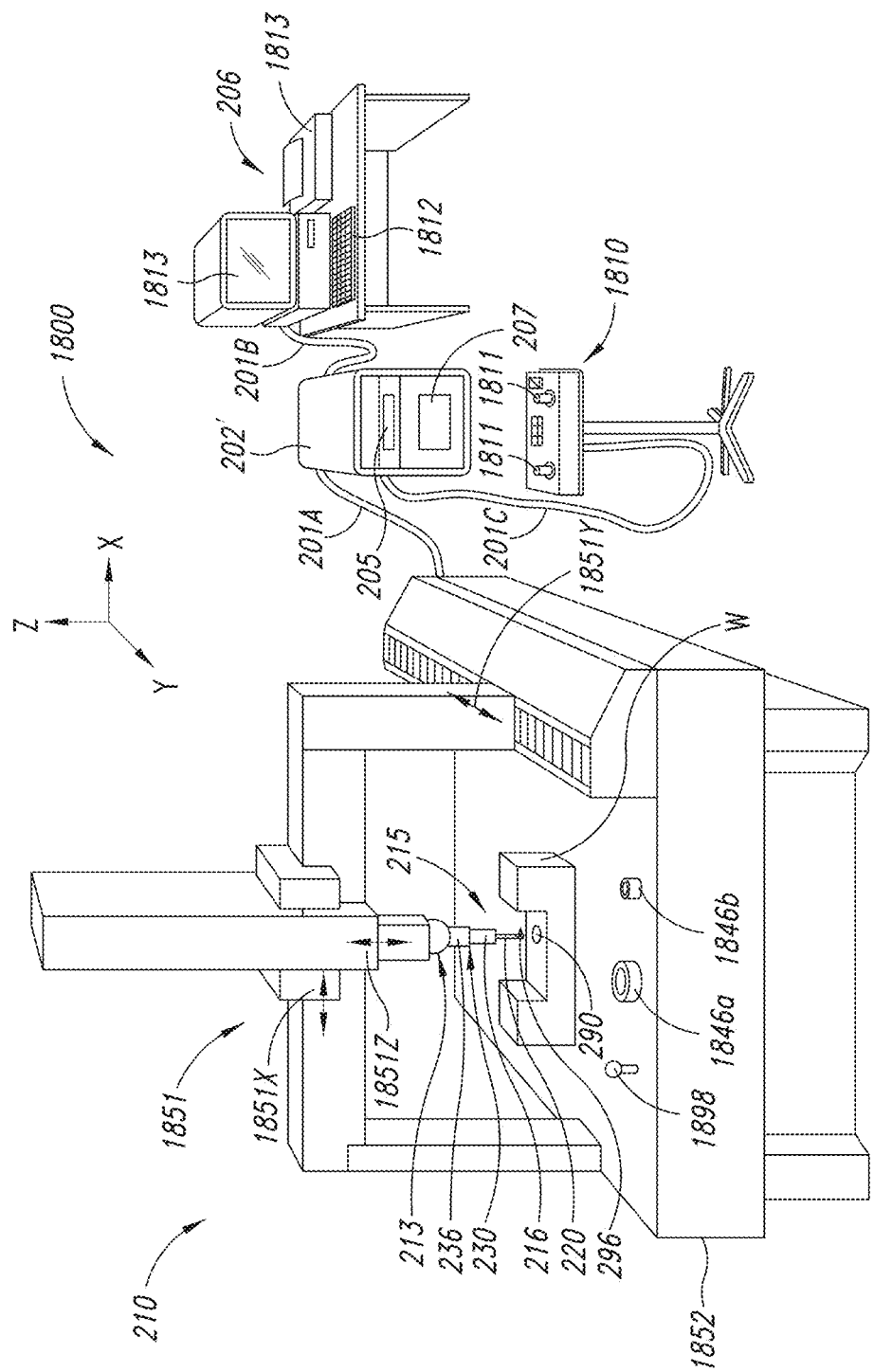
FIG. 18 is a diagram showing various exemplary components of a coordinate measurement system including a CMM and exemplary calibration components.

FIG. 18 is a diagram showing various exemplary components of a coordinate measurement system 1800 including a CMM 210, which includes a plurality of calibration objects. The coordinate measurement system 1800 may be similar to the coordinate measurement system 200 of FIG. 2 and includes examples of additional detail and operations for certain components, which are indicated by similar or identical reference numbers. The coordinate measurement system 1800 may include a manual operating unit 1810, and a host electronic system comprising an interface electronics 202' and a host computer 206 (e.g., including a computer and user interface). The interface electronics 202' may include, for example, a motion controller 205 that controls movements of the CMM 210, a probe signal processing and control circuit 207 (e.g., which may also or alternatively be included in other components), and interface circuits (not shown) that connect to the CRS optical probe system 215 (e.g. through the signal and control lines 201A). The manual operating unit 1810 may be coupled to and/or part of the interface electronics 202' (e.g. through the signal and control lines 201C) and may include joysticks 1811 for manually operating the CMM 210. The host computer 206 is coupled to the interface electronics 202' (e.g. through the signal and control lines 201B) and may operate the CMM 210 through user input or program control, and process measurement data for a workpiece W, which may include a measurement surface 290 to be measured (e.g., the measurement surface 290 may comprise an internal surface of a threaded hole in the workpiece W). The host computer 206 includes input means 1812 (e.g., a keyboard, etc.) for inputting, for example, measurement conditions or instructions, and output means 1813 (e.g., a display, printer, etc.) for outputting, for example, measurement results. In various embodiments, the host computer 206 and the interface electronics 202' may be merged and/or indistinguishable. In various implementations, the signal and control lines 201A-201C may be part of a general data transfer line/bus configuration 201.

The CMM 210 includes a drive mechanism 1851 which is located on a surface plate 1852, and an attachment portion 236 (e.g. an auto exchange joint element as may be included on attached to an articulated probe head 213) for attaching the CRS optical probe system 215 to the drive mechanism 1851. The drive mechanism 1851 includes x-axis, y-axis, and z-axis slide mechanisms 1851X, 1851Y, and 1851Z, for moving the CRS optical probe system 215 three dimensionally. In various implementations, the CRS optical probe system 215 may be automatically stored in a storage rack (not shown), and may be automatically removed from the storage rack and attached to the attachment portion 236 (e.g. under the control of an inspection program) at an autojoint connection 230, which may comprise precise kinematic mounting features, an optical fiber connection, electrical connections, etc. that provide a physical interface that is common to various interchangeable CMM probes or sensors, according to known principles. As part of a measurement or calibration operation, the CRS optical probe system 215 is positioned by the CMM 210 relative to a surface (e.g., a measurement surface 290 of a workpiece, or a measurement surface of a calibration object, etc.) and directs a measurement beam 296 (e.g., a radial distance sensing beam) toward the surface, as described herein. As illustrated in FIG. 18, the surface plate 1852 (e.g., which may function as a stage of the CMM 210) may have various calibration objects positioned thereon (e.g., which in some implementations may be fixed to the surface plate 1852 or otherwise positioned at known coordinates). In the example of FIG. 18, a spherical calibration object 1898, a cylindrical calibration object 1846A and a cylindrical calibration object 1846B are shown to be positioned on the surface plate 1852, as may be utilized for various calibration processes, as described herein. The cylindrical calibration objects 1846A and 1846B may have different radii to respective nominally cylindrical calibration surfaces. As described above, rather than having two cylindrical calibration objects with different radii, in some implementations a single cylindrical calibration object may be provided that includes two different nominally cylindrical calibration surfaces with different radii.

Figure 19:
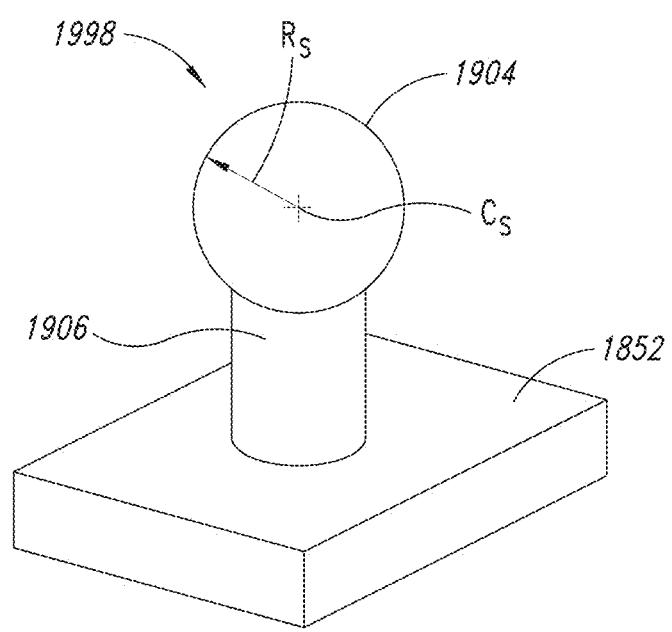
FIG. 19 illustrates an embodiment of a calibration object in the form of a spherical calibration object.

FIG. 19 illustrates a first embodiment of a calibration object in the form of a spherical calibration object 1998 for use in obtaining spherical calibration data for correcting misalignment errors of a CRS optical probe of a CMM (see, e.g., optical probe system 215 of CMM 210 of FIG. 18). The spherical calibration object 1998 comprises a nominally spherical calibration surface 1904 and may typically be supported by a support structure 1906 above a surface plate 1852 (e.g., as may be part of, or positioned on, the surface plate 1852).

The nominal radius $R_S$ (and thus also the diameter) and a reference center $C_S$ of the spherical calibration object 1998 are assumed to be known. As discussed in more detail in the discussion of FIGS. 20-27C, radial distance measurements taken using the spherical calibration object may be employed to determine spherical calibration data, such as radius, rotational angle and Z position spherical calibration information.

In various embodiments, one or more spherical calibration objects, such as the calibration object 1898 of FIG. 18 or the calibration object 1998 of FIG. 19, may be used together with one or more cylindrical calibration objects (see, e.g., cylindrical calibration objects 1846A and 1846B of FIG. 18) to obtain radial distance measurement used to determine calibration data, such as cylindrical and spherical calibration data. For example, in some implementations radial distance measurements may be taken of one or more cylindrical calibration objects to obtain cylindrical radius calibration data, and radial distance measurements may be taken of one or more spherical calibration objects to obtain rotational angle and Z position spherical calibration data. Using cylindrical calibration objects to obtain radius calibration data and spherical calibration objects to obtain rotational angle and Z position calibration data may facilitate the use of simple cylindrical calibration objects, as the patterns added to cylindrical calibration objects to facilitate obtaining rotational angle and Z position calibration data may be avoided when radial distance measurements of a spherical calibration object are used instead to obtain the rotational angle and Z position calibration data. Of course, some embodiments may obtain various combinations of radius, rotational angle and Z position calibration data from radial distance measurements of various calibration objects, such as cylindrical calibration objects and spherical calibration objects.

Figure 20:
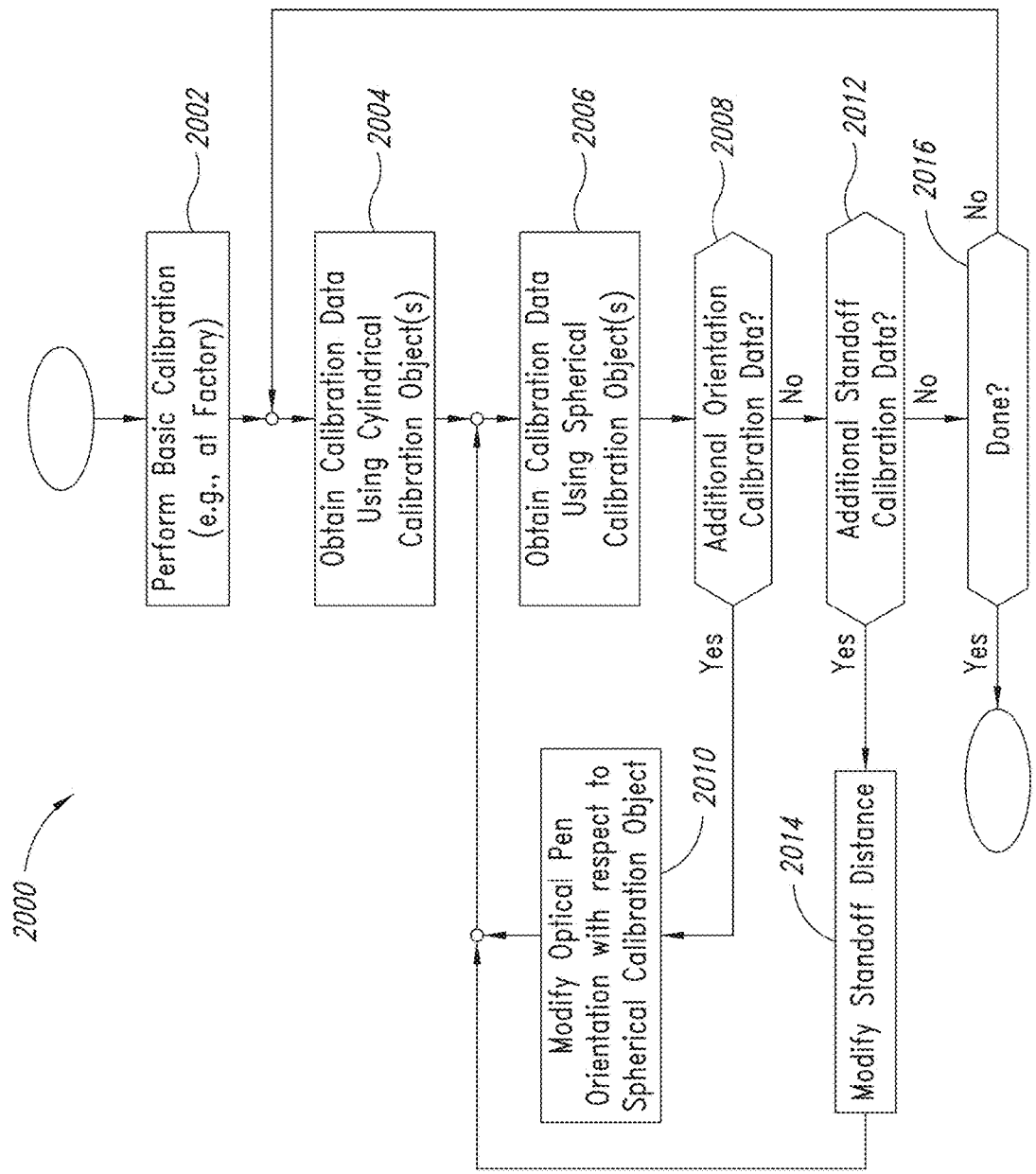
FIG. 20 is a flow diagram illustrating one exemplary embodiment of a routine for calibrating a rotating chromatic range sensor configuration of a CMM

FIG. 20 is a flow diagram illustrating one exemplary embodiment of a routine 2000 for calibrating a rotating chromatic range sensor configuration of a CMM, which may be employed, for example, by one or more embodiments of a CMM with one or more calibration objects as disclosed herein. In an embodiment, the routine 2000 provides calibration data or information for correcting misalignment errors for a rotating chromatic range sensor configuration that is configured to direct a radial distance sensing beam along a radial direction relative to a rotation axis, and to rotate the radial distance sensing beam about the rotation axis. The routine 2000 may be called, for example, by a probe signal processing and control circuit (e.g., probe signal processing and control circuit 207 of FIGS. 2, 5 and 18), by a basic calibration routine, etc.

As illustrated, the routine 2000 begins at 2002, where basic calibration of a CMM may be performed. In various implementations, such basic calibration may be performed at a factory (e.g., with the other steps of the routine 2000 performed later) and/or may also be performed at other times (e.g., in the field, etc.) In some implementations, "basic calibration" may alternatively be referenced as "factory calibration" and/or "initial calibration". Basic calibration may include utilizing a measurement calibration surface (e.g., a reflective surface such as a mirror) which is moved to a series of distances from the optical pen. In various implementations, each actual distance is known, measured and/or otherwise determined (e.g., utilizing an interferometer), and for which the distance is also measured with the optical pen. The difference between the actual distance and the distance measured with the optical pen is utilized to determine a correction value for each distance, which may be utilized to generate a correction table for each corrected distance $D_C$ (e.g., for which distances between the distances recorded in the table may be interpolated, etc.) Basic calibration 2002 may include obtaining other calibration data, such as taking radial distance measurements to determine calibration offset information (see, e.g., FIGS. 14-19 and 21-27C and the discussion thereof), registering of one or more calibration objects (e.g., cylindrical calibration objects, spherical calibration objects) to an optical pen (e.g., with reference to FIGS. 18 and 19, determining values of radii and of reference centers of cylindrical calibration objects 1846a, 1846b, determining values of the nominal radius $R_S$ and the reference center $C_S$ of spherical calibration objects 1898, 1998 on a surface plate 1852), etc., and various combinations thereof.

The routine 2000 proceeds from 2002 to 2004. At 2004, the routine 2000 obtains cylindrical calibration data using one or more cylindrical calibration objects. This may be done, for example, as discussed above with respect to FIGS. 14-17. For example, radius correction calibration data may be obtained using a cylindrical calibration object registered to the pen, for example, with two or more stepped radii available with or without Z stage scanning (for example: a stack of three ring gauges with different radii may be measured in one Z scan, or two ring gauges may be employed and measured in two measurements without Z stage scanning), to obtain at least radius offset and linear correction factor data to correct for mechanical misalignment errors in rotating the pen. In some embodiments, rotational angle, Z position, and first and second harmonic error calibration information may be obtained at this stage, and a reference origin established. It is noted that cylindrical calibration objects may in some implementations provide more accurate radius correction information such as offset, linear, and rotational second harmonic correction information for an optical pen than may typically be obtained using a spherical calibration object (e.g., at 2006 described below) due to the presence of fewer translational axes of motion, which may result in reduced calibration errors, etc.

Figure 21:
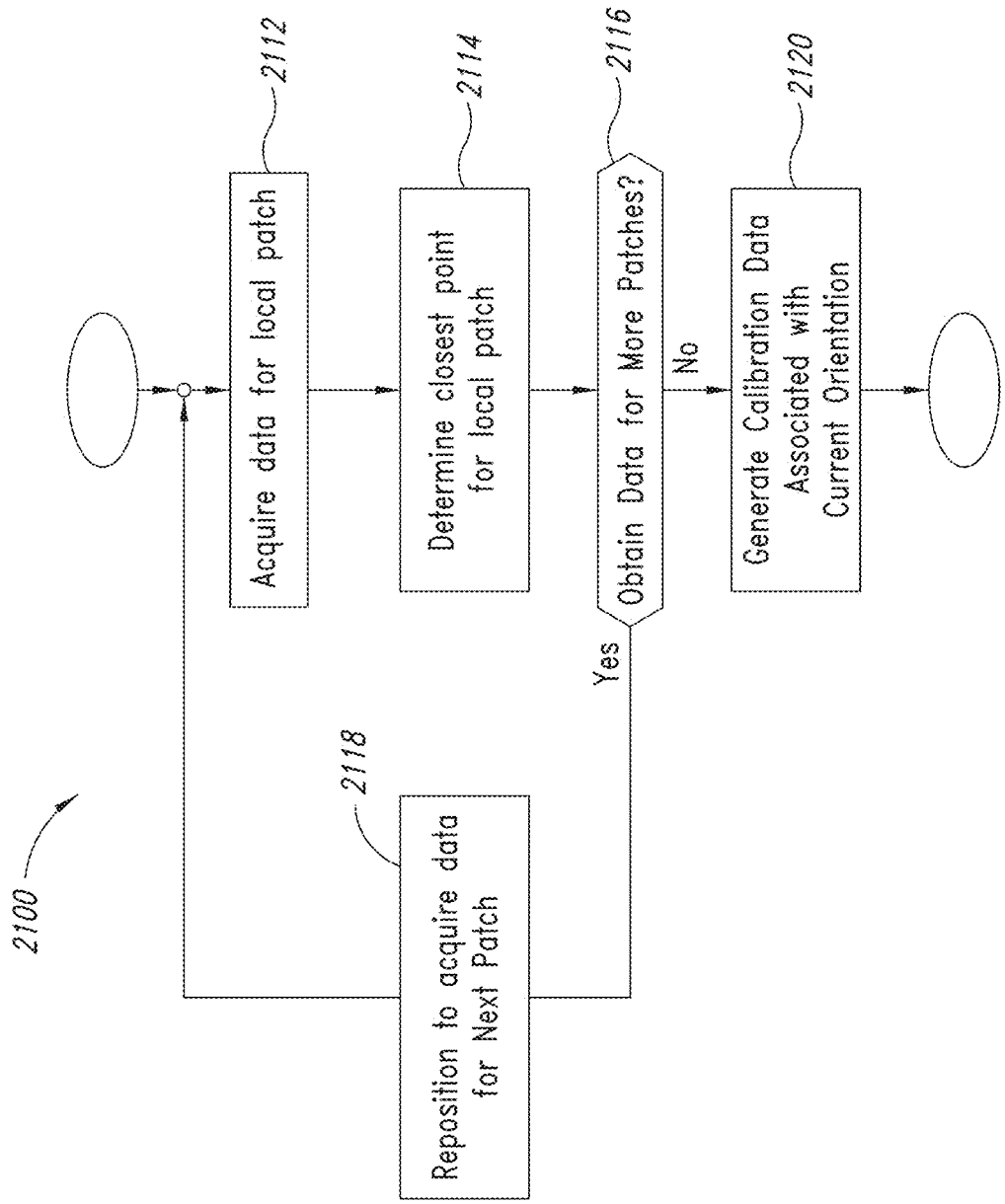
FIG. 21 is a flow diagram illustration one exemplary embodiment of a routine for obtaining spherical calibration data by taking radial distance measurements of a spherical calibration object.

The routine 2000 proceeds from 2004 to 2006. At 2006, the routine 2000 obtains calibration data by taking radial distance measurements using one or more spherical calibration objects. FIG. 21 is a flow diagram illustration one exemplary embodiment of a routine 2100 for obtaining calibration data by taking measurements of a spherical calibration object that may be employed, for example, by one or more embodiments of a CMM with one or more calibration objects as disclosed herein. The routine 2100 may be called, for example, by the routine 2000 of FIG. 20 at 2006. FIGS. 22-27C are conceptual diagrams for illustrating the process of determining calibration data by obtaining radial distance measurements data of a spherical calibration object, as well as example types of errors for which the obtained calibration data may be used in compensating routines. For convenience, the routine 2100 will be described with reference to FIGS. 22-25.

Figure 25A:
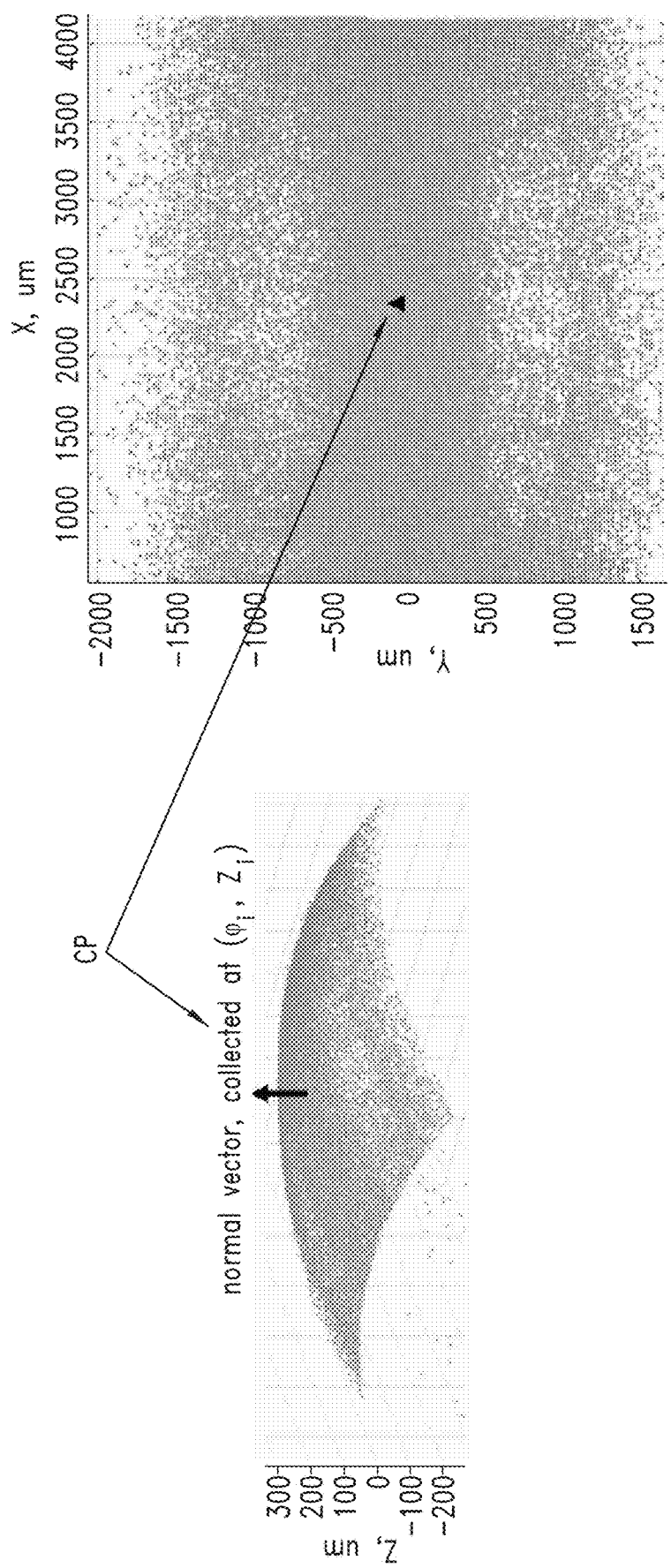
FIGS. 25A and 25B are diagrams for illustrating obtaining spherical radial distance data for a surface portion of a spherical calibration object.
Figure 25B:
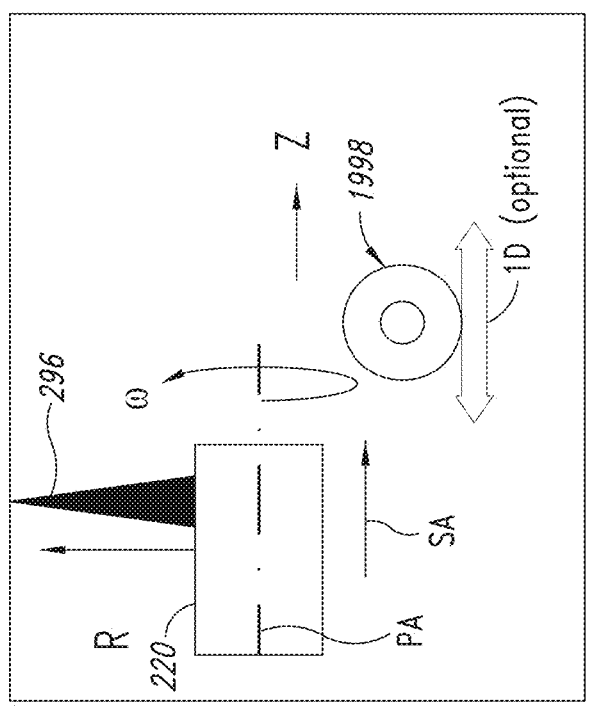

As illustrated, the routine 2100 begins at 2112, where the routine 2100 operates the rotating chromatic range sensor configuration to provide, for a first surface portion (e.g., a patch) of the surface of the spherical calibration object 1998 (e.g., see FIG. 25A), a corresponding set of spherical radial distance data acquired while rotating the radial distance sensing beam about the rotation axis with an optical pen of the rotating chromatic range sensor configuration approximately at a first nominal standoff position or distance $D_1$ from the spherical calibration object 1998 in accordance with a first orientation of the optical pen 220. Radial distance data is obtained as the probe measurement beam (e.g., a radial distance sensing beam) is rotated and moved along the Z axis of the probe/pen coordinate system (which in the orientation illustrated in FIG. 22 corresponds to the Z axis in the spherical calibration object coordinate system and to the scanning axis direction SA), producing measurements corresponding to a patch of the cylindrical calibration object closest to the optical pen. FIGS. 25A and 25B illustrate points of a surface portion (e.g., a patch) and corresponding measuring of data (e.g., corresponding to a sensed radial distance R) as the radial distance sensing beam 296 is rotated (e.g., according to a rotation angle ω) about the rotational axis PA of the optical pen 220 (e.g., which may correspond to a Z axis of the optical pen/probe coordinate system) at a plurality of positions for which the optical pen 220 (and correspondingly the radial distance sensing beam 296) is moved along a scanning axis direction SA relative to the spherical calibration object 1998. In various implementations, the movement of the optical pen 220 along the scanning axis direction SA relative to the spherical calibration object 1998 may at least in part be a relative movement. For example, in some implementations (optional), the spherical calibration object 1998 may be on a stage or other mechanism (e.g., as positioned on or part of a surface plate, etc.) capable of moving the spherical calibration object 1998 in one or more dimensions (e.g., 1D, 2D, or 3D), which may thus result in relative movement of the optical pen 220 in relation to the spherical calibration object 1998 (i.e., as the spherical calibration object 1998 is moved by the stage or other mechanism relative to the optical pen 220).

Figure 22:
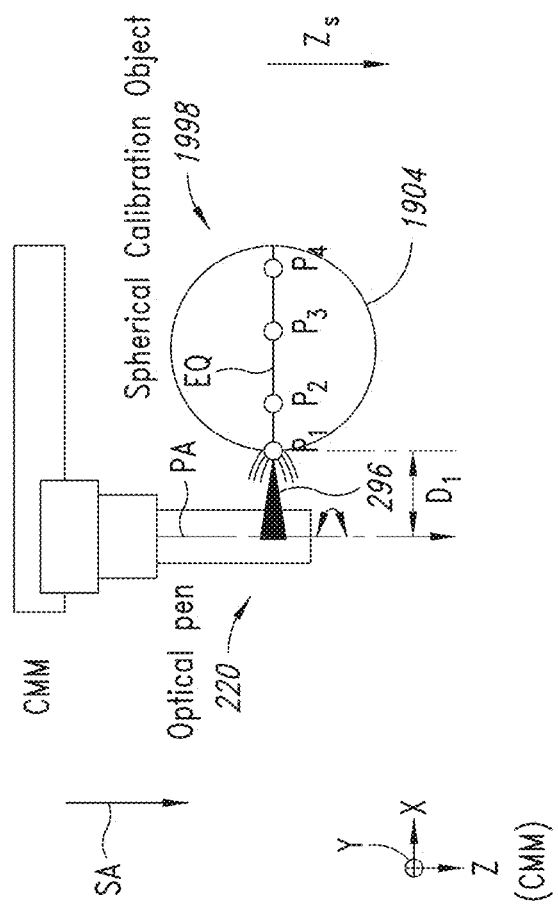
FIG. 22 is a conceptual diagram for illustrating taking radial distance measurements of a plurality of surface portions of a spherical calibration object with an optical pen at a first orientation and nominal standoff distance with respect to the spherical calibration object.

As illustrated in FIG. 22, the optical pen 220 is positioned at a first nominal standoff distance $D_1$ from the surface 1904 of the spherical calibration object 1998 and operated to obtain radial distance data corresponding to a first surface portion (e.g., a patch) of the spherical calibration object 1998, for which a corresponding closest point of approach $P_1$ may be determined, as will be described in more detail below. Data corresponding to the first surface portion is obtained at a plurality of positions along a scanning axis direction SA (e.g., see FIGS. 25A and 25B). In various implementations, the operations for obtaining the radial distance data corresponding to the first surface portion may include moving the CRS optical probe including the optical pen 220 to a series of positions along the scanning axis direction SA (i.e., while maintaining the standoff distance D1), and at each position rotating the radial distance sensing beam of the optical pen 220 to obtain radial distance data corresponding to a part of the first surface portion (i.e., as corresponding to the current position along the scanning axis direction SA). In accordance with such operations, radial distance data corresponding to a surface portion may be obtained (e.g., see FIG. 25A regarding a graphical representation of an example of such radial distance data for a surface portion). The routine 2100 proceeds from 2112 to 2114.

At 2114, the routine 2100 determines a closest point of approach (e.g., CP or $P_1$, see $P_1$-$P_4$ of FIG. 22, CP of FIGS. 23, 25A, 27A-27C, $P_1'$-$P_4'$ of FIG. 26) of the optical pen 220 to a surface portion (e.g., a patch) of the surface 1904 of the spherical calibration object based on the corresponding set of spherical radial distance data obtained for the patch. With reference to FIG. 25A, the closest point of approach CP may be associated with a normal vector collected at a rotational angle $\varphi_i$, and a distance $z_i$. This closest point of approach CP may be obtained, for example, using smoothing, fit-to-sphere algorithms based on the known radius (see radius $R_S$ of FIG. 19), other fitting functions, etc. The size of the surface portion or patch (e.g., the range of Z axis scanning along the scanning axis direction SA) may be selected to be within a range to provide a sufficiently accurate determination of the closest point of approach (e.g., using fit-to-sphere algorithms based on the known radius). The routine 2100 proceeds from 2114 to 2116.

At 2116, the routine 2100 determines whether to obtain a set of radial distance data corresponding to another surface portion (e.g., patch) of the spherical calibration object 1998 at the nominal standoff distance $D_1$ and in accordance with the first orientation. Typically, sets of radial distance data would be obtained for at least two patches of the spherical calibration object at a given standoff distance and orientation. As illustrated in FIG. 22, radial distance data sets are acquired for four patches in order to determine four corresponding closest points of approach $P_1$, $P_2$, $P_3$ and $P_4$, respectively (i.e., one for each patch). For ease of illustration, the closest points of approach (i.e., each of which corresponds to a patch) are shown spaced apart along an illustrated portion of an equator EQ of the spherical calibration object 1998 (the equator EQ may nominally be defined by the determined closest points of approach $P_1$-$P_4$ of the patches). Typically, the patches and/or corresponding closest points of approach may be uniformly distributed and/or equidistant from each other on the nominally spherical calibration surface 1904 of the spherical calibration object 1998. For example, the patches and/or corresponding closest points of approach may be uniformly distributed along an equator EQ of the spherical calibration object 1998.

As shown in FIG. 22, a Z axis of the coordinate system of the optical pen 220 (i.e., corresponding to an optical pen axis PA) is nominally aligned with (or parallel) to a reference axis $Z_S$ of the spherical calibration object 1998. In some implementations, the reference axis $Z_S$ of the spherical calibration object 1998 may be generally aligned with a force of gravity and/or parallel to the CMM coordinate system Z axis direction.

A threshold number may be employed to determine whether to obtain a set of radial distance data corresponding to another surface portion or patch of the surface 1904 (e.g., sets of radial distance data corresponding to patches may be obtained until a threshold number (e.g., 4, 6, etc.) of such data sets are obtained). The threshold number may be determined based on various factors, such as the desired accuracy of the compensation, the type of calibration errors to be compensated for based on spherical calibration data, whether data at a plurality of nominal standoff distances or orientations is to be obtained, available data processing resources, etc.

When it is determined at 2116 to obtain a set of radial distance data corresponding to another surface portion (e.g., patch) of the spherical calibration object at the nominal standoff distance and first orientation, the routine proceeds from 2116 to 2118, where the optical pen is repositioned (in the example of FIG. 22, without changing the orientation) to another location (e.g., another position around the equator EQ) at approximately the first nominal standoff position or distance $D_1$ from the spherical calibration object to obtain another set of radial distance data corresponding to another surface portion (e.g., corresponding to a patch with a corresponding closest point of approach $P_2$) of the spherical calibration object. The location may be along a nominal equator EQ of the spherical calibration object (e.g., in a plane normal to the probe axis PA in certain ideal configurations). When a plurality of sets of radial distance data are to be obtained using the spherical calibration object, the corresponding plurality of locations may in some instances be nominally equidistant from each other along the nominal equator. For example, if data was obtained for two surface portions (e.g., patches), the patches may be 180 degrees apart along the equator EQ. The routine 2100 proceeds from 2118 to 2112 to acquire data for another surface portion of the spherical calibration object.

When it is not determined at 2116 to obtain a set of radial distance data corresponding to another surface portion of the spherical calibration object at the current nominal distance and in accordance with the current (e.g., first, second, etc.) orientation, the routine proceeds from 2116 to 2120, where the routine processes radial distance data, closest point information, or both, associated with a set of surface portions and obtained at the nominal standoff distance and the current (e.g., first, second, etc.) orientation to generate or determine spherical calibration data (e.g., such as radius, Z position and rotational angle spherical calibration data) for the current nominal standoff distance in accordance with the current orientation.

Figure 23:
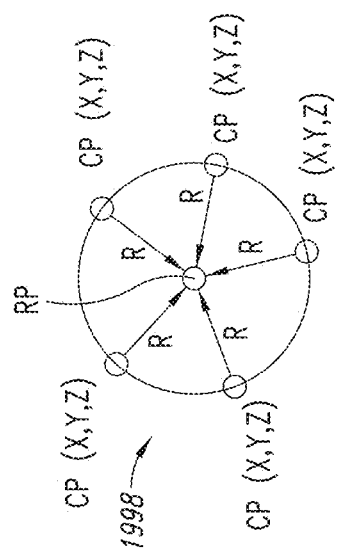
FIGS. 23 and 24 are conceptual diagrams for illustrating processing of radial distance data to determine closest points of a plurality of surface portions of a spherical calibration object and using the closest points to generate spherical calibration data.
Figure 24:
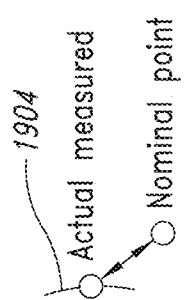

For example, with reference to FIGS. 23 and 24, five closest points of approach CP of the optical pen 220 to the patches of the surface 1904 of the spherical calibration object 1998 along an equator have been determined in the example under consideration in FIG. 22. The five points may be fit to a sphere using the nominal radius $R_S$ of the calibration object (see FIG. 19), or the diameter, which also would be known. For example, the five points may be transformed to the coordinate system of the CMM and averaged to find a reference position RP of the center of the spherical calibration object 1998. Information regarding deviations of the five points along the optical pen axis PA and/or scanning axis direction SA (e.g., the extent any of the five points are out of the plane of the equator for the current probe orientation) may be employed to generate Z position calibration information, and rotational encoder information (e.g., see encoder 630 of FIG. 6) may be employed to generate rotational calibration information. In other words, with reference to FIG. 24 differences between the nominal point and the measured point may be used as or to generate calibration data. Such differences may be represented as ($\Delta R(\varphi,XYZ)$, $\Delta\varphi(\varphi,XYZ)$, $\Delta z(\varphi,XYZ)$), where p is the rotational rotational angle and z is the Z axis position on the optical pen axis PA (i.e., for which the Z axis of the probe/pen coordinate system may correspond to the optical pen axis PA). Thus, data corresponding to pointing errors for each point as a function of the rotational angle $\varphi$ and position z on the optical pen axis PA may be obtained.

Figure 26:
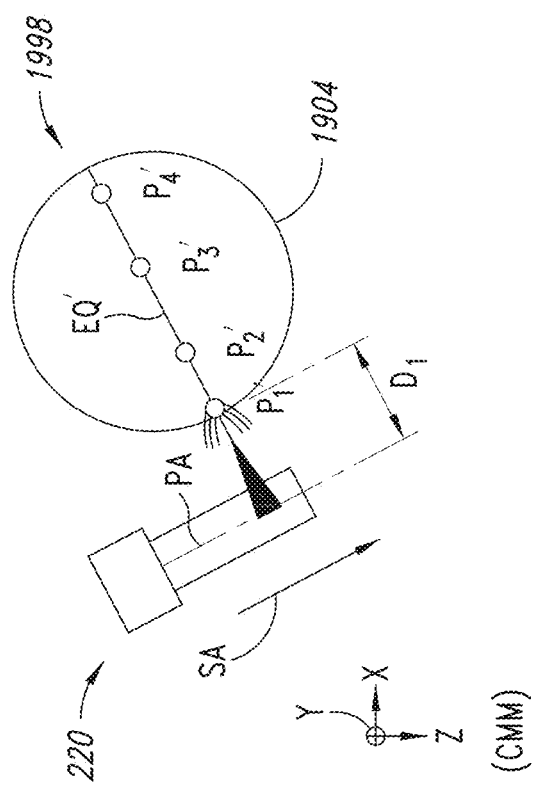
FIG. 26 is a conceptual diagram for illustrating taking radial distance measurements of a plurality of surface portions of a spherical calibration object with an optical pen at a second orientation and nominal standoff distance with respect to the spherical calibration object.

Obtaining calibration data by taking radial distance measurements of a plurality of surface portions (e.g., patches) of a spherical calibration object each of a size sufficient to accurately determine a closest point facilitates avoiding aberrations in taking measurements at large surface slopes and avoiding errors from extrapolating a fit of a single surface patch to find a reference center. The spherical calibration object may be a standard size for the CMM, which facilitates obtaining spherical calibration data at multiple orientations (e.g., see FIGS. 22 and 26 illustrating different orientation of the optical pen 220 relative to the CMM coordinate system). The routine 2100 may return from 2120 to a calling routine, such routine 2000 of FIG. 20, for example, to provide the generated spherical calibration data.

Referring again to FIG. 20, the routine 2000 proceeds from 2006 to 2008, where the routine determines whether to obtain additional calibration data at the first nominal standoff distance in accordance with another orientation of the optical pen 220 with respect to the spherical calibration object 1998. At different orientations of the optical pen with respect to the spherical calibration object, the force of gravity may introduce different errors in the measurements obtained using the rotation measurement beam. Obtaining calibration measurements at various orientations of the optical pen 220 facilitates obtaining more accurate calibration data for use when measurements are desired to be taken with the Z axis of the optical pen in an orientation differently aligned with the force of gravity. In other words, spherical calibration data to correct for the effects of gravity on the components of the CMM 210 and the optical pen 220 may be obtained by taking radial distance data at a plurality of orientations of the optical pen with respect to a spherical calibration object.

When it is determined at 2008 to obtain additional calibration data at the first nominal standoff distance in accordance with another orientation of the optical pen with respect to the spherical calibration object, the routine 2000 proceeds from 2008 to 2010, where orientation of the optical pen 220 with respect to the spherical calibration object 1998 is modified.

FIGS. 22 and 26 are conceptual diagrams which illustrate different orientations of the optical pen 220 with respect to a spherical calibration object 1998. In FIGS. 22 and 26, a reference axis $Z_S$ of a coordinate system of the spherical calibration object 1998 of an embodiment may be viewed as being vertical (e.g. nominally aligned with a force of gravity vector) and as may be parallel to the Z axis of the CMM coordinate system. In FIG. 22, the optical pen axis PA and a scanning axis direction SA along which the optical pen 220 is moved (e.g., for scanning a patch of the surface 1904 of the spherical calibration object 1998) are also parallel with the Z axis of the CMM coordinate system and the reference axis $Z_S$. In FIG. 26, the optical pen axis PA and a scanning axis direction SA along which the optical pen 220 is moved are not parallel with the Z axis of the CMM coordinate system (i.e., are at an angle relative to the Z axis of the CMM coordinate system). Thus, the optical pen of FIG. 22 has a different orientation with respect to the spherical calibration object 1998 than the optical pen of FIG. 26.

After modifying the orientation of the optical pen with respect to the spherical calibration object at 2010 (for example, changing from the orientation of FIG. 22 to the orientation of FIG. 26), the routine 2000 returns to 2006 to obtain spherical calibration data in accordance with the modified orientation of the optical pen with respect to the spherical calibration object. For example, with reference to FIG. 26, radial distance data sets may be acquired for four patches with corresponding closest points of approach $P_1'$, $P_2'$, $P_3'$ and $P_4'$, which as illustrated are along a portion of an equator EQ' of the spherical calibration object 1998, which is different from the equator EQ illustrated in FIG. 22.

When it is not determined at 2008 to obtain additional calibration data at the first nominal standoff distance in accordance with another orientation of the optical pen 220 with respect to the spherical calibration object 1998, the routine 2000 proceeds from 2008 to 2012 where the routine determines whether to obtain additional calibration data at another nominal standoff position or distance of the optical pen 220 with respect to the spherical calibration object 1998. In a manner similar to that discussed above with respect to FIGS. 14 to 17, obtaining spherical calibration data at a plurality of standoff positions or distances within the chromatic range of the optical probe may facilitate generating calibration offset and linear scaling data as a function of the measured distance or radius to compensate for various misalignment errors.

When it is determined at 2012 to obtain additional calibration data at another nominal standoff position or distance of the optical pen 220 with respect to the spherical calibration object 1998, the routine 2000 proceeds from 2012 to 2014, where the nominal standoff position or distance of the optical pen 220 with respect to the spherical calibration object 1998 is modified. The routine proceeds from 2014 to 2006, to obtain spherical calibration data at the modified standoff position or distance, different, for example, from the standoff distance $D_1$ of FIGS. 22 and 26 (e.g., for which a modified standoff distance $D_2$ may be greater or less than $D_1$). As will be described in more detail below, FIGS. 27B and 27C illustrate some examples having different standoff distances.

Figure 27A:
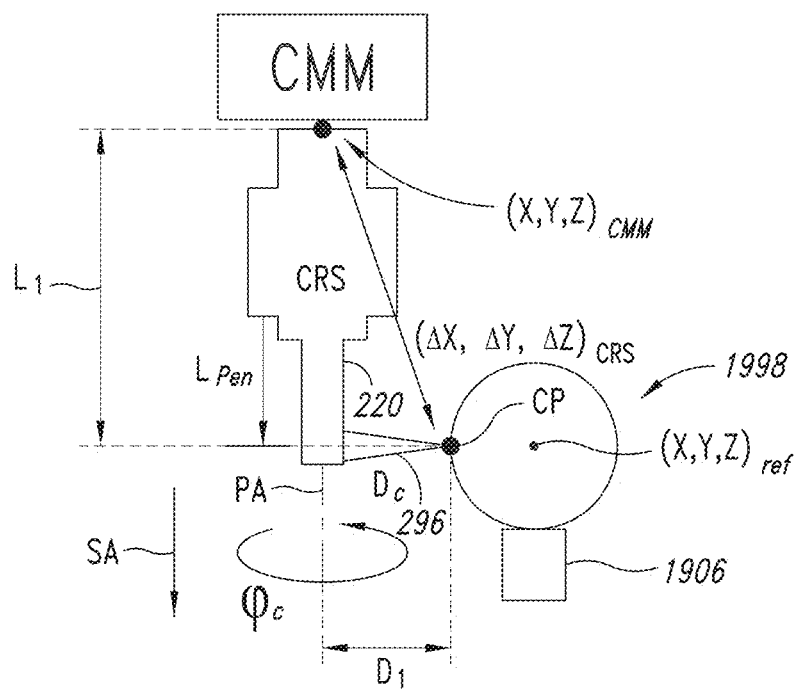
FIG. 27A is a conceptual diagram for illustrating an ideal alignment of a CMM having an optical pen obtaining radial distance measurements of a spherical calibration object.
Figure 27C:
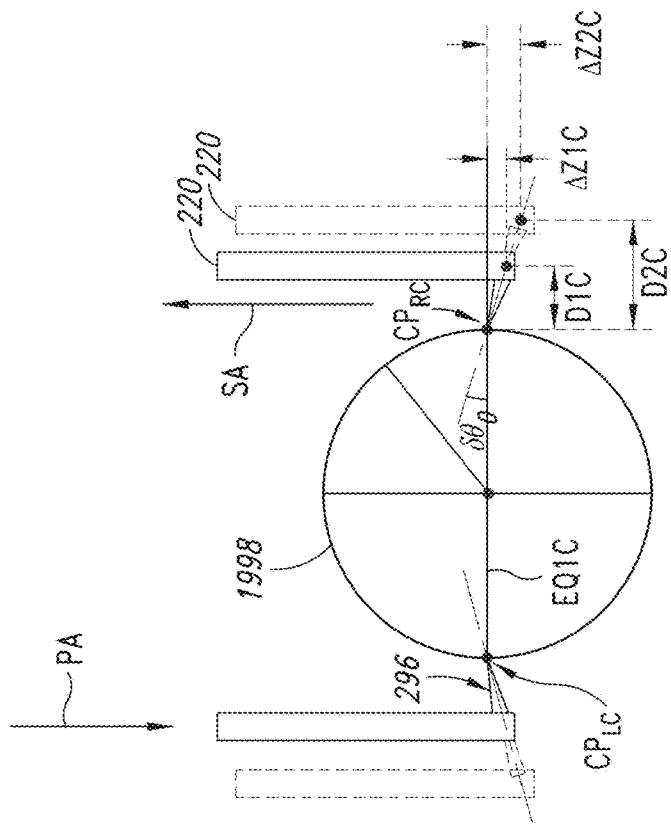
FIGS. 27B and 27C are conceptual diagrams for illustrating various misalignment errors in the context of obtaining radial distance measurements of a spherical calibration object using a CMM having an optical pen.

FIG. 27A is a conceptual diagram for illustrating an ideal alignment of a CMM having an optical pen 220 taking radial distance measurements of a spherical calibration object 1998. FIGS. 27B and 27C are conceptual diagrams for illustrating various misalignment errors in the context of taking radial distance measurements of a spherical calibration object 1998 at various standoff distances.

In the illustrated ideal alignment of FIG. 27A, the CRS optical probe including the optical pen is moved along a scanning axis direction SA (e.g., up and down in the illustrated orientation). The scanning axis direction SA is parallel to the axis PA of the optical pen 220, and the radial distance sensing beam 296 from the optical pen is orthogonal to the axis PA of the optical pen. Using the reference point of the CMM $(X, Y, Z)_{CMM}$ (e.g., at which the CRS optical probe including the optical pen is attached to the CMM or otherwise) and the measurement data $(\Delta X, \Delta Y, \Delta Z)_{CRS}$, a position of a measured point (as illustrated, a point on a spherical calibration object 1998 having a reference center $(X, Y, Z)_{ref}$ and supported by a support structure 1906) may be accurately determined. In the ideal alignment illustrated in FIG. 27A, the $\Delta Z$ component may correspond to a vertical length $L_1$ between the reference point $(X, Y, Z)_{CMM}$ and the radial distance sensing beam, and an $\Delta X/\Delta Y$ trigonometric component may correspond to a horizontal standoff distance $D_1$ (e.g., along the radial distance sensing beam from the optical pen axis PA to the closest point of approach CP on the surface of the spherical calibration object 1998). In contrast to the ideal alignment illustrated in FIG. 27A, in many instances measurement conditions may not be ideal (e.g., including non-ideal alignment), and measurement errors (e.g., such as those set forth in Table 1 above), may arise, for example, due to misalignments of various components (e.g., of the probe, optical pen, CMM, etc.)

Figure 27B:
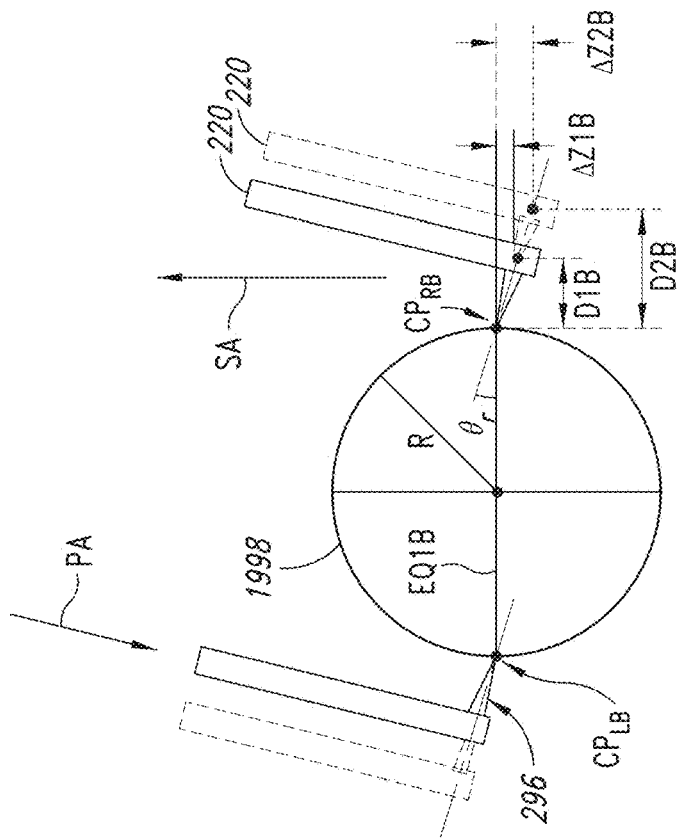

FIG. 27B illustrates with exaggeration Z position errors $\Delta Z$ and rotational axis misalignment angle errors $\theta_r$, which may arise when the optical probe/optical pen axis PA is not aligned with the scanning axis SA along which the optical pen 220 is moved. Ideally, the radial distance sensing beam 296 of the optical pen 220 is orthogonal to the surface of the spherical calibration object 1998 at a closest point of approach CP for a patch of the surface of the spherical calibration object 1998 for which radial distance data is being obtained (e.g., see FIG. 27A). However, when the scanning axis SA is not aligned with the axis PA of the optical pen 220, the radial distance sensing beam 296 may not be orthogonal to the surface of the spherical calibration object 1998 at the closest point of approach CP. This may result in errors in the radial distance data obtained, such as Z position errors $\Delta Z$, and misalignment angular errors $\Theta_r$. The magnitude and sign of these errors may be a function of the standoff distance, the rotational position, etc. It will be appreciated that in the example of FIG. 27B, the determination and/or knowledge of the distances (e.g., D1B, D2B) and of the distance errors (e.g., $\Delta Z1B$, $\Delta Z2B$) may enable the misalignment angular errors $\Theta_r$ and/or other errors to be determined (e.g., in accordance with certain trigonometric and/or other calculations and relationships, etc.)

As illustrated in FIG. 27B, radial distance measurements may be taken at different nominal standoff distances, such as at a first nominal standoff distance (e.g., corresponding to a distance D1B), as illustrated by the solid line depiction of the optical pen 220, and at a second nominal standoff distance (e.g., corresponding to a distance D2B), as illustrated by the dashed depiction of the optical pen 220, as illustrated on each side of the spherical calibration object 1998, and with illustrated corresponding closest points of approach $CP_{RB}$ and $CP_{LB}$ on each side. For example, the magnitude of the Z position error $\Delta Z$ as illustrated in FIG. 27B may be a function of the nominal standoff distance. More specifically, as illustrated in FIG. 27B, the first nominal standoff distance corresponds to the distance D1B, and the Z position error may vary as the optical pen is moved around the equator EQ1B of the spherical calibration object 1998 (e.g., for acquiring data sets for different patches spaced around the spherical calibration object 1998) for which a peak Z position error may correspond to a first Z position error $\Delta Z1B$ (e.g., as illustrated in relation to the position with the closest point of approach $CP_{RB}$). The second nominal standoff distance may correspond to a distance D2B, and for which a peak Z position error as the optical pen is moved around the equator EQ1B may correspond to a second Z position error ΔZ2B (e.g., as illustrated in relation to the position with the closest point of approach CPR).

Ideally, the radial distance sensing beam 296 of the optical pen 220 also is orthogonal to the axis PA of the optical pen 220 and to the scanning axis direction SA (e.g., see FIG. 27A). FIG. 27C illustrates example errors which may arise when the angle of the radial distance sensing beam is not orthogonal to the optical pen axis PA. For example, when there is a misalignment associated with the reflective element 294 (see FIG. 4A), the radial distance sensing beam may not be orthogonal to the axis PA of the optical pen 220 and to the scanning axis direction SA. This may result in errors in radial distance measurements, such as the illustrated output normal elevation angle errors $\delta\Theta_O$. In some implementations, the magnitude and sign of these errors may be relatively constant, or alternatively may be a function of the standoff distance, the rotational position, etc.

As illustrated in FIG. 27C, measurements may be taken at different nominal standoff distances, such as at a first nominal standoff distance, as illustrated by the solid line depiction of the optical pen 220, and at a second nominal standoff distance, as illustrated by the dashed depiction of the optical pen 220, as illustrated on each side of the spherical calibration object 1998, and with illustrated corresponding closest points of approach $CP_{RC}$ and $CP_{LC}$ on each side. More specifically, as illustrated in FIG. 27C, the first nominal standoff distance may correspond to a distance D1C, and the Z position error may in some instances be relatively constant (e.g., as opposed to the Z position error of FIG. 27B which may have greater variance) as the optical pen is moved around the equator EQ1C of the spherical calibration object 1998 (e.g., for acquiring data sets for different patches spaced around the spherical calibration object 1998) for which the relatively constant (or peak) Z position error may correspond to a first Z position error ΔZ1C (e.g., as illustrated in relation to the position with the closest point of approach $CP_{RC}$). The second nominal standoff distance may correspond to a distance D2C, and for which a relatively constant (or peak) Z position error as the optical pen 220 is moved around the equator EQ1C may correspond to a second Z position error ΔZ2C (e.g., as illustrated in relation to the position with the closest point of approach $CP_{RC}$). It will be appreciated that in the example of FIG. 27C, the determination and/or knowledge of the distances (e.g., D1C, D2C) and of the distance errors (e.g., ΔZ1C, ΔZ2C) may enable errors in radial distance measurements, such as the illustrated output normal elevation angle errors $\delta\Theta_O$ (e.g., which may be relatively constant in the example of FIG. 27C) and/or other errors to be determined (e.g., in accordance with certain trigonometric and/or other calculations and relationships, etc.)

When it is not determined at 2012 to obtain additional calibration data at another nominal standoff position or distance of the optical pen 220 with respect to the spherical calibration object 1998, the routine 2000 proceeds from 2012 to 2016, where the routine determines whether to obtain additional calibration data (e.g., using another calibration object or configuration). When it is determined at 2016 to obtain additional calibration data, the routine 2000 returns to 2004. When it is not determined at 2016 to obtain additional calibration data, the routine may terminate or perform additional processing (generating additional calibration data based on the obtained calibration data, storing calibration data, etc.).

Embodiments of the routines 2000 and 2100 may perform more acts than illustrated, may perform fewer acts than illustrated, and may perform acts in various orders or sequences. For example, in an embodiment the routines 2000 and 2100 may be combined. In another example, in some embodiments basic (e.g., factory) calibration 2002 may not be performed (e.g., when the routine is called during field measure calibration) and instead such basic calibration data that has previously been determined (e.g., at the factory or otherwise) may be retrieved.

In another example, adjustments to obtain spherical calibration data associated with various patches, orientations and standoff positions or distances may be made in various orders. For example, in various implementations the routine 2000 may perform acts 2012/2014 before or in parallel with acts 2008/2010. In the current representation of FIG. 20, the acts 2008/2010 may be seen/designated as forming a relative inner loop of the routine 2000 while the acts 2012/2014 may be seen/designated as forming a relative outer loop of the routine 2000. In one embodiment, the orders may be reversed (e.g., with the acts 2012/2014 moved up to form the inner loop and with the acts 2008/2010 moved down to form the outer loop) due to a determination that it may be preferable to have the inner loop be for additional standoff data, as this may in some instances only involve the CMM XYZ axes. The orientation may require a relatively slow motion of the autojoint orientation, which in some instances may not be as repeatable as the XYZ motions. Also, in some instances there may be affects from thermal drifts or other factors, for which it may be desirable for all XYZ motions for all standoffs necessary to do a calibration at one orientation to be collected in the inner loop. The calibrations at different standoffs may be separable, so in some instances they may be included in the outer loop.

In a manner similar to that discussed above with respect to multiple sets of data collected at different radii using cylindrical calibration objects, offset and linear scaling correction data may be obtained using multiple sets of radial distance data collected at different standoff distances from a spherical calibration object. Sets of radial distance measurements of surface portions (e.g., patches) around a cylindrical calibration object at different standoff distances are analogous to sets of radial distance measurements of different ring gauges or of a ring gauge at steps of different radii. In various implementations, offset and linear scaling correction data may be obtained based on sets of radial distance data collected at different radii using cylindrical calibration object(s), sets of radial distance data collected at different standoff distances from spherical calibration object(s), and/or various combinations thereof.

For example, with reference to Equation 1 (reproduced for convenience below) in which errors in radial distance measurement are represented in the form of a set of relationships, terms in the relationships may be determined based cylindrical calibration data sets, spherical calibration data sets and/or various combinations thereof (e.g., refinement or confirmation of a term determined using cylindrical calibration data may be based on spherical calibration data).

$$\begin{bmatrix} \Delta R \\ \Delta \varphi \\ \Delta Z \end{bmatrix} = \begin{bmatrix} R_0 + R_L D_C + C_{R1}\cos(2\pi\omega_c + \theta_{R1}) + C_{R2}\cos(4\pi\omega_c + \theta_{R2}) \\ \varphi_0 + \varphi_L D_C + C_{\varphi 1} D_C \sin(2\pi\omega_c + \theta_{\varphi 1}) + C_{\varphi 2} D_C \sin(4\pi\omega_c + \theta_{\varphi 2}) \\ Z_0 + Z_L D_C + C_{z1} D_C \sin(2\pi\omega_c + \theta_{z1}) + C_{z2} D_C \sin(4\pi\omega_c + \theta_{z2}) \end{bmatrix}$$

In an embodiment, for example, the correction of radial distance errors ΔR may be based on factory and cylindrical calibration data, and the correction of rotational angle $\Delta\varphi$ and Z position $\Delta Z$ errors may be based on spherical calibration data.

For example, the offset Ro, the linear correction factor $R_L D_C$ and the second harmonic $C_{R2} \cos(4\pi\varphi_c+\theta_{R2})$ terms may be based on basic (e.g., factory) calibration measurements or measurements taken using cylindrical calibration object(s). The first harmonic term $C_{R1} \cos(2\pi\varphi_c+\theta_{R1})$ may be determined based on basic calibration measurements, measurements taken using cylindrical calibration objects, combinations thereof, set to the reference coordinates for the CMM $(X, Y, Z)_{CMM}$. Depending on desired accuracy, stiffness of the probe, and other aspects, these factors may be determined from measurements taken in the probe vertical orientation and applied to correct at all or similar orientations, or they may be determined for each orientation from measurements taken at each orientation. (see the discussion of Equation 4, below).

The rotational angle offset $\varphi_o$ and Z offset $Z_o$ errors may be determined based on measurements at the closest approach points for a plurality of patches of a spherical calibration object (see FIG. 27B) at a standoff distance as a function of the rotational angle $\varphi_c$. Confirmation or adjustment may be made using measurements taken at additional standoff distance(s). Linear correction factors for rotational angle $\varphi_L D_C$ and Z position errors $Z_L D_L$, as well as higher harmonic correction factors (e.g., $C_{\varphi 1} D_C \sin(2\pi\varphi_c+\theta_{\varphi 1})$; $C_{\varphi 2} D_C \sin(4\pi\varphi_c+\theta_{\varphi 2})$; $C_{Z1} D_C \sin(2\pi\varphi_c+\theta_{Z1})$; $C_{Z2} D_C \sin(4\pi\varphi_c+\theta_{Z2})$), if desired, may be determined using radial distance measurements taken of a spherical calibration object at different nominal standoff distances corresponding to a range of the optical pen. When higher harmonic correction factors are desired, radial distance measurements of additional patches may be obtained in some embodiments (e.g., measurements at 4 patches or more for one or more nominal standoff distances when first harmonic correction is desired; measurements at 8 or more patches for one or more nominal standoff distances when first and second harmonic correction is desired, etc.) In some implementations, the term $D_C$ may be set to 0 (e.g., since the rotation is provided by a digital rotary encoder that may rotate from 0 to 360 degrees, for which relatively little or no linear scaling error may be present).

As discussed above, radial distance measurements of a spherical calibration object may be obtained at a plurality of orientations of an optical probe/pen with respect to a force of gravity in order to determine spherical calibration data to compensate for the force of gravity at different orientations. Compensation for different orientations of Z axis of the optical pen 220 with respect to a force of gravity for a rotating CRS measurement system at a nominal standoff distance may be represented in Cartesian coordinates by the following relationships (Equation 4):

$$\begin{bmatrix} X \\ Y \\ Z \end{bmatrix}_{System} = \begin{bmatrix} X \\ Y \\ Z \end{bmatrix}_{CMM} + \begin{bmatrix} \Delta X \\ \Delta Y \\ \Delta Z \end{bmatrix}_{RCPS,c} + T, \text{ where}$$

$$T = \left\{ \begin{bmatrix} X \\ Y \\ Z \end{bmatrix}_{System \ N \ Surface \ Points} \right\} - \begin{bmatrix} cx \\ cy \\ cz \end{bmatrix}_{Spherical \ Calibration \ Center} ;$$

$$\left\{ \begin{bmatrix} X \\ Y \\ Z \end{bmatrix}_{System \ N \ Surface \ Points} \right\}$$

is an average of measurement data obtained at N closest approach points of a plurality equidistant patches distributed along an equation of a spherical calibration object associated with the orientation; and $$\begin{bmatrix} cx \\ cy \\ cz \end{bmatrix}_{Spherical \ Calibration \ Center}$$

is the accepted coordinates of a center of the spherical calibration object. The relationships of Equation 4 may be employed to compensate for the force of gravity at the different orientations.

As discussed above, a calibration system for providing calibration data for a coordinate measurement machine (CMM) is provided. The calibration system includes the CMM, which comprises light generating circuitry, wavelength detection circuitry, and CMM control circuitry, and a chromatic range sensor (CRS) optical probe configured to couple to the CMM. The CRS optical probe comprises an optical pen having a confocal optical path including at least a confocal aperture and a chromatically dispersive optics portion. The optical pen is configured to direct a radial distance sensing beam along a radial direction relative to a rotation axis, rotate the radial distance sensing beam about the rotation axis, and focus different wavelengths at different distances along a measurement axis proximate to a workpiece surface to be measured. The calibration system may include a cylindrical calibration object and a spherical calibration object.

The cylindrical calibration object is for providing cylindrical calibration data for correcting misalignment errors of the CRS optical probe and comprises at least a first nominally cylindrical calibration surface having a central axis that extends along a Z direction. The CRS optical probe is configured to provide a first set of cylindrical radial distance data acquired while rotating the radial distance sensing beam about the rotation axis at a first Z coordinate along the Z direction relative to the cylindrical calibration object. The cylindrical radial distance data is referenced to a sensed rotational angle of the radial distance sensing beam about the rotation axis, and for which the first set of cylindrical radial distance data referenced to the sensed rotation angle is processed to determine the cylindrical calibration data.

The spherical calibration object comprises a nominally spherical calibration surface that is for providing spherical calibration data for correcting misalignment errors of the CRS optical probe. For a first plurality of surface portions on the nominally spherical calibration surface, for each surface portion, the CRS optical probe is configured to provide a corresponding set of spherical radial distance data acquired while rotating the radial distance sensing beam about the rotation axis with the optical pen approximately at a first nominal standoff distance from the spherical calibration object, and for which the optical pen is also moved along a scanning axis direction for acquiring the set of spherical radial distance data. Each set of radial distance data corresponding to each respective sensed surface portion is processed to determine a sensed closest surface point that is indicated to be closest to the optical pen. Spherical calibration data is determined based at least in part on the sensed closest surface points corresponding to the plurality of surface portions.

In some implementations, the cylindrical calibration object comprises a first set of angular reference features formed on or in the first nominally cylindrical calibration surface, and the angular reference features are configured to be sensed by the radial distance sensing beam and are located at known angles or known angular spacings around the central axis from one another on or in the first nominally cylindrical calibration surface.

In some implementations, the cylindrical calibration object is a ring gauge. In some implementations, the cylindrical calibration object is a first cylindrical calibration object and the first nominally cylindrical calibration surface is arranged at a known first radius R1 from the central axis that extends along the Z direction, and the system further comprises a second nominally cylindrical calibration surface. The second nominally cylindrical surface is at least one of (i) part of the first cylindrical calibration object, or (ii) part of a second cylindrical calibration object having a second central axis that extends along the Z direction, wherein the second nominally cylindrical calibration surface is arranged at a known second radius R2 from the central axis that extends along the Z direction, for which the second radius R2 is different than the first radius R1. The CRS optical probe is configured to provide a second set of cylindrical radial distance data acquired while rotating the radial distance sensing beam about the rotation axis at a Z coordinate along the Z direction relative to the second nominally cylindrical calibration surface. The second cylindrical radial distance data is referenced to a sensed rotational angle of the radial distance sensing beam about the rotation axis, and processed in addition to the first set of cylindrical radial distance data to determine the cylindrical calibration data.

In some implementations, the system is configured to determine calibration data for the CRS optical probe by processing the cylindrical calibration data and the spherical calibration data.

In some implementations, the nominally spherical calibration surface includes a plurality of points that are each at a same nominal radius from a common center point of the nominally spherical calibration surface.

In some implementations, the first plurality of surface portions on the nominally spherical calibration surface includes a plurality of patches on the nominally spherical calibration surface that are nominally equidistant from each other around an equator of the nominally spherical calibration object. Acquiring spherical radial distance data corresponding to a patch of the plurality of patches comprises moving the optical probe along a z-axis of the optical probe.

In some implementations, the nominally spherical calibration surface has a second plurality of surface portions, and, for each surface portion of the second plurality of surface portions, the CRS optical probe is configured to provide a corresponding set of spherical radial distance data acquired while rotating the radial distance sensing beam about the rotation axis with the optical pen approximately at the first nominal standoff distance from the spherical calibration object. Each set of radial distance data corresponding to each respective sensed surface portion of the second plurality of surface portions is processed to determine a sensed closest surface point that is indicated to be closest to the optical pen. The spherical calibration data is determined based at least in part on the sensed closest surface points corresponding to the second plurality of surface portions. In some implementations, the first plurality of surface portions on the nominally spherical calibration surface includes a first plurality of patches on the nominally spherical calibration surface that are nominally equidistant from each other around a first equator of the nominally spherical calibration object, and the second plurality of surface portions on the nominally spherical calibration surface includes a second plurality of patches on the nominally spherical calibration surface that are nominally equidistant from each other around a second equator of the nominally spherical calibration object.

In some implementations, for each surface portion of the first plurality of surface portions on the nominally spherical calibration surface, the CRS optical probe is configured to provide a corresponding set of spherical radial distance data acquired while rotating the radial distance sensing beam about the rotation axis with the optical pen approximately at a second nominal standoff distance from the spherical calibration object. Each set of radial distance data corresponding to each respective sensed surface portion at the second nominal standoff distance is processed to determine a sensed closest surface point that is indicated to be closest to the optical pen. The spherical calibration data is determined based at least in part on the sensed closest surface points corresponding to the second nominal standoff distance.

In some implementations, the system comprises a surface plate configured to position the cylindrical calibration object and the spherical calibration object with respect to the CRS optical probe.

In some implementations, for each surface portion of the first plurality of surface portions, the CRS optical probe is configured to provide the corresponding set of spherical radial distance data acquired while rotating the radial distance sensing beam about the rotation axis while the optical pen has a first orientation with respect to the spherical calibration object, and provide, for each surface portion of a second plurality of surface portions on the nominally spherical calibration surface, a corresponding set of spherical radial distance data acquired while rotating the radial distance sensing beam about the rotation axis while the optical pen has a second orientation with respect to the spherical calibration object, which is different than the first orientation.

In some implementations, a method is provided for providing calibration data for correcting misalignment errors for a rotating chromatic range sensor configuration. The rotating chromatic range sensor configuration is configured to direct a radial distance sensing beam along a radial direction relative to a rotation axis and to rotate the radial distance sensing beam about the rotation axis. A cylindrical calibration object and a spherical calibration object are provided.

The cylindrical calibration object comprises at least a first nominally cylindrical calibration surface having a central axis that extends along a Z direction and arranged in a relationship relative to the rotating chromatic range sensor configuration. The rotating chromatic range sensor configuration is operated to provide a first set of cylindrical radial distance data acquired while rotating the radial distance sensing beam about the rotation axis at a first Z coordinate along the Z direction relative to the cylindrical calibration object. The cylindrical radial distance data is referenced to a sensed rotational angle of the radial distance sensing beam about the rotation axis. The first set of cylindrical radial distance data referenced to the sensed rotation angle is processed to determine a first set of cylindrical calibration data.

The spherical calibration object comprises a nominally spherical calibration surface having a first plurality of surface portions and is arranged in a relationship relative to the rotating chromatic range sensor configuration. The rotating chromatic range sensor configuration is operated to provide, for the first plurality of surface portions, a corresponding set of spherical radial distance data acquired while rotating the radial distance sensing beam about the rotation axis with an optical pen of the rotating chromatic range sensor configuration approximately at a first nominal standoff distance from the spherical calibration object. Each set of radial distance data corresponding to each respective sensed surface portion is processed to determine a sensed closest surface point that is indicated to be closest to the optical pen of the rotating chromatic range sensor configuration. Spherical calibration data is determined based at least in part on the sensed closest surface points corresponding to the plurality of surface portions.

In some implementations, the cylindrical calibration object comprises a first set of angular reference features formed on or in the first nominally cylindrical calibration surface, and located at known angles or known angular spacings around the central axis from one another on or in the first nominally cylindrical calibration surface. The method comprises operating the rotating chromatic range sensor configuration to sense the first set of angular reference features.

In some implementations, the cylindrical calibration object is a ring gauge. In some implementations, the cylindrical calibration object is a first cylindrical calibration object and the first nominally cylindrical calibration surface is arranged at a known first radius R1 from the central axis that extends along the Z direction. The method comprises providing a second nominally cylindrical calibration surface that is at least one of (i) part of the first cylindrical calibration object, or (ii) part of a second cylindrical calibration object, wherein the second nominally cylindrical calibration surface has a second central axis that extends along the Z direction and wherein the second nominally cylindrical calibration surface is arranged at a known second radius R2 from the central axis that extends along the Z direction, for which the second radius R2 is different than the first radius R1. The method comprises operating the chromatic range sensor configuration to provide a second set of cylindrical radial distance data acquired while rotating the radial distance sensing beam about the rotation axis at a Z coordinate along the Z direction relative to the second nominally cylindrical calibration surface, the second cylindrical radial distance data referenced to a sensed rotational angle of the radial distance sensing beam about the rotation axis. The second set of cylindrical radial distance data referenced to the sensed rotation angle is processed in addition to the first set of cylindrical radial distance data to determine the cylindrical calibration data.

In some implementations, the cylindrical calibration data and the spherical calibration data are processed to generate calibration data for the chromatic range sensor configuration.

In some implementations, the nominally spherical calibration surface has a second plurality of surface portions, and, the method comprises operating the chromatic range sensor configuration to provide, for each surface portion of the second plurality of surface portions, a corresponding set of spherical radial distance data acquired while rotating the radial distance sensing beam about the rotation axis with the optical pen approximately at the first nominal standoff distance from the spherical calibration object. Each set of radial distance data corresponding to each respective sensed surface portion of the second plurality of surface portions is processed to determine a sensed closest surface point that is indicated to be closest to the optical pen. The spherical calibration data is determined based at least in part on the sensed closest surface points corresponding to the second plurality of surface portions.

In some implementations, the method comprises operating the rotating chromatic range sensor configuration to provide, for the first plurality of surface portions, a corresponding set of spherical radial distance data acquired while rotating the radial distance sensing beam about the rotation axis with the optical pen of the rotating chromatic range sensor configuration approximately at a second nominal standoff distance from the spherical calibration object. Each set of radial distance data corresponding to each respective sensed surface portion and the second nominal standoff distance is processed to determine a sensed closest surface point that is indicated to be closest to the optical pen of the rotating chromatic range sensor configuration. The spherical calibration data is determined based at least in part on the sensed closest surface points corresponding to the plurality of surface portions and the second nominal standoff distance.

In some implementations, a calibration system is provided for a chromatic range sensor (CRS) configuration including a CRS optical probe. The calibration system comprises a cylindrical calibration object for providing cylindrical calibration data for correcting misalignment errors of the CRS optical probe, a spherical calibration object for providing spherical calibration data for correcting misalignment errors of the CRS optical probe, and a surface plate configured to position the cylindrical calibration object and the spherical calibration object with respect to the CRS optical probe.

The cylindrical calibration object comprises at least a first nominally cylindrical calibration surface having a central axis that extends along a Z direction. The CRS optical probe is configured to provide a first set of cylindrical radial distance data acquired while rotating the radial distance sensing beam about the rotation axis at a first Z coordinate along the Z direction relative to the cylindrical calibration object. The cylindrical radial distance data is referenced to a sensed rotational angle of the radial distance sensing beam about the rotation axis. The first set of cylindrical radial distance data referenced to the sensed rotation angle is processed to determine the cylindrical calibration data.

The spherical calibration object comprises a nominally spherical calibration surface. For a first plurality of surface portions on the nominally spherical calibration surface, for each surface portion the CRS optical probe is configured to provide a corresponding set of spherical radial distance data acquired while rotating the radial distance sensing beam about the rotation axis with the optical pen approximately at a first nominal standoff distance from the spherical calibration object. Each set of radial distance data corresponding to each respective sensed surface portion is processed to determine a sensed closest surface point that is indicated to be closest to the optical pen. The spherical calibration data is determined based at least in part on the sensed closest surface points corresponding to the plurality of surface portions.

In some implementations, the cylindrical calibration object and the spherical calibration object are mounted on the surface plate.

While preferred implementations of the present disclosure have been illustrated and described, numerous variations in the illustrated and described arrangements of features and sequences of operations will be apparent to one skilled in the art based on this disclosure. For example, it will be appreciated that a coordinate measurement machine as described herein may be any type of conventional coordinate measuring machine and/or may be any other type of machine utilizing an optical probe wherein coordinates are determined (e.g., a robot platform utilizing an optical probe, etc.) As another example, in addition to the CRS optical probes as described herein, other types of optical probes may also be utilized in the described systems and configurations (e.g., other non-contact white light optical probes may similarly be utilized for which the light is transmitted to the optical probe via the disclosed free-space optical fiber coupling, etc.) Various other alternative forms may also be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary, to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A system, comprising:
   a coordinate measurement machine (CMM) comprising:
      light generating circuitry;
      wavelength detection circuitry; and
      CMM control circuitry;
   a chromatic range sensor (CRS) optical probe configured to couple to the CMM, the CRS optical probe comprising an optical pen having a confocal optical path including at least a confocal aperture and a chromatically dispersive optics portion, the optical pen configured to direct a radial distance sensing beam along a radial direction relative to a rotation axis, rotate the radial distance sensing beam about the rotation axis, and focus different wavelengths at different distances along a measurement axis proximate to a workpiece surface to be measured;
   a cylindrical calibration object for providing cylindrical calibration data for correcting misalignment errors of the CRS optical probe, the cylindrical calibration object comprising at least a first nominally cylindrical calibration surface having a central axis that extends along a Z direction, wherein the CRS optical probe is configured to provide a first set of cylindrical radial distance data acquired while rotating the radial distance sensing beam about the rotation axis at a first Z coordinate along the Z direction relative to the cylindrical calibration object, the cylindrical radial distance data referenced to a sensed rotational angle of the radial distance sensing beam about the rotation axis, and for which the first set of cylindrical radial distance data referenced to the sensed rotation angle is processed to determine the cylindrical calibration data; and
   a spherical calibration object for providing spherical calibration data for correcting misalignment errors of the CRS optical probe, the spherical calibration object comprising a nominally spherical calibration surface, wherein for a first plurality of surface portions on the nominally spherical calibration surface, for each surface portion the CRS optical probe is configured to provide a corresponding set of spherical radial distance data acquired while rotating the radial distance sensing beam about the rotation axis with the optical pen approximately at a first nominal standoff distance from the spherical calibration object and for which the optical pen is also moved along a scanning axis direction for acquiring the set of spherical radial distance data, and for which each set of radial distance data corresponding to each respective sensed surface portion is processed to determine a sensed closest surface point that is indicated to be closest to the optical pen, and for which the spherical calibration data is determined based at least in part on the sensed closest surface points corresponding to the plurality of surface portions.

2. The system of claim 1, wherein the system is configured to determine calibration data for the CRS optical probe by processing the cylindrical calibration data and the spherical calibration data.

3. The system of claim 1, wherein the nominally spherical calibration surface includes a plurality of points that are each at a same nominal radius from a common center point of the nominally spherical calibration surface.

4. The system of claim 1, wherein the first plurality of surface portions on the nominally spherical calibration surface comprises a plurality of patches on the nominally spherical calibration surface that are nominally equidistant from each other around an equator of the nominally spherical calibration object.

5. The system of claim 1, wherein the nominally spherical calibration surface has a second plurality of surface portions, and, for each surface portion of the second plurality of surface portions, the CRS optical probe is configured to provide a corresponding set of spherical radial distance data acquired while rotating the radial distance sensing beam about the rotation axis with the optical pen approximately at the first nominal standoff distance from the spherical calibration object, and for which each set of radial distance data corresponding to each respective sensed surface portion of the second plurality of surface portions is processed to determine a sensed closest surface point that is indicated to be closest to the optical pen, and for which the spherical calibration data is determined based at least in part on the sensed closest surface points corresponding to the second plurality of surface portions.

6. The system of claim 5, wherein the first plurality of surface portions on the nominally spherical calibration surface includes a first plurality of patches on the nominally spherical calibration surface that are nominally equidistant from each other around a first equator of the nominally spherical calibration object, and the second plurality of surface portions on the nominally spherical calibration surface includes a second plurality of patches on the nominally spherical calibration surface that are nominally equidistant from each other around a second equator of the nominally spherical calibration object.

7. The system of claim 1 wherein, for each surface portion of the first plurality of surface portions on the nominally spherical calibration surface, the CRS optical probe is configured to provide a corresponding set of spherical radial distance data acquired while rotating the radial distance sensing beam about the rotation axis with the optical pen approximately at a second nominal standoff distance from the spherical calibration object, and for which each set of radial distance data corresponding to each respective sensed surface portion is processed to determine a sensed closest surface point that is indicated to be closest to the optical pen, and for which the spherical calibration data is determined based at least in part on the sensed closest surface points corresponding to the second nominal standoff distance.

8. The system of claim 1, comprising:
a surface plate configured to position the cylindrical calibration object and the spherical calibration object with respect to the CRS optical probe.

9. The system of claim 1, wherein for each surface portion of the first plurality of surface portions, the CRS optical probe is configured to:
provide the corresponding set of spherical radial distance data acquired while rotating the radial distance sensing beam about the rotation axis while the optical pen has a first orientation with respect to the spherical calibration object; and
provide, for each surface portion of a second plurality of surface portions on the nominally spherical calibration surface, a corresponding set of spherical radial distance data acquired while rotating the radial distance sensing beam about the rotation axis while the optical pen has a second orientation with respect to the spherical calibration object, which is different than the first orientation.

10. The system of claim 1, wherein the cylindrical calibration object comprises a first set of angular reference features formed on or in the first nominally cylindrical calibration surface, wherein the angular reference features are configured to be sensed by the radial distance sensing beam and are located at known angles or known angular spacings around the central axis from one another on or in the first nominally cylindrical calibration surface.

11. The system of claim 1, wherein the cylindrical calibration object is a ring gauge.

12. The system of claim 1, wherein:
the cylindrical calibration object is a first cylindrical calibration object and the first nominally cylindrical calibration surface is arranged at a known first radius $R_1$ from the central axis that extends along the Z direction; and
the system further comprises a second nominally cylindrical calibration surface that is at least one of:
part of the first cylindrical calibration object; or
part of a second cylindrical calibration object;
wherein the second nominally cylindrical calibration surface has a second central axis that extends along the Z direction and wherein the second nominally cylindrical calibration surface is arranged at a known second radius $R_2$ from the central axis that extends along the Z direction, for which the second radius $R_2$ is different than the first radius $R_1$, wherein the CRS optical probe is configured to provide a second set of cylindrical radial distance data acquired while rotating the radial distance sensing beam about the rotation axis at a Z coordinate along the Z direction relative to the second nominally cylindrical calibration surface, the second cylindrical radial distance data referenced to a sensed rotational angle of the radial distance sensing beam about the rotation axis, and for which the second set of cylindrical radial distance data referenced to the sensed rotation angle is processed in addition to the first set of cylindrical radial distance data to determine the cylindrical calibration data.

13. A method for providing calibration data for correcting misalignment errors for a rotating chromatic range sensor configuration that is configured to direct a radial distance sensing beam along a radial direction relative to a rotation axis, and to rotate the radial distance sensing beam about the rotation axis, and focus different wavelengths at different distances along a measurement axis proximate to a workpiece surface to be measured, the method comprising:
providing a cylindrical calibration object, the cylindrical calibration object comprising at least a first nominally cylindrical calibration surface having a central axis that extends along a Z direction;
arranging the cylindrical calibration object in a relationship relative to the rotating chromatic range sensor configuration;
operating the rotating chromatic range sensor configuration to provide a first set of cylindrical radial distance data acquired while rotating the radial distance sensing beam about the rotation axis at a first Z coordinate along the Z direction relative to the cylindrical calibration object, the cylindrical radial distance data referenced to a sensed rotational angle of the radial distance sensing beam about the rotation axis;
processing the first set of cylindrical radial distance data referenced to the sensed rotation angle to determine a first set of cylindrical calibration data;
providing a spherical calibration object, the spherical calibration object comprising a nominally spherical calibration surface, the nominally spherical calibration surface having a first plurality of surface portions;
arranging the spherical calibration object in a relationship relative to the rotating chromatic range sensor configuration;
operating the rotating chromatic range sensor configuration to provide, for the first plurality of surface portions, a corresponding set of spherical radial distance data acquired while rotating the radial distance sensing beam about the rotation axis with an optical pen of the rotating chromatic range sensor configuration approximately at a first nominal standoff distance from the spherical calibration object and for which the radial distance sensing beam is also moved along a scanning axis direction for acquiring the set of spherical radial distance data;
processing each set of radial distance data corresponding to each respective sensed surface portion to determine a sensed closest surface point that is indicated to be closest to the optical pen of the rotating chromatic range sensor configuration; and
determining spherical calibration data based at least in part on the sensed closest surface points corresponding to the plurality of surface portions.

14. The method of claim 13, further comprising processing the cylindrical calibration data and the spherical calibration data to generate calibration data for the chromatic range sensor configuration.

15. The method of claim 13, wherein the nominally spherical calibration surface has a second plurality of surface portions, and the method further comprises:
operating the chromatic range sensor configuration to provide, for each surface portion of the second plurality of surface portions, a corresponding set of spherical radial distance data acquired while rotating the radial distance sensing beam about the rotation axis with the optical pen approximately at the first nominal standoff distance from the spherical calibration object;
processing each set of radial distance data corresponding to each respective sensed surface portion of the second plurality of surface portions to determine a sensed closest surface point that is indicated to be closest to the optical pen; and determining the spherical calibration data based at least in part on the sensed closest surface points corresponding to the second plurality of surface portions.

16. The method of claim 13, further comprising:

operating the rotating chromatic range sensor configuration to provide, for the first plurality of surface portions, a corresponding set of spherical radial distance data acquired while rotating the radial distance sensing beam about the rotation axis with the optical pen of the rotating chromatic range sensor configuration approximately at a second nominal standoff distance from the spherical calibration object;

processing each set of radial distance data corresponding to each respective sensed surface portion and the second nominal standoff distance to determine a sensed closest surface point that is indicated to be closest to the optical pen of the rotating chromatic range sensor configuration to determine the spherical calibration data; and determining spherical calibration data based at least in part on the sensed closest surface points corresponding to the plurality of surface portions and the second nominal standoff distance.

17. The method of claim 13, further comprising:

operating the rotating chromatic range sensor configuration to provide, for the first plurality of surface portions, the corresponding set of spherical radial distance data acquired while rotating the radial distance sensing beam about the rotation axis while the optical pen has a first orientation with respect to the spherical calibration object; and operating the rotating chromatic range sensor configuration to provide, for each surface portion of a second plurality of surface portions on the nominally spherical calibration surface, a corresponding set of spherical radial distance data acquired while rotating the radial distance sensing beam about the rotation axis while the optical pen has a second orientation with respect to the spherical calibration object, which is different than the first orientation.

18. A calibration system, comprising:

a chromatic range sensor (CRS) configuration including a CRS optical probe;

a cylindrical calibration object for providing cylindrical calibration data for correcting misalignment errors of the CRS optical probe, the cylindrical calibration object comprising at least a first nominally cylindrical calibration surface having a central axis that extends along a Z direction, wherein the CRS optical probe is configured to provide a first set of cylindrical radial distance data acquired while rotating the radial distance sensing beam about the rotation axis at a first Z coordinate along the Z direction relative to the cylindrical calibration object, the cylindrical radial distance data referenced to a sensed rotational angle of the radial distance sensing beam about the rotation axis, and for which the first set of cylindrical radial distance data referenced to the sensed rotation angle is processed to determine the cylindrical calibration data;

a spherical calibration object for providing spherical calibration data for correcting misalignment errors of the CRS optical probe, the spherical calibration object comprising a nominally spherical calibration surface, wherein for a first plurality of surface portions on the nominally spherical calibration surface, for each surface portion the CRS optical probe is configured to provide a corresponding set of spherical radial distance data acquired while rotating the radial distance sensing beam about the rotation axis with the optical pen approximately at a first nominal standoff distance from the spherical calibration object and for which the optical pen is also moved along a scanning axis direction for acquiring the set of spherical radial distance data, and for which each set of radial distance data corresponding to each respective sensed surface portion is processed to determine a sensed closest surface point that is indicated to be closest to the optical pen, and for which the spherical calibration data is determined based at least in part on the sensed closest surface points corresponding to the plurality of surface portions; and a stage configured to position the cylindrical calibration object and the spherical calibration object with respect to the CRS optical probe.

19. The calibration system of claim 18, wherein the stage comprises a surface plate and the cylindrical calibration object and the spherical calibration object are mounted on the surface plate.

20. The calibration system of claim 18, further comprising a control portion configured to perform the processing of each set of radial distance data corresponding to each respective sensed surface portion to determine the sensed closest surface point that is indicated to be closest to the optical pen, and to determine the spherical calibration data based at least in part on the sensed closest surface points corresponding to the plurality of surface portions.

\* \* \* \* \*